US012647719B2

(12) United States Patent
Lee

(10) Patent No.: US 12,647,719 B2
(45) Date of Patent: Jun. 2, 2026

(54) VIBRATION GENERATING APPARATUS

(71) Applicant: LG Display Co., Ltd., Seoul (KR)

(72) Inventor: Sungtae Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 279 days.

(21) Appl. No.: 18/242,340

(22) Filed: Sep. 5, 2023

(65) Prior Publication Data

US 2024/0080612 A1 Mar. 7, 2024

(30) Foreign Application Priority Data

Sep. 5, 2022 (KR) ........................ 10-2022-0112319

(51) Int. Cl.

*H04R 1/28* (2006.01)
*H04R 9/02* (2006.01)
*H04R 9/04* (2006.01)

(52) U.S. Cl.

CPC ........... *H04R 1/2811* (2013.01); *H04R 9/022* (2013.01); *H04R 9/043* (2013.01); *H04R 2400/11* (2013.01); *H04R 2499/15* (2013.01)

(58) Field of Classification Search

CPC ...... H04R 1/2811; H04R 9/022; H04R 9/043; H04R 2400/11; H04R 2499/15; H04R 7/045; H04R 9/06; H04R 1/345; H04R 1/288; H04R 1/028; H04R 3/00; H04R 2430/00; H04R 9/025

See application file for complete search history.

(56) References Cited

U.S. PATENT DOCUMENTS 10,728,669 B2 * 7/2020 Choi ...................... H04R 9/025
2007/0127760 A1 * 6/2007 Saiki .................... H04R 1/2803
381/345

FOREIGN PATENT DOCUMENTS

KR 10-2019-0078177 A 7/2019

* cited by examiner

*Primary Examiner* — Carolyn R Edwards
(74) *Attorney, Agent, or Firm* — Birch, Stewart, Kolasch & Birch, LLP

(57) ABSTRACT

An apparatus can include a vibration member, a vibration apparatus configured to vibrate the vibration member, a supporting member disposed at a rear surface of the vibration member, and a porous member disposed between the vibration member and the supporting member. Also, the porous member can be spaced apart from the vibration apparatus.

31 Claims, 18 Drawing Sheets

VIBRATION GENERATING APPARATUS

CROSS-REFERENCE TO RELATED APPLICATIONS

This application claims priority to Korean Patent Application No. 10-2022-0112319 filed in the Republic of Korea, on Sep. 5, 2022, the entirety of which is hereby incorporated by reference into the present application as if fully set forth herein.

BACKGROUND

Field of the Invention

The present disclosure relates to an apparatus. For example, an apparatus that is configured to vibrate or output sound.

Discussion of the Related Art

An apparatus can include a separate speaker or sound apparatus, for providing a sound. When a speaker is provided in an apparatus, a problem occurs where the design and space arrangement of the apparatus are limited due to a space occupied by the speaker.

However, because a sound output from the speaker of the display apparatus can travel toward a rearward or a downward direction of the display apparatus, sound quality can be degraded due to interference between sounds reflected from a wall and the ground. For this reason, it can be difficult to transfer accurate sound to a viewer, and the immersion experience of the viewer is reduced. Thus, there exists a need to be able to provide better quality sound to a viewer while minimizing a size and weight of the device and also improving heat dissipation.

SUMMARY OF THE DISCLOSURE

Therefore, the inventor has recognized the limitations described above and has performed various experiments for enhancing a sound characteristic and/or a sound pressure level characteristic of an apparatus or a sound apparatus. Based on the various experiments, the inventor has invented an improved apparatus which can enhance the sound quality and a sound pressure level characteristic.

An aspect of the present disclosure is directed to providing an apparatus which can vibrate a vibration member to generate a vibration or a sound and can enhance a sound characteristic and/or a sound pressure level characteristic.

Another aspect of the present disclosure is directed to providing an apparatus which can vibrate a vibration member to generate a vibration or a sound and can enhance a sound characteristic and/or a sound pressure level characteristic of a low pitched sound band.

The objects of the present disclosure are not limited to the aforesaid, but other objects not described herein will be clearly understood by those skilled in the art from descriptions below.

An apparatus according to an embodiment of the present disclosure can include a vibration member and a vibration apparatus configured to vibrate the vibration member. A supporting member can be disposed at a rear surface of the vibration member. A porous member can be provided between the vibration member and the supporting member.

Details of other embodiments are included in the detailed description and the drawings.

An apparatus according to an embodiment of the present disclosure can configure a vibration apparatus vibrating a vibration member or a display panel, and thus, can generate a sound so that the sound travels in a forward direction of the vibration member or the display panel.

In an apparatus according to an embodiment of the present disclosure, a porous member including a plurality of pores can be provided in an internal space provided between a supporting member and a vibration member, and thus, an air resistance of the internal space can decrease, thereby enhancing a vibration characteristic of the vibration member and outputting a sound where a sound pressure level characteristic and/or a sound characteristic of a low pitched sound band are/is enhanced.

The effects of the present disclosure are not limited to the aforesaid, but other effects not described herein will be clearly understood by those skilled in the art from descriptions below.

The details of the present disclosure described in the technical problem, the technical solution, and advantageous effects do not specify essential features of claims, and thus, the scope of claims is not limited by the details described in detailed description of the invention.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

DETAILED DESCRIPTION OF THE EMBODIMENTS

Figure 1:
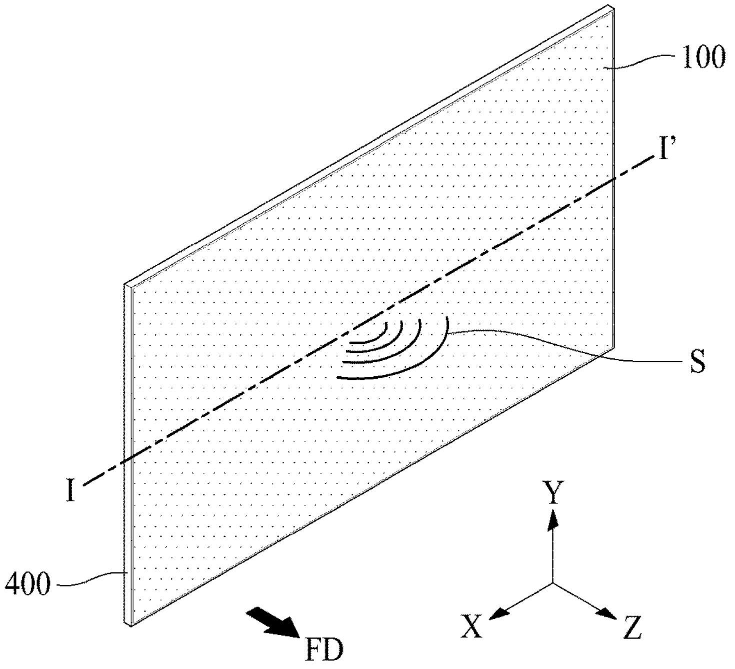
FIG. 1 illustrates an apparatus according to an embodiment of the present disclosure.

Advantages and features of the present disclosure, and implementation methods thereof will be clarified through following embodiments described with reference to the accompanying drawings. The present disclosure can, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted.

In a situation where "comprise," "have," and "include" described in the present specification are used, another part can be added unless "only" is used. The terms of a singular form can include plural forms unless referred to the contrary.

In construing an element, the element is construed as including an error range although there is no explicit description.

In describing a position relationship, for example, when the position relationship is described as "on," "under," "upon," "above," "below," and "next to," etc., one or more portions can be arranged between two other portions unless "just" or "direct" is used.

In describing a temporal relationship, for example, when the temporal order is described as "after," "subsequent," "next," and "before," a situation which is not continuous can be included, unless "just" or "direct" is used.

It will be understood that, although the terms "first," "second," etc. can be used herein to describe various elements, these elements should not be limited by these terms. These terms are only used to partition one element from another and may not define order or sequence. For example, a first element could be termed a second element, and, similarly, a second element could be termed a first element, without departing from the scope of the present invention.

In describing elements of the present disclosure, the terms "first," "second," "A," "B," "(a)," "(b)," etc. can be used. These terms are intended to identify the corresponding elements from the other elements, and basis, order, or number of the corresponding elements should not be limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the present disclosure, examples of an apparatus can include a narrow-sense display apparatus such as an organic light emitting display (OLED) module or a liquid crystal module (LCM) including a display panel and a driver for driving the display panel. Also, examples of the display apparatus can include a set device (or a set apparatus) or a set electronic apparatus such as a notebook computer, a TV, a computer monitor, an equipment apparatus including an automotive apparatus or another type apparatus for vehicles, or a mobile electronic device such as a smartphone or an electronic pad, which is a complete product (or a final product) including an LCM or an OLED module.

Therefore, in the present disclosure, examples of the apparatus can include a display apparatus itself, such as an LCM or an OLED module or display panel, and a set device which is a final consumer device or an application product including the LCM or the OLED module.

In some embodiments, an LCM or an OLED module including a display panel and a driver can be referred to as a narrow-sense display apparatus, and an electronic apparatus which is a final product including an LCM or an OLED module can be referred to as a set apparatus. For example, the narrow-sense display apparatus can include a display panel, such as an LCD or an OLED, and a source printed circuit board (PCB) which is a controller for driving the display panel. The set apparatus can further include a set PCB which is a set controller electrically connected to the source PCB to overall control the set apparatus.

A display panel applied to the present embodiment can use all types of display panels such as a liquid crystal display panel, an organic light emitting diode (OLED) display panel, and an electroluminescent display panel, but embodiments of the present disclosure are not limited to a specific display panel, which is vibrated by a sound generation device according to the present embodiment to output a sound. Also, a shape or a size of a display panel applied to a display apparatus according to the present embodiment is not limited.

For example, when the display panel is the liquid crystal display panel, the display panel can include a plurality of gate lines, a plurality of data lines, and a plurality of pixels respectively provided in a plurality of pixel areas defined by intersections of the gate lines and the data lines. Also, the display panel can include an array substrate including a thin film transistor (TFT) which is a switching element for adjusting a light transmittance of each of the plurality of pixels, an upper substrate including a color filter and/or a black matrix, and a liquid crystal layer between the array substrate and the upper substrate.

Moreover, when the display panel is the organic light emitting display panel, the display panel can include a plurality of gate lines, a plurality of data lines, and a plurality of pixels respectively provided in a plurality of pixel areas defined by intersections of the gate lines and the data lines. Also, the display panel can include an array substrate including a TFT which is an element for selectively applying a voltage to each of the pixels, an organic light emitting device layer on the array substrate, and an encapsulation substrate disposed at the array substrate to cover the organic light emitting device layer. The encapsulation substrate can protect the TFT and the organic light emitting device layer from an external impact and can prevent water or oxygen from penetrating into the organic light emitting device layer.

Also, a layer provided on the array substrate can include an inorganic light emitting layer (for example, a nano-sized material layer, a quantum dot, or the like). As another embodiment of the present disclosure, the layer provided on the array substrate can include a micro light emitting diode.

The display panel can further include a backing such as a metal plate attached on the display panel. However, the present embodiment is not limited to the metal plate, and the display panel can include another structure.

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in co-dependent relationship. All the components of each apparatus according to all embodiments of the present disclosure are operatively coupled and configured.

Hereinafter, embodiments of the present disclosure will be described in detail with reference to the accompanying drawings. For convenience of description, a scale of each of elements illustrated in the accompanying drawings differs from a real scale, and thus, is not limited to a scale illustrated in the drawings.

Figure 2:
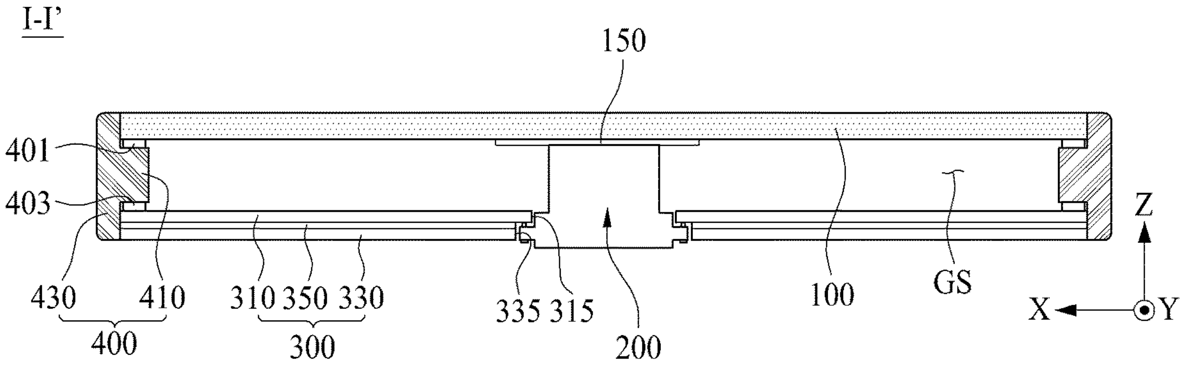
FIG. 2 is a cross-sectional view taken along line I-I' illustrated in FIG. 1 according to an embodiment of the present disclosure.

FIG. 1 illustrates an apparatus according to an embodiment of the present disclosure, and FIG. 2 is a cross-sectional view taken along line I-I' illustrated in FIG. 1 according to an embodiment of the present disclosure.

With reference to FIGS. 1 and 2, the apparatus according to an embodiment of the present disclosure can include a vibration member 100 (e.g., a member to be vibrated) and a vibration apparatus 200 disposed at a rear surface (or a backside) of the vibration member 100. For example, the vibration member 100 can be a vibration object, a display panel, a vibration plate, or a front member, but embodiments of the present disclosure are not limited thereto. Hereinafter, an example where a vibration member is a display panel will be described.

The vibration member 100 according to an embodiment of the present disclosure can be a display panel displaying an image. The display panel can display an electronic image, a digital image, a still image or a video image. For example, the display panel can output light to display an image. The display panel can be a curved display panel, or can be any type of display panel, such as a liquid crystal display panel, an organic light-emitting display panel, a quantum dot light-emitting display panel, a micro light-emitting diode display panel, and an electrophoresis display panel. The display panel can be a flexible display panel. For example, the display panel can a flexible light emitting display panel, a flexible electrophoretic display panel, a flexible electro-wetting display panel, a flexible micro light emitting diode display panel, or a flexible quantum dot light emitting display panel, but embodiments of the present disclosure are not limited thereto.

The display panel according to an embodiment of the present disclosure can include a display area (or an active area) for displaying an image according to driving of the plurality of pixels. The display panel can include a non-display area (or an inactive area) surrounding the display area, but embodiments of the present disclosure are not limited thereto.

The display panel according to an embodiment of the present disclosure can include an anode electrode, a cathode electrode, and a light emitting device, and can be configured to display an image in a type such as a top emission type, a bottom emission type, or a dual emission type, according to a structure of a pixel array layer including a plurality of pixels. In the top emission type, an image can be displayed by outputting visible light generated from the pixel array layer to the forward region of a base substrate. In the bottom emission type, an image can be displayed by outputting visible light generated from the pixel array layer to the backward region of the base substrate.

The display panel according to an embodiment of the present disclosure can include a pixel array portion disposed at the substrate. The pixel array portion can include a plurality of pixels which display an image based on a signal supplied through the signal lines. The signal lines can include a gate line, a data line and a pixel driving power line, or the like, but embodiments of the present disclosure are not limited thereto.

Each of the plurality of pixels can include a pixel circuit layer including a driving thin film transistor (TFT) provided at the pixel area which is configured by a plurality of gate lines and/or a plurality of data lines, an anode electrode electrically connected to the driving TFT, a light emitting layer formed over the anode electrode, and a cathode electrode electrically connected to the light emitting layer.

The driving TFT can be configured at a transistor region of each pixel area provided at a substrate. The driving TFT can include a gate electrode, a gate insulation layer, a semiconductor layer, a source electrode, and a drain electrode. The semiconductor layer of the driving TFT can include silicon such as amorphous silicon (a-Si), polysilicon (poly-Si), or low temperature poly-Si or can include oxide such as indium-gallium-zinc-oxide (IGZO), but embodiments of the present disclosure are not limited thereto.

The anode electrode can be provided at an opening region provided at each pixel area and can be electrically connected to the driving TFT.

A light emitting device according to an embodiment of the present disclosure can include an organic light emitting device layer formed over an anode electrode. The organic light emitting device layer can be implemented to emit light having the same color (for example, white light) for each pixel, or can be implemented to emit light having a different color (for example, red light, green light, or blue light) for each pixel. A cathode electrode (or a common electrode) can be connected to the organic light emitting device layer provided in each pixel area in common. For example, the organic light emitting device layer can have a stack structure including a single structure or two or more structures including the same color for each pixel. As another embodiment of the present disclosure, the organic light emitting device layer can have a stack structure including two or more structures including one or more different colors for each pixel. The two or more structures including the one or more different colors can be configured with one or more of blue, red, yellow-green, and green or a combination thereof, but embodiments of the present disclosure are not limited thereto. An example of the combination can include blue and red, red and yellow-green, red and green, red/yellow-green/green, or the like, but embodiments of the present disclosure are not limited thereto. Also, regardless of a stack order thereof, the present disclosure can be applied. The stack structure including two or more structures having the same color or one or more different colors can further include a charge generating layer between the two or more structures. The charge generating layer can have a PN junction structure and can include an N-type charge generating layer and a P-type charge generating layer.

According to another embodiment of the present disclosure, the light emitting device can include a micro light emitting diode device electrically connected to each of an anode electrode and a cathode electrode. The micro light emitting diode device can be a light emitting diode implemented as an integrated circuit (IC) or chip type. The micro light emitting diode device can include a first terminal electrically connected to the anode electrode and a second terminal electrically connected to the cathode electrode. The cathode electrode can be connected to the second terminal of the micro light emitting diode device provided in each pixel area in common.

An encapsulation part can be formed on the substrate to surround the pixel array portion, thereby preventing oxygen or water from penetrating into the light emitting device layer of the pixel array portion. The encapsulation part according to an embodiment of the present disclosure can be formed in a multi-layer structure where an organic material layer and an inorganic material layer are alternately stacked, but the term is not limited thereto. The inorganic material layer can prevent oxygen or water from penetrating into the light emitting device layer of the pixel array portion. The organic material layer can be formed to have a thickness which is relatively thicker than the inorganic material layer, to cover particles occurring in a manufacturing process. For example, the encapsulation part can include a first inorganic layer, an organic layer on the first inorganic layer, and a second inorganic layer on the organic layer. The organic layer can be a particle cover layer. The touch panel can be disposed at the encapsulation part, or can be disposed at a rear surface of the pixel array portion.

The display panel according to an embodiment of the present disclosure can include a first substrate, a second substrate, and a liquid crystal layer. The first substrate can be an upper substrate or a thin film transistor (TFT) array substrate. For example, the first substrate can include a pixel array (or a display part or a display area) including a plurality of pixels which are respectively provided in a plurality of pixel areas defined by intersections between a plurality of gate lines and/or a plurality of data lines. Each of the plurality of pixels can include a TFT connected to a gate line and/or a data line, a pixel electrode connected to the TFT, and a common electrode which is provided adjacent to the pixel electrode and is supplied with a common voltage.

The first substrate can further include a pad part provided at a first periphery (or a first non-display part) and a gate driving circuit provided at a second periphery (or a second non-display part).

The pad part can supply a signal, supplied from the outside, to the pixel array and/or the gate driving circuit. For example, the pad part can include a plurality of data pads connected to a plurality of data lines through a plurality of data link lines and/or a plurality of gate input pads connected to the gate driving circuit through a gate control signal line. For example, a size of the first substrate can be greater than the second substrate, but embodiments of the present disclosure are not limited thereto.

The gate driving circuit (or a scan driving circuit) according to an embodiment of the present disclosure can be embedded (or integrated) into a second periphery of the first substrate to be connected to the plurality of gate lines. For example, the gate driving circuit can be implemented with a shift register including a transistor, which is formed through the same process as the TFT provided at the pixel area. According to another embodiment of the present disclosure, the gate driving circuit can be implemented as an integrated circuit (IC) and can be provided at a panel driving circuit, without being embedded into the first substrate.

The second substrate can be a lower substrate or a color filter array substrate. For example, the second substrate can include a pixel pattern (or a pixel defining pattern or a black matrix) including an opening area overlapping with the pixel area formed in the first substrate, and a color filter layer formed at the opening area. The second substrate can have a size which is smaller than the first substrate, but embodiments of the present disclosure are not limited thereto. For example, the second substrate can overlap a remaining portion, other than the first periphery, of the upper substrate. The second substrate can be attached to a remaining portion, other than the first periphery, of the first substrate with a liquid crystal layer therebetween using a sealant.

The liquid crystal layer can be disposed between the first substrate and the second substrate. The liquid crystal layer can include a liquid crystal including liquid crystal molecules where an alignment direction thereof is changed based on an electric field generated by the common voltage and a data voltage applied to a pixel electrode for each pixel.

A second polarization member can be attached on a bottom surface of the second substrate and can polarize light which is incident from the backlight and travels to the liquid crystal layer. A first polarization member can be attached on a top surface of the first substrate and can polarize light which passes through the first substrate and is output to the outside.

The display panel according to an embodiment of the present disclosure can drive the liquid crystal layer based on an electric field which is generated in each pixel by the data voltage and the common voltage applied to each pixel, and thus, can display an image based on light passing through the liquid crystal layer.

In display panel according to another embodiment of the present disclosure, the first substrate can be implemented as the color filter array substrate, and the second substrate can be implemented as the TFT array substrate. For example, the display panel according to another embodiment of the present disclosure can have a type where an upper portion and a lower portion of the display panel according to an embodiment of the present disclosure are reversed therebetween. For example, a pad part of the display panel according to another embodiment of the present disclosure can be covered by a separate mechanism or structure.

The display panel according to an embodiment of the present disclosure can include a bending portion that can be bent or curved to have a curved shape or a certain curvature radius.

The bending portion of the display panel can be in at least one or more of one periphery and the other periphery of the display panel, which are parallel to each other. The one periphery and/or the other periphery, where the bending portion is implemented, of the display panel can include only the non-display area, or can include a periphery of the display area and the non-display area. The display panel including the bending portion implemented by bending of the non-display area can have a one-side bezel bending structure or a both-side bezel bending structure. Also, the display panel including the bending portion implemented by bending of the periphery of the display area and the non-display area can have a one-side active bending structure or a both-side active bending structure.

According to another embodiment of the present disclosure, the vibration member 100 can include one or more of metal, wood, rubber, plastic, carbon, glass, cloth, fiber, paper, mirror, and leather, but embodiments of the present disclosure are not limited thereto. For example, the paper can be a cone paper for speakers. For example, the cone paper can be pulp or foam plastic, but embodiments of the present disclosure are not limited thereto.

According to another embodiment of the present disclosure, the vibration member 100 can include one or more of a display panel including pixels displaying an image, a screen panel on which an image is projected from a display apparatus, a lighting panel, a signage panel, a vehicular (or car or automotive) interior material, a vehicular glass window, a vehicular exterior material, a ceiling material of a building, an interior material of a building, a glass window of a building, and mirror, but embodiments of the present disclosure are not limited thereto. For example, the display panel can be a curved display panel or all types of display panels such as a liquid crystal display panel, an organic light emitting display panel, a quantum dot light emitting display panel, a micro light emitting diode display panel, and an electrophoresis display panel. For example, the display panel can be a flexible display panel. For example, the flexible display panel can be a flexible light emitting display panel, a flexible electrophoresis display panel, a flexible electro-wetting display panel, a flexible micro light emitting diode display panel, or a flexible quantum dot light emitting display panel, but embodiments of the present disclosure are not limited thereto. For example, a lighting panel (or a non-display panel) can be a light emitting diode lighting panel (or apparatus), an organic light emitting diode lighting panel (or apparatus), or an inorganic light emitting diode lighting panel (or apparatus), but embodiments of the present disclosure are not limited thereto.

The vibration apparatus 200 can vibrate the vibration member 100. For example, the vibration apparatus 200 can be implemented at a rear surface of the vibration member 100. For example, the vibration apparatus 200 can vibrate the vibration member 100 at the rear surface of the vibration member 100, and thus, can provide a user with a sound S and/or a haptic feedback, based on a vibration of the vibration member 100. In other words, vibration apparatus 200 can vibrate or move a display screen so that sound is output directedly towards the viewer. For example, the vibration member 100 can output the sound S, based on a vibration of the vibration apparatus 200. The vibration apparatus 200 can output the sound S by using the vibration member 100 as a vibration plate. For example, the vibration apparatus 200 can output the sound S in a forward (or front) direction FD) of the vibration member 100 by using the vibration member 100 as a vibration plate. For example, the vibration apparatus 200 can generate the sound S so that the sound travels in a forward (or front) direction FD of the display panel or the vibration member 100. The vibration apparatus 200 can vibrate the vibration member 100 to output the sound S. For example, the vibration apparatus 200 can directly vibrate the vibration member 100 to output the sound S in the forward (or front) direction FD of the apparatus.

According to an embodiment of the present disclosure, the vibration apparatus 200 can vibrate based on a vibration driving signal synchronized with an image displayed by the display panel corresponding to the vibration member 100 to vibrate the display panel. According to an embodiment of the present disclosure, the vibration apparatus 200 can vibrate based on a haptic feedback signal (or a tactile feedback signal) synchronized with a user touch applied to a touch panel (or a touch sensor layer) disposed in or embedded into the display panel 100 to vibrate the display panel. Accordingly, the display panel can vibrate based on a vibration of the vibration apparatus 200 to provide a user (or a viewer) with at least one of the sound S and the haptic feedback.

The vibration apparatus 200 according to an embodiment of the present disclosure can pass through the supporting member 300 and can contact the rear surface of the vibration member 100, and thus, can directly vibrate the vibration member 100. For example, an upper portion of the vibration apparatus 200 can be inserted (or accommodated) into through holes 315 and 335 (or a first hole) provided in the supporting member 300 and can be connected with the rear surface of the vibration member 100, and a lower portion of the vibration apparatus 200 can be supported by (or fixed to) the supporting member 300. For example, the vibration apparatus 200 can vibrate by using the supporting member 300 as a supporter to vibrate the vibration member 100, and the vibration member 100 can output the sound S in the forward direction FD. For example, the vibration apparatus 200 can be a transducer, an actuator, a vibrator, a piezoelectric element, or an exciter, but the terms are not limited thereto.

The apparatus according to an embodiment of the present disclosure can further include a heat dissipation member 150 which is disposed at the rear surface of the vibration member 100.

The heat dissipation member 150 can be disposed between the vibration member 100 and the vibration apparatus 200. The heat dissipation member 150 can be provided between the vibration member 100 and the vibration apparatus 200 and can reduce or decrease heat occurring in the vibration apparatus 200. For example, the heat dissipation member 150 can prevent or minimize the transfer of heat, occurring in the vibration apparatus 200, to the vibration member 100. The heat dissipation member 150 can limit the local temperature rising of the vibration member 100 caused by heat occurring in the vibration apparatus 200. For example, the heat dissipation member 150 can prevent or minimize the transfer of heat, occurring in the vibration apparatus 200, to the display panel which is the vibration member 100. In this situation, the heat dissipation member 150 can limit the temperature of the display panel or the vibration member 100 from rising or getting too hot from heat which occurs due to an operation of the vibration apparatus 200 when the display panel or the vibration member 100 outputs a sound, and thus, can prevent an image quality defect of the display panel or the vibration member 100 from occurring due to a rapid temperature difference in a local region of the display panel or the vibration member 100 overlapping the vibration apparatus 200.

According to an embodiment of the present disclosure, the heat dissipation member 150 can be disposed on the rear surface of the display panel or the vibration member 100 by using an adhesive member. The heat dissipation member 150 can be configured to cover the vibration apparatus 200 or to have a size which is greater than that of the vibration apparatus 200. The heat dissipation member 150 can have a polygonal plate shape or a circular plate shape having a certain thickness, but embodiments of the present disclosure are not limited thereto. For example, the heat dissipation member 150 can be a heat dissipation sheet or a heat dissipation tape including a metal material, having high heat conductivity, such as aluminum (Al), copper (Cu), or silver (Ag) or an alloy thereof, but embodiments of the present disclosure are not limited thereto. Accordingly, because the apparatus according to an embodiment of the present disclosure further includes the heat dissipation member 150, an adverse effect of heat occurring when the vibration apparatus 200 is vibrating can be reduced on the display panel or the vibration member 100, and the image quality of the display panel can be improved.

The apparatus according to an embodiment of the present disclosure can further include a supporting member 300 which is disposed at a rear surface (or a backside surface) of the vibration member 100.

The supporting member 300 can be disposed at the rear surface of the vibration member 100 or the display panel. For example, the supporting member 300 can cover the rear surface of the vibration member 100 or the display panel. For example, the supporting member 300 can cover the whole rear surface of the vibration member 100 or the display panel with a gap space GS (or an internal space) therebetween. The supporting member 300 can be apart from a rearmost surface of the vibration member 100 or the display panel with the gap space GS therebetween, or can be apart from the vibration apparatus 200. For example, the gap space GS can be referred to as an internal space, an air gap, a vibration space, a resonance chamber or a sound sounding box, but the terms are not limited thereto.

For example, the supporting member 300 can include one or more materials of a glass material, a metal material, and a plastic material. For example, the supporting member 300 can be a rear structure material, a set structure material, a supporting structure material, a supporting cover, a rear member, a case, or a housing, but the terms are not limited thereto. The supporting member 300 can be referred to as other terms, such as a cover bottom, a plate bottom, a back cover, a base frame, a metal frame, a metal chassis, a chassis base, or an m-chassis. For example, the supporting member 300 can be implemented as an arbitrary type frame or a plate structure material each disposed at the rear surface of the vibration member 100.

An edge or a sharp corner of the supporting member 300 can have an inclined shape or a curved shape through a chamfer process or a corner rounding process. For example, the glass material of the supporting member 300 can be sapphire glass. In another embodiment of the present disclosure, the supporting member 300 including the metal material can include one or more materials of aluminum (Al), an Al alloy, magnesium (Mg), a Mg alloy, and an iron (Fe)—nickel (Ni) alloy.

The supporting member 300 according to an embodiment of the present disclosure can include the through holes 315 and 335 (or the first hole) into which the vibration apparatus 200 is inserted (or accommodated). For example, the through holes 315 and 335 can be punched to have a circular or polygonal shape in a predetermined partial region of the supporting member 300 in a thickness direction Z of the supporting member 300, so that the vibration apparatus 200 is inserted (or accommodated) therein. Also, the through holes 315 and 335 can form a notched area (e.g., a stepped portion) for holding or securing the vibration apparatus 200 in place.

According to an embodiment of the present disclosure, the through holes 315 and 335 (or the first hole) can be provided for decreasing an air pressure of the gap space GS (or the internal space) between the vibration member 100 and the supporting member 300. For example, the through holes 315 and 335 can provide a path into which the vibration apparatus 200 can be inserted (or accommodated) and can provide a path which enables the gap space GS between the vibration member 100 and the supporting member 300 to be connected or communicate with the outside. In this situation, the vibration apparatus 200 can include an air penetration hole (or a second hole) which is formed in a portion overlapping the through holes 315 and 335. For example, the air penetration hole of the vibration apparatus 200 can be formed to pass through or vertically pass through a portion, overlapping each of the through holes 315 and 335, of the vibration apparatus 200. Therefore, the gap space GS between the vibration member 100 and the supporting member 300 or an inner portion of the vibration apparatus 200 can be connected or communicate with the outside through the through holes 315 and 335 of the supporting member 300 and the air penetration hole of the vibration apparatus 200, and thus, an air pressure of the gap space GS between the vibration member 100 and the supporting member 300 or an air pressure of the inner portion of the vibration apparatus 200 can be reduced.

The supporting member 300 according to an embodiment of the present disclosure can include a first supporting member 310 and a second supporting member 330.

The first supporting member 310 can be disposed between the second supporting member 330 and the rear surface of the vibration member 100 or the display panel. For example, the first supporting member 310 can be disposed between a rear edge of the vibration member 100 or the display panel and a front edge portion of the second supporting member 330. The first supporting member 310 can support one or more of an edge portion of the vibration member 100 or the display panel and an edge portion of the second supporting member 330. In another embodiment of the present disclosure, the first supporting member 310 can cover the rear surface of the vibration member 100 or the display panel. For example, the first supporting member 310 can cover the whole rear surface of the vibration member 100 or the display panel. For example, the first supporting member 310 can be a member which covers the whole rear surface of the vibration member 100 or the display panel. For example, the first supporting member 310 can include one or more materials of a glass material, a metal material, and a plastic material. For example, the first supporting member 310 can be an inner plate, a first rear structure material, a first supporting structure material, a first supporting cover, a first back cover, a first rear member, an internal plate, or an internal cover, but the terms are not limited thereto. For example, the first supporting member 310 can be omitted.

The first supporting member 310 can be apart from a rearmost surface of the vibration member 100 with the gap space GS therebetween. The first supporting member 310 can support or fix the vibration apparatus 200. For example, the gap space GS can be referred to as an internal space, an air gap, a vibration space, a resonance chamber, or a sound sounding box, but the terms are not limited thereto.

The second supporting member 330 can be disposed at a rear surface of the first supporting member 310. The second supporting member 330 can be a member which covers the whole rear surface of the vibration member 100 or the display panel. For example, the second supporting member 330 can include one or more materials of a glass material, a metal material, and a plastic material. For example, the second supporting member 330 can be an outer plate, a rear plate, a back plate, a back cover, a rear cover, a second rear structure material, a second supporting structure material, a second supporting cover, a second back cover, a second rear member, an external plate, or an external cover, but the terms are not limited thereto.

According to an embodiment of the present disclosure, the first supporting member 310 and the second supporting member 330 can each include through holes 315 and 335 (or a first hole) into which the vibration apparatus 200 is inserted (or accommodated). For example, the through holes

315 and 335 can be punched, cut, or drilled to have a circular or polygonal shape in a predetermined partial region of each of the first supporting member 310 and the second supporting member 330 in a thickness direction Z of the first supporting member 310 and the second supporting member 330, so that the vibration apparatus 200 is inserted (or accommodated) therein. For example, the first supporting member 310 can include a first through hole 315, and the second supporting member 330 can include a second through hole 335. For example, the first through hole 315 of the first supporting member 310 can have the same size as that of the second through hole 335 of the second supporting member 330, or can have a size which is less than that of the second through hole 335 of the second supporting member 330. For example, the first through hole 315 of the first supporting member 310 can have a size which is less than that of the second through hole 335 of the second supporting member 330, and a portion of the rear surface of the first supporting member 310 can be exposed through the second through hole 335 of the second supporting member 330. In this situation, the vibration apparatus 200 can be fixed to the rear surface of the first supporting member 310 exposed by the second through hole 335 of the second supporting member 330. For example, an upper portion (or one side) of the vibration apparatus 200 can pass through the through holes 315 and 335 of the first supporting member 310 and the second supporting member 330 and can contact the rear surface of the vibration member 330, and a lower portion (or the other side) of the vibration apparatus 200 can be fixed to the rear surface of the first supporting member 310 exposed by the second through hole 335 of the second supporting member 330.

According to an embodiment of the present disclosure, the first supporting member 310 and the second supporting member 330 can include different materials. For example, the first supporting member 310 can include a metal material such as an Al material which is good in heat conductivity, and the second supporting member 330 can include a glass material, but embodiments of the present disclosure are not limited thereto. For example, the first supporting member 310 and the second supporting member 330 can also be made of materials that can conduct heat from the vibration apparatus 200 and away from the vibration member 100 or the display panel.

According to an embodiment of the present disclosure, the first supporting member 310 and the second supporting member 330 can have the same thickness or different thicknesses. For example, the first supporting member 310 can have a thickness which is relatively thinner than the second supporting member 330, but embodiments of the present disclosure are not limited thereto.

The supporting member 300 according to an embodiment of the present disclosure can further include a connection member 350.

The connection member 350 can be disposed between the first supporting member 310 and the second supporting member 330. For example, the first supporting member 310 and the second supporting member 330 can be coupled to or connected with each other by the connection member 350. For example, the connection member 350 can be an adhesive resin, a double-sided tape, or a double-sided adhesive foam pad, but embodiments of the present disclosure are not limited thereto. For example, the connection member 350 can have elasticity for absorbing an impact, but embodiments of the present disclosure are not limited thereto. For example, the connection member 350 can be disposed in a whole region between the first supporting member 310 and the second supporting member 350. According to another embodiment of the present disclosure, the connection member 350 can be formed in a mesh structure having an air gap between the first supporting member 310 and the second supporting member 330.

The apparatus according to an embodiment of the present disclosure can further include a middle frame 400. The middle frame 400 can be disposed between a rear edge of the vibration member 100 or the display panel and a front edge of the supporting member 300. The middle frame 400 can support one or more of an edge portion of the vibration member 100 or the display panel and an edge portion of the supporting member 300. The middle frame 400 can surround one or more of lateral surfaces of each of the vibration member 100 or the display panel and the supporting member 300. The middle frame 400 can provide a gap space GS between the vibration member 100 or the display panel and the supporting member 300. The middle frame 400 can be referred to as a middle cabinet, a middle cover, a middle chassis, a connection member, a frame, a frame member, a middle member, or a side cover member, but the terms are not limited thereto.

The middle frame 400 according to an embodiment of the present disclosure can include a first supporting portion 410 and a second supporting portion 430. For example, the first supporting portion 410 can be a supporting portion, but the terms are not limited thereto. For example, the second supporting portion 430 can be a sidewall portion, but the terms are not limited thereto. The first supporting portion 410 and the second supporting portion 430 can form one or more stepped portions.

The first supporting portion 410 can be disposed between the rear edge of the vibration member 100 or the display panel and the front edge of the supporting member 300, and thus, can provide a gap space GS between the vibration member 100 or the display panel and the supporting member 300. A front surface of the first supporting portion 410 can be coupled to or connected with the rear edge portion of the vibration member 100 or the display panel by a first adhesive member 401. A rear surface of the first supporting portion 410 can be coupled to the front edge of the supporting member 300 by a second adhesive member 403. For example, the first supporting portion 410 can have a single tetragonal picture frame structure, or can include a picture frame structure having a plurality of division bar shapes, but embodiments of the present disclosure are not limited thereto.

The second supporting portion 430 can be arranged in parallel with the thickness direction Z of the apparatus. For example, the second supporting portion 430 can be vertically coupled to an outer surface of the first supporting part 410 in parallel with the thickness direction Z of the apparatus. The second supporting portion 430 can surround one or more of an outer surface of the vibration member 100 and an outer surface of the supporting member 300, thereby protecting the outer surface of each of the vibration member 100 and the supporting member 300. The first supporting portion 410 can protrude from an inner surface of the second supporting portion 430 to the gap space GS between the vibration member 100 and the supporting member 300 to form one or more stepped portions or support ledges.

The apparatus according to an embodiment of the present disclosure can include a panel connection member (or a connection member) instead of the middle frame 400.

The panel connection member can be disposed between a rear edge portion of the vibration member 100 and a front edge portion of the supporting member 300, and thus, can provide the gap space GS between the vibration member 100 and the supporting member 300. For example, the panel connection member can be implemented as a double-sided tape, a single-sided tape, or a double-sided adhesive foam pad, but embodiments of the present disclosure are not limited thereto. For example, an adhesive layer of the panel connection member can include epoxy, acryl, silicone, or urethane, but embodiments of the present disclosure are not limited thereto. For example, the adhesive layer of the panel connection member can include a urethane-based material (or substance) having a relatively ductile characteristic among acryl and urethane, to minimize the transfer of a vibration of the vibration member 100 to the supporting member 300. Accordingly, a vibration of the vibration member 100 transferred to the supporting member 300 can be minimized.

In the apparatus according to an embodiment of the present disclosure, when the apparatus includes the panel connection member instead of the middle frame 400, the supporting member 300 can include a bending sidewall which is bent from one side (or an end) of the second supporting member 330 and surrounds one or more of outer surfaces (or outer sidewalls) of the first supporting member 310, the panel connection member, and the vibration member 100. The bending sidewall according to an embodiment of the present disclosure can have a single sidewall structure or a hemming structure. The hemming structure can denote a structure where ends of an arbitrary member is bent in a curved shape to overlap each other, or are spaced apart from each other in parallel. For example, in order to enhance a sense of beauty in design, the bending sidewall can include a first bending sidewall, which is bent from one side (or an end) of the second supporting member 330, and a second bending sidewall which is bent from the first bending sidewall to a region between the first bending sidewall and the outer surface of the vibration member 100. The second bending sidewall can be apart from an inner surface of the first bending sidewall, to decrease the transfer of an external impact to the outer surface of the vibration member 100 in a lateral direction or a contact between the outer surface of the vibration member 100 and the inner surface of the first bending sidewall. Accordingly, the second bending sidewall can decrease the transfer of the external impact to the outer surface of the vibration member 100 in the lateral direction or a contact between the outer surface of the vibration member 100 and the inner surface of the first bending sidewall.

According to another embodiment of the present disclosure, the middle frame 400 can be omitted in the apparatus according to an embodiment of the present disclosure. The panel connection member or an adhesive can be provided instead of the middle frame 400. According to another embodiment of the present disclosure, a partition can be provided instead of the middle frame 400.

Figure 3:
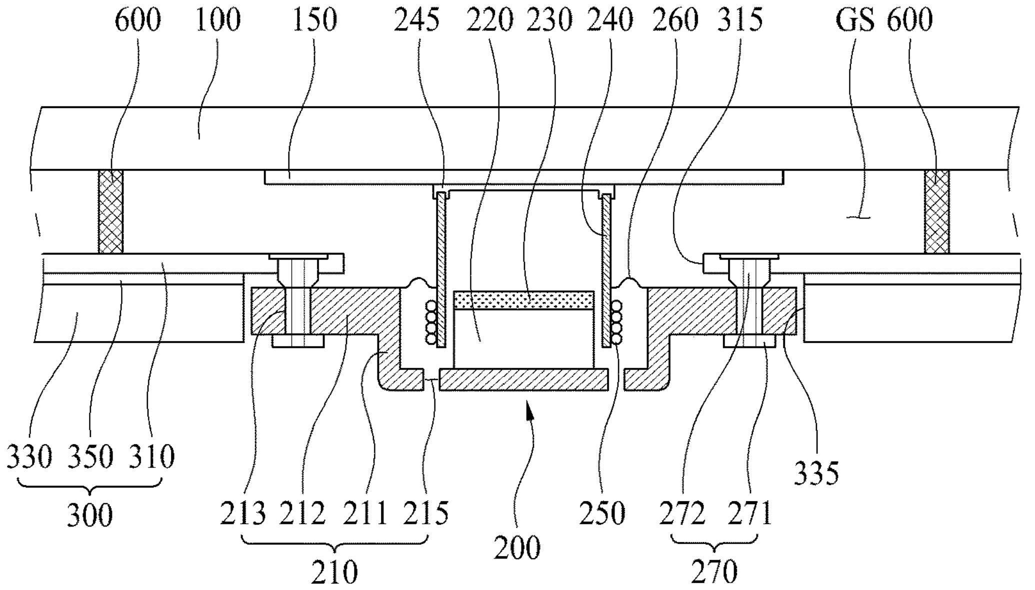
FIG. 3 illustrates a vibration apparatus according to an embodiment of the present disclosure.

FIG. 3 illustrates a vibration apparatus 200 according to an embodiment of the present disclosure.

Referring to FIG. 3, the vibration apparatus 200 according to an embodiment of the present disclosure can include a frame 210, a magnet 220, a center pole 230, a bobbin 240, and a coil 250.

The frame 210 can be fixed to a supporting member 300 to overlap with through holes 315 and 335 (or a first hole) of the supporting member 300 and can support the magnet 220. The frame 210 can accommodate the magnet 220, the center pole 230, the bobbin 240, and the coil 250. For example, the magnet 220 can be disposed on the frame 210. For example, the center pole 230 can be disposed on the frame 210. For example, the frame 210 can include a first frame, accommodating the magnet 220, the center pole 230, the bobbin 240, and the coil 250, and a second frame 212 which protrudes from an edge of the first frame 211. The first frame 211 and the second frame 212 can be provided as one body. For example, the first frame 211 and the second frame 212 can include a material such as iron (Fe), but embodiments of the present disclosure are not limited thereto. The first frame 211 and the second frame 212 can be referred to the other terms such as a yoke, but the terms are not limited thereto.

The first frame 211 can accommodate the magnet 220, the center pole 230, the bobbin 240, and the coil 250. For example, an inner portion of the first frame 211 can have a circular pillar shape, an oval pillar shape, or a cylinder shape. The magnet 220 can be disposed on the first frame 211, and the center pole 230 can be disposed on the magnet 220. The first frame 211 can support the magnet 220 and the center pole 230. The first frame 211 can be provided to surround the magnet 220 and the center pole 230 on the first frame 211 and the bobbin 240 and the coil 250 disposed around the center pole 230. For example, the coil 250 can be wound around an outer portion of the bobbin 240.

According to an embodiment of the present disclosure, the first frame 211 can further include at least one air penetration hole 215 (or second hole).

The at least one air penetration hole 215 (or second hole) can provide a path which enables an inner portion of the first frame 211, into which the bobbin 240 and the coil 250 are accommodated, to be connected or communicate with the outside. For example, the at least one air penetration hole 215 can be formed to pass through or vertically pass through the first frame 211. The at least one air penetration hole 215 (or second hole) can be formed in a portion, overlapping with each of the through holes 315 and 335 (or first hole), of the supporting member 300. For example, the at least one air penetration hole 215 can be formed to pass through or vertically pass through the first frame 211 overlapping with the through holes 315 and 335 of the supporting member 300. Therefore, the gap space GS (or internal space) between the vibration member 100 and the supporting member 300 or the inner portion of the first frame 211 can communicate with the outside through the through holes 315 and 335 of the supporting member 300. For example, the gap space GS (or internal space) between the vibration member 100 and the supporting member 300 or the inner portion of the first frame 211 can communicate with the outside through the through holes 315 and 335 of the supporting member 300. For example, the at least one air penetration hole 215 can connect or communicate the gap space GS between the vibration member 100 and the supporting member 300 with the outside through the through holes 315 and 335 of the supporting member 300.

The at least one air penetration hole 215 (or second hole) can be configured to discharge heat (e.g., expel hot air), occurring in the bobbin 240 and the coil 250 accommodated into the first frame 211, to the outside. The at least one air penetration hole 215 can be provided in a portion overlapping with each of the bobbin 240 and the coil 250 accommodated into the first frame 211. For example, the at least one air penetration hole 215 can be formed to pass through or vertically pass through the portion overlapping with each of the bobbin 240 and the coil 250. The at least one air penetration holes 215 can be arranged at a certain interval. For example, the at least one air penetration holes 215 can be arranged at a certain interval in a circumference direction of each of the bobbin 240 and the coil 250 accommodated into the first frame 211. A size (or diameter) of each of the at least one air penetration holes 215 can be greater than or equal to a thickness of each of the bobbin 240 and the coil 250. However, embodiments of the present disclosure are not limited to the shape or arrangement of the at least one air penetration holes 215.

The second frame 212 can be formed to protrude from an edge of the first frame 211. The second frame 212 can be provided as one body with the first frame 211. For example, the second frame 212 can have a ring shape which surrounds the first frame 211. A coupling portion 213 fixed to the supporting member 300 can be formed at a portion of the second frame 212. The second frame 212 can be coupled to the supporting member 300 by the connection member 270 fastened to the coupling portion 213. For example, the connection member 270 can include a screw 271 and a nut 272. The nut 272 of the connection member 270 can be fixed to the supporting member 300. For example, the nut 272 can be fixed to the first supporting member 310. A portion of a rear surface of the first supporting member 310 can be exposed through a second through hole 335 of the second supporting member 330, and the nut 272 can be fixed to the rear surface of the first supporting member 310 exposed through the second through hole 335 of the second supporting member 330. The screw 721 of the connection member 270 can be fastened to the nut 272 fixed to the first supporting member 310 through the coupling portion 213, and thus, can couple the second frame 212 to the first supporting member 310. For example, the nut 272 can be a self-clinching nut. Accordingly, the vibration apparatus 200 can be fixed to the supporting member 300. For example, the self-clinching nut can be a PEM® nut, but embodiments of the present disclosure are not limited thereto.

The magnet 220 can be disposed on the frame 210. For example, the magnet 220 can be disposed on the first frame 211 of the frame 210. A lower end of the magnet 220 can be supported by the first frame 211, and a periphery of the magnet 220 can be surrounded by the first frame 211. The magnet 220 can be disposed at a center of the inner portion of the first frame 211, and the at least one air penetration hole 215 spaced apart from the magnet 220 can be formed therein. The at least one air penetration holes 215 can be formed so that they are spaced apart from one another by a certain interval along the periphery of the magnet 220. The at least one air penetration hole 215 can be formed not to overlap with the magnet 220.

The magnet 220 can be a permanent magnet having a ring shape, a cylindrical shape, or an oval shape. The magnet 532 can be implemented with a sintered magnet such as barium ferrite, and a material of the magnet 532 can include one or more of $Fe_2O_3$, $BaCO_3$, a neodymium magnet, strontium ferrite ($Fe_{12}O_{19}Sr$) with improved magnet component, an alloy cast magnet including Al, nickel (Ni), and cobalt (Co). For example, the neodymium magnet can be neodymium-iron-boron (Nd—Fe—B).

The center pole 230 can be disposed on the magnet 220. The center pole 230 can be referred to as pole pieces. In another embodiment, the pole pieces can be further provided on the center pole 230.

The bobbin 240 can surround a periphery of the magnet 220. For example, the bobbin 240 can surround the magnet 220 and the center pole 230. The bobbin 240 can be disposed on the frame 210. For example, the bobbin 240 can be disposed on the first frame 211 of the frame 210. The bobbin 240 can be accommodated into the first frame 211. The bobbin 240 can be surrounded by the first frame 211. For example, the bobbin 240 can be disposed between the magnet 220 and the first frame 211.

The bobbin 240 can be attached on the rear surface of the vibration member 100. The bobbin 240 can be attached on the rear surface of the vibration member 100 through a bobbin ring 245. For example, when a current or a voice signal for generating a sound is applied to the coil 250 wound around an outer circumference surface of the bobbin 240, a whole portion of the bobbin 534 can move upward and downward according to Fleming's left-hand rule based on an application magnetic field generated around the coil 535 and an external magnetic field generated around the magnet 220. For example, the bobbin 240 can vibrate the vibration member 100 by using the bobbin ring 245. Also, the vibration member 100 can receive a vibration from the bobbin 240 or the bobbin ring 245 to generate a sound or a sound wave, and the generated sound or sound wave can be output in a forward direction of the vibration member 100 (e.g., output sound directly toward a viewer).

The bobbin 240 can include a material through which a magnet flux passes and which is low in heat conductivity. For example, the bobbin 240 can be implemented as a ring-shaped (or cylindrical or oval) structure material which includes a material obtained by processing pulp or paper, aluminum (Al), magnesium (Mg), an Al alloy, a Mg alloy, synthetic resin such as polypropylene, or polyamide-based fiber, but embodiments of the present disclosure are not limited thereto.

The coil 250 can be wound around an outer circumference surface of the bobbin 240. The coil 250 can be wound around the outer circumference surface of the bobbin 240 and can surround the magnet 220 with being apart therefrom. For example, the coil 250 can be wound around the outer circumference surface of the bobbin 240 and can surround the magnet 220 while being spaced apart from the magnet 220, and thus, can be supplied with a current or a voice signal, used to generate a sound, from the outside. The coil 250 can be referred to as a voice coil. For example, the bobbin 240 and the coil 250 can be referred to as a voice coil. The coil 250 can be wound around a certain region of the bobbin 240. For example, the coil 250 can wound around a lower region of the bobbin 240. The coil 250 can be wound around a lower outer circumference surface of the bobbin 240, and the current or the voice signal for generating a sound can be applied from the outside to the coil 250. For example, when the current or the voice signal is applied to the coil 250, the bobbin 402 can be guided according to Fleming's left-hand rule based on an application magnetic field generated around the coil 250 and a magnetic field generated around the magnet 220 to vibrate. For example, a magnet flux generated by a magnetic field can flow along a closed loop which is connected with the first frame 211, the magnet 220, the center pole 230, and the coil 250. Accordingly, the bobbin 240 can be guided by the damper 260 to vibrate and can transfer a vibration to the vibration member 100.

The damper 260 can be disposed between the first frame 211 and the bobbin 240. For example, one end (or one side) of the damper 260 can be connected with the first frame 211, and the other end (or the other side) of the damper 260 can be connected with the bobbin 240. The damper 260 can be provided in a structure which is creased between the one end and the other end thereof, and thus, can be contracted and relaxed based on a vibration of the bobbin 240 and can adjust and guide a vibration of the bobbin 240, based on a rectilinear reciprocating motion. Therefore, the damper 260 can be connected between the first frame 211 and the bobbin 240, and thus, can limit a vibration distance of the bobbin 240 by using a restoring force. For example, when the bobbin 240 moves by a certain distance or more or vibrates by a certain distance or less, the bobbin 240 can be restored to an original position with the restoring force of the damper 260. For example, the damper 260 can be referred to as other term such as an edge, a spider, or a suspension, but the terms are not limited thereto.

The bobbin ring 245 can be disposed between the bobbin 240 and the vibration member 100 and can transfer a vibration of the bobbin 240 to the vibration member 100. The bobbin ring 245 can be disposed in all of the bobbin 240, but embodiments of the present disclosure are not limited thereto and the bobbin ring 245 can be disposed at a position at which the bobbin 240 is disposed. The bobbin ring 245 can be attached on the rear surface of the vibration member 100 by an adhesive member. For example, the adhesive member can be a double-sided tape, a single-sided tape, an adhesive, or a bond, but embodiments of the present disclosure are not limited thereto. For example, the bobbin ring 245 can prevent heat occurring in the bobbin 240 from being transferred to the vibration member 100 and can efficiently transfer a vibration of the bobbin 240 to the vibration member 100. For example, the bobbin ring 245 can insulate the vibration member 100 from heat generated by the vibration apparatus 200.

In the apparatus according to an embodiment of the present disclosure, a heat dissipation member 150 can be further provided at the rear surface of the vibration member 100 to further decrease or reduce heat occurring when the vibration apparatus 200 is vibrating. For example, the heat dissipation member 150 can be disposed at the rear surface of the vibration member 100 by an adhesive member. For example, the adhesive member can be a double-sided tape, a single-sided tape, an adhesive, or a bond, but embodiments of the present disclosure are not limited thereto. The heat dissipation member 150 can be provided to have a size which is greater than that of the vibration apparatus 200 or cover the vibration apparatus 200, but embodiments of the present disclosure are not limited thereto. For example, the heat dissipation member 150 can contact the bobbin 240 of the vibration apparatus 200. The heat dissipation member 150 can contact the bobbin ring 245 of the vibration apparatus 200. The heat dissipation member 150 can have a size which is greater than that of the bobbin 240 or the bobbin ring 245 of the vibration apparatus 200 contacting each other. The heat dissipation member 150 can have a polygonal plate shape, a circular plate shape, or an oval plate shape having a constant thickness, but embodiments of the present disclosure are not limited thereto. For example, the heat dissipation member 150 can be a heat dissipation sheet or a heat dissipation tape including a metal material, having high heat conductivity, such as aluminum (Al), copper (Cu), or silver (Ag) or an alloy thereof, but embodiments of the present disclosure are not limited thereto. Accordingly, because the apparatus according to an embodiment of the present disclosure further includes the heat dissipation member 150, an adverse effect of heat occurring when the vibration apparatus 200 is vibrating can be reduced on the display panel or the vibration member 100 or the image quality of the display panel.

For example, the heat dissipation member 150 can be attached on the vibration apparatus 200 by an adhesive member. The adhesive member can be a double-sided tape, a single-sided tape, an adhesive, or a bond, but embodiments of the present disclosure are not limited thereto. For example, the adhesive member can be disposed between the heat dissipation member 150 and the bobbin 240 or the bobbin ring 245.

A gap space GS (or an internal space) can be provided between the vibration member 100 and the supporting member 300. A partition member 600 providing or limiting the gap space GS can be further provided between the vibration member 100 and the supporting member 300.

The partition member 600 can provide or define the gap space GS which generates a sound when the vibration member 100 is vibrated by the vibration apparatus 200. The partition member 600 can separate the sound generated by the vibration member 100, or can separate a channel, and thus, can prevent or decrease interference of the sound. The partition member 600 can be referred to as an enclosure or a baffle, but the terms are not limited thereto.

The partition member 600 can divide or provide a gap space GS (or an internal space) corresponding to one vibration apparatus 200. For example, the partition member 600 can be provided to surround a periphery of one vibration apparatus 200. The partition member 600 can include four sides surrounding the vibration apparatus 200. For example, the partition member 600 can be implemented in a structure where the four sides are provided as one body, and thus, can be configured in a structure which seals the gap space GS between the vibration member 100 and the supporting member 300 at a periphery of the vibration apparatus 200. As another example, the partition member 600 can include a plurality of open portions which are provided at one or more of the four sides, and thus, can be configured in a structure which does not seal the gap space GS between the vibration member 100 and the supporting member 300 at the periphery of the vibration apparatus 200.

The gap space GS (or the internal space) provided or divided by the partition member 600 can be connected or communicate with the outside of a rear surface of the apparatus through the through holes 315 and 335 of the supporting member 300 and the air penetration hole 215 of the vibration apparatus 200. For example, because the gap space GS provided or divided by the partition member 600 is connected or communicates with the outside of the rear surface of the apparatus through the through holes 315 and 335 of the supporting member 300 and the air penetration hole 215 of the vibration apparatus 200, an air pressure of the gap space GS can decrease. Accordingly, an air pressure of the gap space GS can be reduced by the partition member 600, and thus, an air impedance of the gap space GS can decrease, thereby improving a sound pressure level characteristic and/or a sound characteristic of a low pitched sound band.

According to an embodiment of the present disclosure, the partition member 600 can include a material capable of absorbing a vibration or controlling a vibration. The partition member 600 can include a single-sided tape, a single-sided foam tape, a single-sided foam pad, a double-sided tape, a double-sided foam pad, or a double-sided tape, but embodiments of the present disclosure are not limited thereto. For example, the partition member 600 can include one or more materials of a silicone-based polymer, paraffin wax, a urethane-based polymer, and an acrylic polymer. For example, the partition member 600 can include a urethane-based material (or substance) having a relatively ductile characteristic among acryl and urethane, to minimize the transfer of a vibration of the vibration member 100 to the supporting member 300.

FIGS. 4 to 7 illustrate a vibration apparatus according to embodiments of the present disclosure. FIGS. 4 to 7 illustrate embodiments where a porous member is added to the apparatus described above with reference to FIG. 3. In the following description, therefore, repeated descriptions of the same elements except a porous member and relevant elements are omitted or will be briefly given below.

Figure 4:
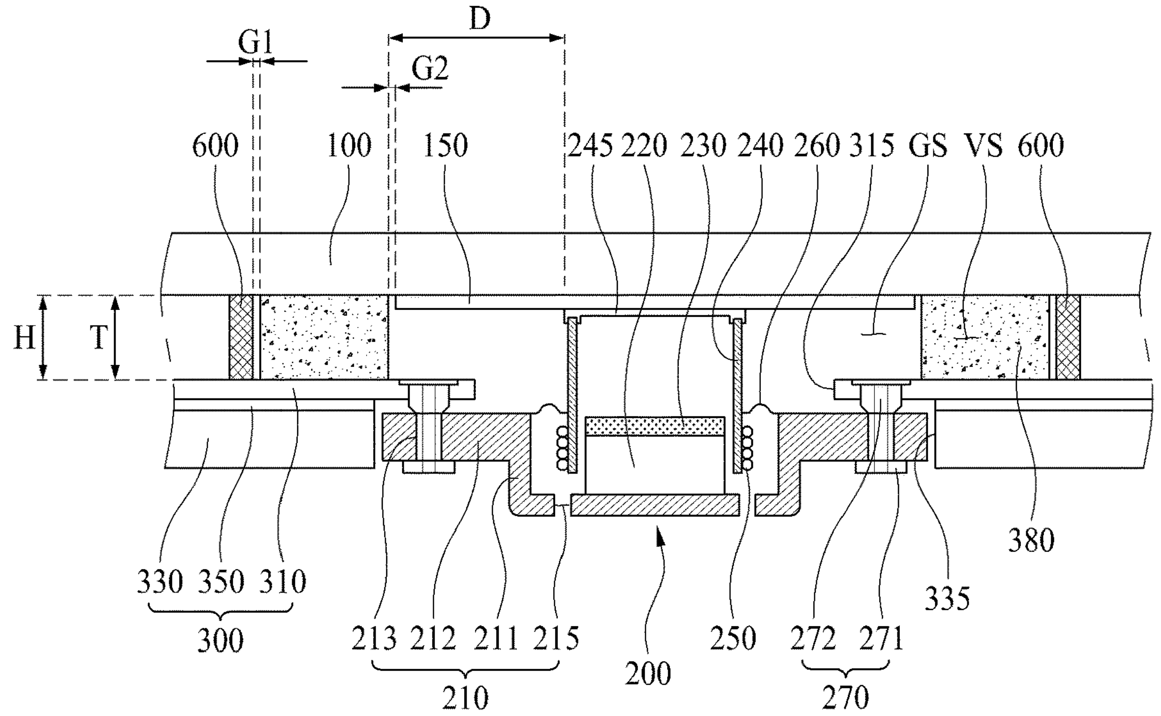
FIGS. 4 to 7 illustrate a vibration apparatus according to embodiments of the present disclosure.

Referring to FIG. 4, a vibration apparatus 200 according to an embodiment of the present disclosure can further include a porous member 380 between a vibration member 100 and a supporting member 300. For example, the porous member 380 can improve the strength and rigidity of the device while also reducing a weight of the device and increasing an air volume of a gap space within the device and improving a sound characteristic for low frequencies. Also, since the porous member 380 can increase the volume of air and improve air flow, the dissipation of internal heat can also be improved.

The porous member 380 can be disposed in a gap space GS (or an internal space) between the vibration member 100 and the supporting member 300. The porous member 380 can be disposed between a rear surface of the vibration member 100 and an upper surface of the supporting member 300. The porous member 380 can contact at least one of the rear surface of the vibration member 100 and the upper surface of the supporting member 300. The porous member 380 can contact at least one of the rear surface of the vibration member 100 and the upper surface of the supporting member 300, in the gap space GS between the vibration member 100 and the supporting member 300. For example, the porous member 380 can be attached on or coupled to the rear surface of the vibration member 100. The porous member 380 can be attached on or coupled to the rear surface of the vibration member 100 by using an adhesive member. Alternatively, the porous member 380 can be attached on or coupled to the upper surface of the supporting member 300. The porous member 380 can be attached on or coupled to the upper surface of the supporting member 300 by using an adhesive member. For example, the adhesive member can be a double-sided tape, a single-sided tape, an adhesive, or a bond, but embodiments of the present disclosure are not limited thereto. For example, an upper surface of the porous member 380 can be attached on or coupled to the rear surface of the vibration member 100, and a lower surface of the porous member 380 can be attached on or coupled to the upper surface of the supporting member 300. The upper surface of the porous member 380 can be attached on or coupled to the rear surface of the vibration member 100 by using a first adhesive member, and the lower surface of the porous member 380 can be attached on or coupled to the upper surface of the supporting member 300 by using a second adhesive member. For example, each of the first and second adhesive members can be a double-sided tape, a single-sided tape, an adhesive, or a bond, but embodiments of the present disclosure are not limited thereto.

The porous member 380 can be disposed between the vibration apparatus 200 and the partition member 600, in the gap space GS (or the internal space) between the vibration member 100 and the supporting member 300. The porous member 380 can be provided to surround the vibration apparatus 200. For example, the porous member 380 can be configured to surround a periphery of the vibration apparatus 200. The porous member 380 can be spaced apart from the vibration apparatus 200 and can be provided to surround the periphery of the vibration apparatus 200. The porous member 380 can be surrounded by the partition member 600. For example, a periphery of the porous member 380 can be surrounded by the partition member 600. The porous member 380 can be spaced apart from the partition member 600, and the periphery of the porous member 380 can be surrounded by the partition member 600.

The porous member 380 can be configured to have a uniform thickness T in the gap space GS (or the internal space) between the vibration member 100 and the supporting member 300. For example, the porous member 380 can be configured to have the thickness T which is less than or equal to a height H of the gap space GS between the vibration member 100 and the supporting member 300. The upper surface of the porous member 380 can contact the rear surface of the vibration member 100, and a lower surface of the porous member 380 can be provided to contact the upper surface of the supporting member 300. For example, the porous member 380 can be configured to have the thickness T which is equal to the height H between the rear surface of the vibration member 100 and the upper surface of the supporting member 300.

The porous member 380 can be disposed at a portion, which does not overlap with the vibration apparatus 200 and the partition member 600, in the gap space GS (or the internal space) between the vibration member 100 and the supporting member 300. For example, the porous member 380 can be disposed spaced apart from the partition member 600 by a certain interval G1, in the gap space GS between the vibration member 100 and the supporting member 300. The porous member 380 can be spaced apart from the partition member 600 by a certain interval D, in the gap space GS between the vibration member 100 and the supporting member 300. For example, the porous member 380 can be spaced apart from the bobbin 240 of the vibration apparatus 200 by the certain interval D. The porous member 380 can be spaced apart from a heat dissipation member 150 between the vibration member 100 and the vibration apparatus 200, in the gap space GS between the vibration member 100 and the supporting member 300. For example, the porous member 380 can be spaced apart from the heat dissipation member 150 by a certain interval G2. The porous member 380 can be disposed at a portion, which does not overlap with a first through hole 315, of the upper surface of the supporting member 300. For example, the porous member 380 can be spaced apart from the first through hole 315 of a first supporting member 310.

The porous member 380 can include a porous material including a plurality of pores provided therein. The porous member 380 can include a porous material having a range where a porosity rate is about 90%. For example, the porous member 380 can include one or more materials of a porous coordination polymer (PCP), a metal organic framework (MOF), zeolite, and activated carbon, but embodiments of the present disclosure are not limited thereto.

The porous member 380 can provide a porous space VS including a plurality of pores in the gap space GS (or the internal space) between the vibration member 100 and the supporting member 300. For example, the porous space VS can have a volume surrounding a periphery of the vibration apparatus 200 in the gap space GS between the vibration member 100 and the supporting member 300. The porous space VS can have a volume surrounding a periphery spaced apart from the bobbin 240 of the vibration apparatus 200 by the certain interval D, in the gap space GS between the vibration member 100 and the supporting member 300. In the porous space VS, an area contacting air per unit volume can increase based on a plurality of pores formed therein and a flow path of air flowing between the plurality of pores can increase, and thus, a volume of the gap space GS between the vibration member 100 and the supporting member 300 can be greater than a real volume. Accordingly, the porous member 380 can contribute to an increase in a volume of internal air of the gap space GS between the vibration member 100 and the supporting member 300, and an air impedance of the gap space GS between the vibration member 100 and the supporting member 300 can be reduced, thereby improving a sound pressure level characteristic and/or a sound characteristic of a low pitched sound band.

Figure 5:
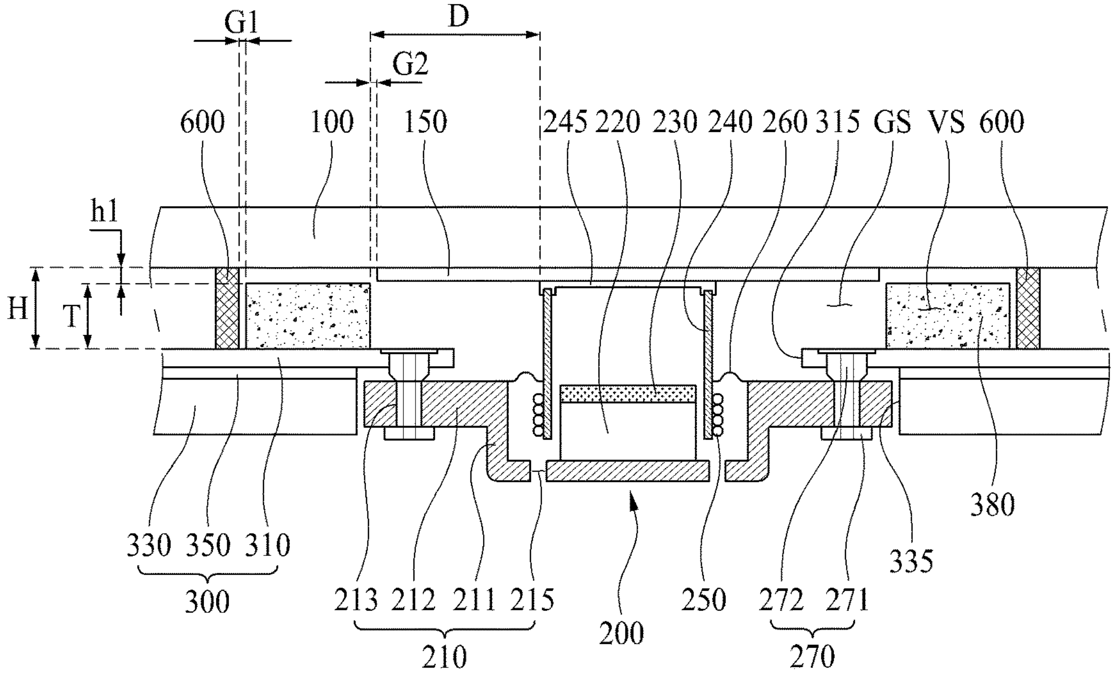

Referring to FIG. 5, a porous member 380 of a vibration apparatus 200 according to another embodiment of the present disclosure can be configured to have a uniform thickness T and spaced apart from a vibration member 100 by a certain interval h1, in a gap space GS (or an internal space) between the vibration member 100 and a supporting member 300. For example, the porous member 380 can be configured to have the thickness T which is less than or equal to a height H of the gap space GS between the vibration member 100 and the supporting member 300. The porous member 380 can be provided to contact an upper surface of the supporting member 300. The porous member 380 can be attached on or coupled to the upper surface of the supporting member 300 by using an adhesive member. For example, the adhesive member can be a double-sided tape, a single-sided tape, an adhesive, or a bond, but embodiments of the present disclosure are not limited thereto.

The porous member 380 can be disposed at a portion, which does not overlap with the vibration apparatus 200 and a partition member 600, in the gap space GS (or the internal space) between the vibration member 100 and the supporting member 300. For example, the porous member 380 can be spaced apart from the partition member 600 by a certain interval G1, in the gap space GS between the vibration member 100 and the supporting member 300. The porous member 380 can be spaced apart from the partition member 600 by a certain interval D, in the gap space GS between the vibration member 100 and the supporting member 300. For example, the porous member 380 can be spaced apart from a bobbin 240 of the vibration apparatus 200 by the certain interval D. The porous member 380 can be spaced apart from a heat dissipation member 150 between the vibration member 100 and the vibration apparatus 200, in the gap space GS between the vibration member 100 and the supporting member 300. For example, the porous member 380 can be spaced apart from the heat dissipation member 150 by a certain interval G2. The porous member 380 can be disposed at a portion, which does not overlap with a first through hole 315, of the upper surface of the supporting member 300. For example, the porous member 380 can be spaced apart from the first through hole 315 of a first supporting member 310.

The porous member 380 can include a porous material including a plurality of pores provided therein. The porous member 380 can include a porous material having a range where a porosity rate is about 90%. For example, the porous member 380 can include one or more materials of a PCP, an MOF, a foam, a sponge, zeolite, and activated carbon, but embodiments of the present disclosure are not limited thereto.

The porous member 380 can provide a porous space VS including a plurality of pores in the gap space GS (or the internal space) between the vibration member 100 and the supporting member 300. For example, the porous space VS can have a constant thickness T from the supporting member 300 in the gap space GS between the vibration member 100 and the supporting member 300 and can have a volume surrounding a periphery of the vibration apparatus 200. The porous space VS can have the constant thickness T from the upper surface of the supporting member 300 in the gap space GS between the vibration member 100 and the supporting member 300 and can have a volume surrounding a periphery apart from the bobbin 240 of the vibration apparatus 200. In the porous space VS, an area contacting air per unit volume can increase based on a plurality of pores formed therein and a flow path of air flowing between the plurality of pores can increase, and thus, a volume of the gap space GS between the vibration member 100 and the supporting member 300 can be greater than a real volume. Accordingly, the porous member 380 can contribute to an increase in a volume of internal air of the gap space GS between the vibration member 100 and the supporting member 300, and an air impedance of the gap space GS between the vibration member 100 and the supporting member 300 can be reduced, thereby improving a sound pressure level characteristic and/or a sound characteristic of a low pitched sound band.

Figure 6:
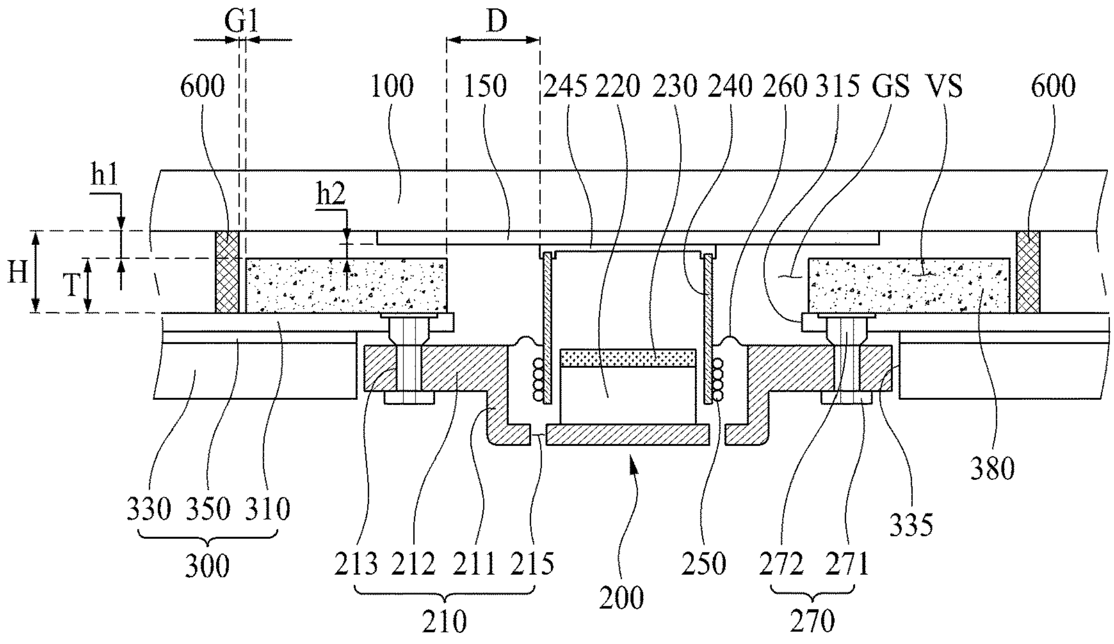

Referring to FIG. 6, a porous member 380 of a vibration apparatus 200 according to another embodiment of the present disclosure can be configured to have a uniform thickness T and spaced apart from a vibration member 100 by a certain interval h1 and spaced apart from a heat dissipation member 150 by a certain interval h2, in a gap space GS (or an internal space) between the vibration member 100 and a supporting member 300. For example, the porous member 380 can be configured to have the thickness T which is less than a height H of the gap space GS between the vibration member 100 and the supporting member 300. The porous member 380 can be provided to contact an upper surface of the supporting member 300. The porous member 380 can be attached on or coupled to the upper surface of the supporting member 300 by using an adhesive member. For example, the adhesive member can be a double-sided tape, a single-sided tape, an adhesive, or a bond, but embodiments of the present disclosure are not limited thereto.

The porous member 380 can be disposed at a portion, which does not overlap with the vibration apparatus 200 and a partition member 600, in the gap space GS (or the internal space) between the vibration member 100 and the supporting member 300. For example, the porous member 380 can be spaced apart from the partition member 600 by a certain interval G1, in the gap space GS between the vibration member 100 and the supporting member 300. The porous member 380 can be spaced apart from the partition member 600 by a certain interval D, in the gap space GS between the vibration member 100 and the supporting member 300. For example, the porous member 380 can be spaced apart from a bobbin 240 of the vibration apparatus 200 by the certain interval D. The porous member 380 can be spaced apart from the heat dissipation member 150 between the vibration member 100 and the vibration apparatus 200, in the gap space GS between the vibration member 100 and the supporting member 300. For example, the porous member 380 can be disposed to overlap the heat dissipation member 150 with being apart therefrom. The porous member 380 can have the uniform thickness T and spaced apart from a rear surface of the heat dissipation member 150 by the certain interval h2. The porous member 380 can have the uniform thickness T and be spaced apart from the heat dissipation member 150 by the certain interval h2. The porous member 380 can be disposed at a portion, which does not overlap with a first through hole 315, of the upper surface of the supporting member 300. For example, the porous member 380 can be spaced apart from the first through hole 315 of a first supporting member 310.

The porous member 380 can include a porous material including a plurality of pores provided therein. The porous member 380 can include a porous material having a range where a porosity rate is about 90%. For example, the porous member 380 can include one or more materials of a PCP, a foam, a sponge, an MOF, zeolite, and activated carbon, but embodiments of the present disclosure are not limited thereto.

The porous member 380 can provide a porous space VS including a plurality of pores in the gap space GS (or the internal space) between the vibration member 100 and the supporting member 300. For example, the porous space VS can have a constant thickness T from the supporting member 300 in the gap space GS between the vibration member 100 and the supporting member 300 and can have a volume surrounding a periphery of the vibration apparatus 200. The porous space VS can have the constant thickness T from the upper surface of the supporting member 300 in the gap space GS between the vibration member 100 and the supporting member 300 and can have a volume surrounding a periphery, at least partially overlapping with the heat dissipation member 150, of the vibration apparatus 200. The porous space VS can have the constant thickness T apart from the upper surface of the supporting member 300 by the certain interval h2 with respect to a rear surface of the heat dissipation member 150, in the gap space GS between the vibration member 100 and the supporting member 300, and can have a volume surrounding a periphery, which is spaced apart from a bobbin 240 by the certain interval D, of the vibration apparatus 200. The porous space VS can have the constant thickness T and be spaced apart from the upper surface of the supporting member 300 by the certain interval h2 with respect to the rear surface of the heat dissipation member 150, in the gap space GS between the vibration member 100 and the supporting member 300, and can have a volume surrounding a periphery, which is spaced apart from the bobbin 240 by the certain interval D and at least partially overlaps with the heat dissipation member 150, of the vibration apparatus 200. In the porous space VS, an area contacting air per unit volume can increase based on a plurality of pores formed therein and a flow path of air flowing between the plurality of pores can increase, and thus, a volume of the gap space GS between the vibration member 100 and the supporting member 300 can be greater than a real volume. Accordingly, the porous member 380 can contribute to an increase in a volume of internal air of the gap space GS between the vibration member 100 and the supporting member 300, and an air impedance of the gap space GS between the vibration member 100 and the supporting member 300 can be reduced, thereby improving a sound pressure level characteristic and/or a sound characteristic of a low pitched sound band.

Figure 7:
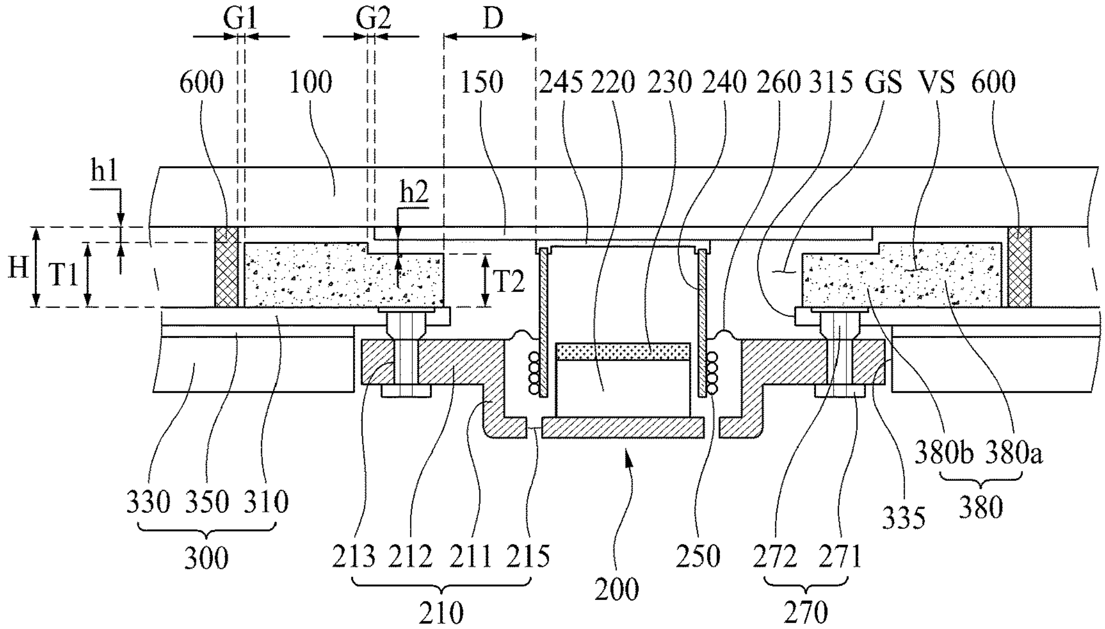

Referring to FIG. 7, a porous member 380 of a vibration apparatus 200 according to another embodiment of the present disclosure can be configured to have different thicknesses T1 and T2 in a gap space GS (or an internal space) between a vibration member 100 and a supporting member 300. For example, the porous member 380 can have a stepped portion or different levels. For example, the porous member 380 can be configured to have a first thickness T1 which is less than or equal to a height H of the gap space GS between the vibration member 100 and the supporting member 300 and a second thickness T2 which is less than the height H of the gap space GS between the vibration member 100 and the supporting member 300. For example, the porous member 380 can include a first porous member 380*a* having the first thickness T1 and a second porous member 380*b* having the second thickness T2. For example, the first porous member 380*a* and the second porous member 380*b* can be provided as one body.

The first porous member 380*a* and the second porous member 380*b* can be provided to contact an upper surface of the supporting member 300. The first porous member 380*a* and the second porous member 380*b* can be attached on or coupled to the upper surface of the supporting member 300 by using an adhesive member. For example, the adhesive member can be a double-sided tape, a single-sided tape, an adhesive, or a bond, but embodiments of the present disclosure are not limited thereto.

The first porous member 380*a* and the second porous member 380*b* can be disposed at a portion, which does not overlap with the vibration apparatus 200 and a partition member 600, in the gap space GS (or the internal space) between the vibration member 100 and the supporting member 300.

The first porous member 380*a* can be spaced apart from the partition member 600 by a certain interval G1, in the gap space GS between the vibration member 100 and the supporting member 300. The first porous member 380*a* can be configured to have the first thickness T1 and be spaced apart from a rear surface of the vibration member 100 by a first interval h1. As another example, the first thickness T1 of the first porous member 380*a* can be equal to the height H of the gap space GS between the vibration member 100 and the supporting member 300. In this situation, the first porous member 380*a* can contact the rear surface of the vibration member 100 and the upper surface of the supporting member 300. The first porous member 380*a* can be disposed at a portion which does not overlap with the heat dissipation member 150, between the vibration member 100 and the vibration apparatus 200. For example, the first porous member 380*a* can be disposed at a portion spaced apart from the heat dissipation member 150 by a certain interval G2. The first porous member 380*a* can be disposed at a portion which is spaced apart from the partition member 600 by the certain interval G1 and is spaced apart from the heat dissipation member 150 by the certain interval G2.

The second porous member 380*b* can be spaced apart from the vibration apparatus 200 by a certain interval D, in the gap space GS between the vibration member 100 and the supporting member 300. The second porous member 380*b* can be configured to have the second thickness T2 and be spaced apart from a rear surface of the heat dissipation member 150 by a second interval h2. The second porous member 380*b* can be disposed at a portion overlapping with the heat dissipation member 150. The second porous member 380*b* can be disposed at a portion, which does not overlap with a first through hole 315, of the supporting member 300. For example, the second porous member 380*b* can be spaced apart from the first through hole 315 of a first supporting member 310.

The porous member 380 can include a porous material including a plurality of pores provided therein. The porous member 380 can include a porous material having a range where a porosity rate is about 90%. For example, the porous member 380 can include one or more materials of a PCP, a foam, a sponge, an MOF, zeolite, and activated carbon, but embodiments of the present disclosure are not limited thereto.

The porous member 380 can provide a porous space VS including a plurality of pores in the gap space GS (or the internal space) between the vibration member 100 and the supporting member 300. For example, the porous space VS can have a first thickness T1 and a second thickness T2 from the upper surface of the supporting member 300 in the gap space GS between the vibration member 100 and the supporting member 300 and can have a volume surrounding a periphery, at least partially overlapping with the heat dissipation member 150, of the vibration apparatus 200. The porous space VS can have the first thickness T1 apart from a portion, which does not overlap with the heat dissipation member 150, by a first interval h1 with respect to a rear surface of the vibration member 100, the second thickness T2 apart from a portion, overlapping with the heat dissipation member 150, by a second interval h2 with respect to a rear surface of the heat dissipation member 150, and have a volume surrounding a periphery, which is spaced apart from a bobbin 240 by the certain interval D, of the vibration apparatus 200. In the porous space VS, an area contacting air per unit volume can increase based on a plurality of pores formed therein and a flow path of air flowing between the plurality of pores can increase, and thus, a volume of the gap space GS between the vibration member 100 and the supporting member 300 can be greater than a real volume. Accordingly, the porous member 380 can contribute to an increase in a volume of internal air of the gap space GS between the vibration member 100 and the supporting member 300, and an air impedance of the gap space GS between the vibration member 100 and the supporting member 300 can be reduced, thereby improving a sound pressure level characteristic and/or a sound characteristic of a low pitched sound band.

FIGS. 8 to 11 illustrate an arrangement structure of a porous member according to embodiments of the present disclosure.

Figure 8:
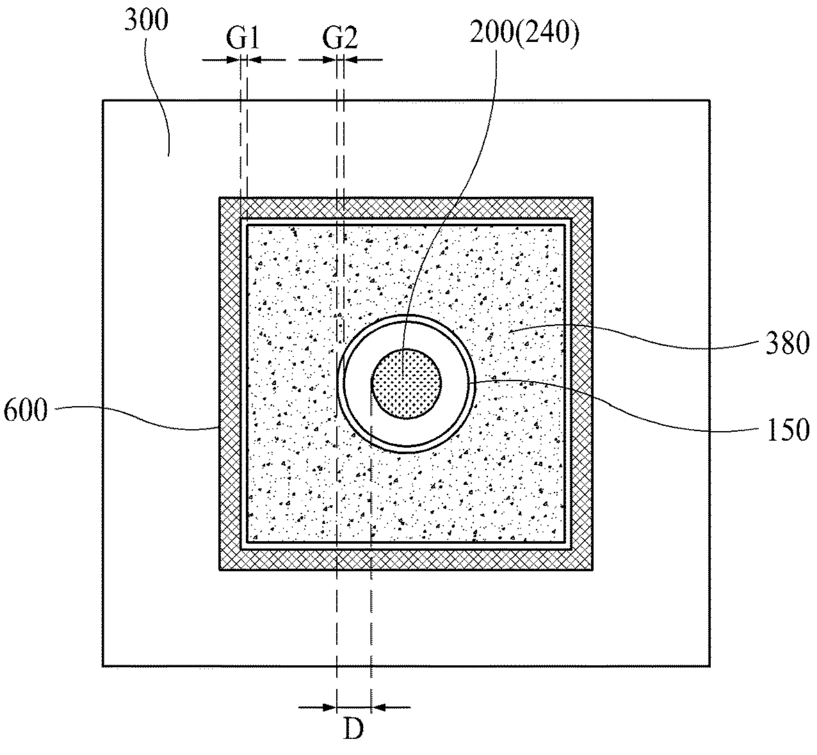
FIGS. 8 to 11 illustrate an arrangement structure of a porous member according to embodiments of the present disclosure.

FIG. 8 illustrates an arrangement structure of a vibration apparatus 200, a heat dissipation member 150, a partition member 600, and a porous member 380, with respect to a plan view of the supporting member 300 illustrated in FIG. 4 or 5. Referring to FIG. 4 or 5 and 8, the porous member 380 according to an embodiment of the present disclosure can be disposed between the vibration apparatus 200 and the partition member 600.

The partition member 600 can include four sides surrounding the vibration apparatus 200. For example, the partition member 600 can include a first side (or a left side), a second side (or a right side) parallel to the first side, a third side (or an upper side) between one side of the first side and one side of the second side, and a fourth side (or a lower side) between the other side of the first side and the other side of the second side. The partition member 600 can be formed in a structure where the first to fourth sides are provided as one body, and thus, can be implemented in a structure which seals a gap space GS between the vibration member 100 and a supporting member 300 at a periphery of the vibration apparatus 200.

The porous member 380 can be spaced apart from the partition member 600 by a certain interval G1. The porous member 380 can be surrounded by the partition member 600. For example, the porous member 380 can be disposed at a portion, which does not overlap with the partition member 600, of an upper surface of the supporting member 300.

The porous member 380 can be spaced apart from the vibration apparatus 200 by a certain interval D. The porous member 380 can be spaced apart from the heat dissipation member 150 between the vibration member 100 and the vibration apparatus 200 by a certain interval G2. For example, the porous member 380 can be spaced apart from the vibration apparatus 200 by a certain interval D and can be spaced apart from the heat dissipation member 150 by the certain interval G2. For example, the porous member 380 can be disposed at a portion, which does not overlap with the vibration apparatus 200 and the heat dissipation member 150, of the upper surface of the supporting member 300.

Figure 9:
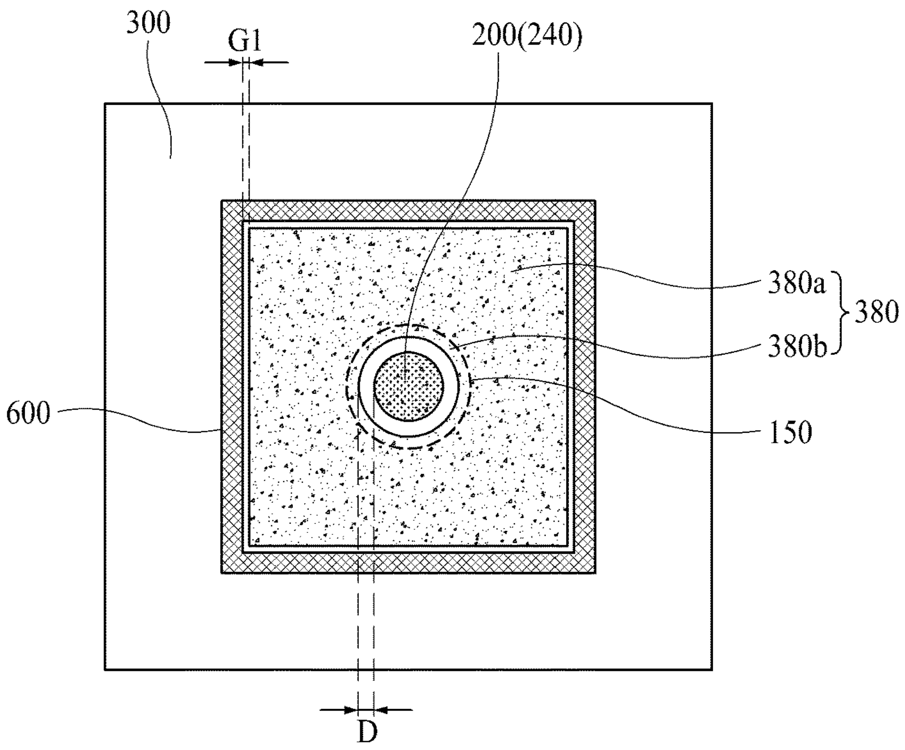

FIG. 9 illustrates an arrangement structure of a vibration apparatus 200, a heat dissipation member 150, a partition member 600, and a porous member 380, with respect to a plan view of the supporting member 300 illustrated in FIG. 4 or 5. Referring to FIG. 6 or 7 and 9, the porous member 380 according to an embodiment of the present disclosure can be disposed between the vibration apparatus 200 and the partition member 600.

The partition member 600 can include four sides surrounding the vibration apparatus 200. The partition member 600 can be formed in a structure where first to fourth sides are provided as one body, and thus, can be implemented in a structure which seals a gap space GS between the vibration member 100 and a supporting member 300 at a periphery of the vibration apparatus 200.

The porous member 380 can be spaced apart from the partition member 600 by a certain interval G1. The porous member 380 can be surrounded by the partition member 600. For example, the porous member 380 can be disposed at a portion, which does not overlap with the partition member 600, of an upper surface of the supporting member 300.

The porous member 380 can be spaced apart from the vibration apparatus 200 by a certain interval D. The porous member 380 can partially overlap with the heat dissipation member 150 between the vibration member 100 and the vibration apparatus 200. For example, the porous member 380 can be spaced apart from the vibration apparatus 200 by the certain interval D capable of overlapping with the heat dissipation member 150. For example, the porous member 380 can be disposed at a portion, which does not overlap with the vibration apparatus 200 and partially overlaps with the heat dissipation member 150, of the upper surface of the supporting member 300.

Figure 10:
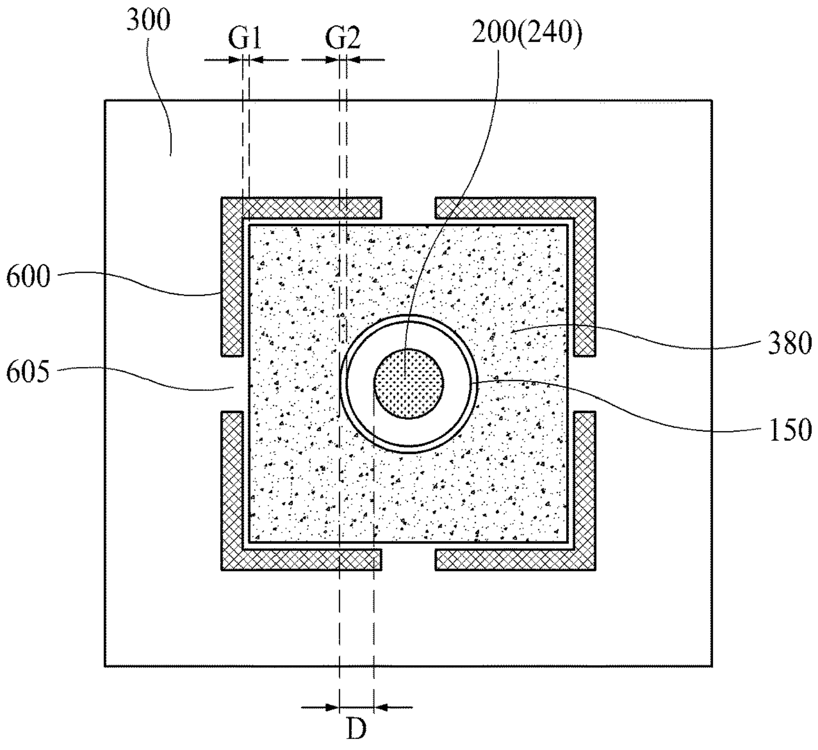

FIG. 10 illustrates an embodiment implemented by modifying a structure of a partition member 600 in an arrangement structure of the vibration apparatus 200, the heat dissipation member 150, the partition member 600, and the porous member 380 illustrated in FIG. 8. Referring to FIG. 4 or 5 and 10, a porous member 380 according to an embodiment of the present disclosure can be disposed between a vibration apparatus 200 and a partition member 600 including at least one open portion 605.

The partition member 600 can include four sides surrounding the vibration apparatus 200. For example, the partition member 600 can include a first side (or a left side), a second side (or a right side) parallel to the first side, a third side (or an upper side) between one side of the first side and one side of the second side, and a fourth side (or a lower side) between the other side of the first side and the other side of the second side. The partition member 600 can include the open portion 605 which passes through an inner portion and an outer portion of the partition member 600, in one or more of the first to fourth sides. The partition member 600 can include the open portion 605 provided in one or more of the first to fourth sides, and thus, can be implemented in a structure which does not seal a gap space GS between the vibration member 100 and a supporting member 300 at a periphery of the vibration apparatus 200.

The porous member 380 can be spaced apart from the partition member 600 by a certain interval G1. The porous member 380 can be surrounded by the partition member 600. In the porous member 380, the other portion, except the open portion 605, of the partition member 600 can be surrounded. For example, the porous member 380 can be disposed at a portion, which does not overlap with the partition member 600, of an upper surface of the supporting member 300.

The porous member 380 can be spaced apart from the vibration apparatus 200 by a certain interval D. The porous member 380 can be spaced apart from the heat dissipation member 150 between the vibration member 100 and the vibration apparatus 200 by a certain interval G2. For example, the porous member 380 can be spaced apart from the vibration apparatus 200 by a certain interval D and can be spaced apart from the heat dissipation member 150 by the certain interval G2. For example, the porous member 380 can be disposed at a portion, which does not overlap with the vibration apparatus 200 and the heat dissipation member 150, of the upper surface of the supporting member 300.

Figure 11:
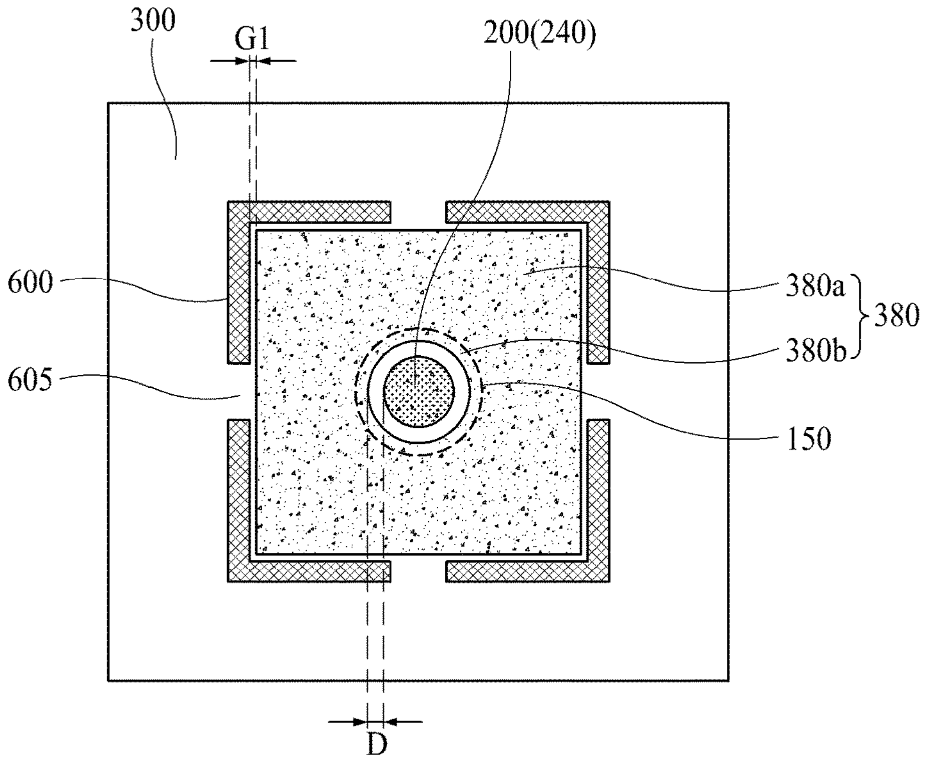

FIG. 11 illustrates an embodiment implemented by modifying a structure of a partition member 600 in an arrangement structure of the vibration apparatus 200, the heat dissipation member 150, the partition member 600, and the porous member 380 illustrated in FIG. 9. Referring to FIG. 6 or 7 and 11, a porous member 380 according to an embodiment of the present disclosure can be disposed between a vibration apparatus 200 and a partition member 600 including at least one open portion 605.

The partition member 600 can include four sides surrounding the vibration apparatus 200 and can include the open portion 605 in one or more of first to fourth sides. In the partition member 600, the open portion 605 can be formed in one or more of the first to fourth sides, and thus, the partition member 600 can be implemented in a structure which does not seal a gap space GS between the vibration member 100 and a supporting member 300 at a periphery of the vibration apparatus 200.

The porous member 380 can be spaced apart from the partition member 600 by a certain interval G1. In the porous member 380, the other portion, except the open portion 605, of the partition member 600 can be surrounded. For example, the porous member 380 can be disposed at a portion, which does not overlap with the partition member 600, of an upper surface of the supporting member 300.

The porous member 380 can be spaced apart from the vibration apparatus 200 by a certain interval D. The porous member 380 can partially overlap with the heat dissipation member 150 between the vibration member 100 and the vibration apparatus 200. For example, the porous member 380 can be spaced apart from the vibration apparatus 200 by a certain interval D capable of overlapping with the heat dissipation member 150. For example, the porous member 380 can be disposed at a portion, which does not overlap with the vibration apparatus 200 and partially overlaps with the heat dissipation member 150, of the upper surface of the supporting member 300 while the partition member 600 includes one or more openings.

Figure 12:
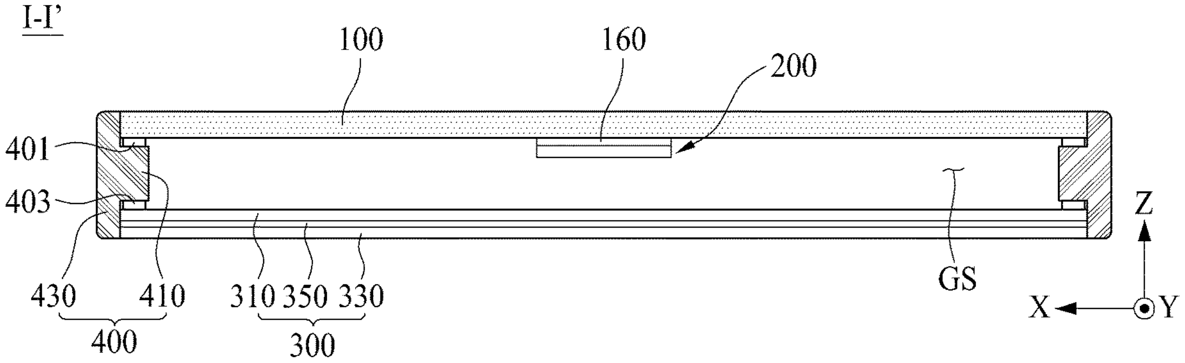
FIG. 12 is another cross-sectional view taken along line I-I' illustrated in FIG. 1 according to an embodiment of the present disclosure.

FIG. 12 is another cross-sectional view taken along line I-I' illustrated in FIG. 1. FIG. 12 illustrates an embodiment implemented by modifying a configuration of each of the vibration apparatus and the supporting member in the apparatus described above with reference to FIGS. 2 to 11. Therefore, repeated descriptions of the same elements except for configurations of a vibration apparatus and a supporting member and relevant elements are omitted or will be briefly given below.

Referring to FIGS. 1 and 12, an apparatus according to another embodiment of the present disclosure can include a vibration member 100, a supporting member 300, and a vibration apparatus 200 between the vibration member 100 and the supporting member 300. The vibration apparatus 200 can be disposed at a rear surface (or a backside surface) of the vibration member 100. For example, the vibration member 100 can be a passive vibration member, a vibration object, a display panel, a vibration plate, or a front member, but embodiments of the present disclosure are not limited thereto. Hereinafter, an example where a vibration member is a display panel will be described.

The vibration member 100 according to an embodiment of the present disclosure can be a display panel which displays an image.

According to another embodiment of the present disclosure, the vibration member 100 can include one or more of metal, wood, rubber, plastic, glass, cloth, fiber, paper, mirror, and leather, but embodiments of the present disclosure are not limited thereto. For example, the paper can be a cone paper for speakers. For example, the cone paper can be pulp or foam plastic, but embodiments of the present disclosure are not limited thereto.

The vibration apparatus 200 according to an embodiment of the present disclosure can be implemented as a film type or have a slim configuration. Because the vibration apparatus 200 is implemented as a film type, the vibration apparatus 200 can have a thickness which is thinner than the vibration member 100 or a display panel, and thus, an increase in thickness of the vibration member 100 or the display panel caused by disposition of the vibration apparatus 200 can be minimized. For example, the vibration apparatus 200 can be referred to as a sound generating module, a sound generating apparatus, a vibration generating apparatus, a displacement apparatus, a sound apparatus, a film actuator, a film type piezoelectric composite actuator, a film speaker, a film type piezoelectric speaker, or a film type piezoelectric composite speaker, which uses the vibration member 100 or the display panel as a sound vibration plate, but the terms are not limited thereto.

The vibration apparatus 200 can be disposed at a rear surface of the vibration member 100 or the display panel to overlap with a display area of the vibration member 100 or the display panel. For example, the vibration apparatus 200 can overlap with half or more of the display area of the vibration member 100 or the display panel. According to another embodiment of the present disclosure, the vibration apparatus 200 can overlap with all of the display area of the vibration member 100 or the display panel.

When an alternating current (AC) voltage is applied, the vibration apparatus 200 according to an embodiment of the present disclosure can alternately repeat contraction and expansion based on an inverse piezoelectric effect to vibrate and can vibrate the vibration member 100 or the display panel, based on a vibration. For example, the vibration apparatus 200 can vibrate based on a voice signal synchronized with an image displayed by the vibration member 100 or the display panel to vibrate the vibration member 100 or the display panel. According to another embodiment of the present disclosure, the vibration apparatus 200 can vibrate based on a haptic feedback signal (or a tactile feedback signal) synchronized with a user touch applied to a touch panel (or a touch sensor layer) disposed in or embedded into the vibration member 100 or the display panel to vibrate the vibration member 100 or the display panel. Accordingly, the vibration member 100 or the display panel can vibrate based on a vibration of the vibration apparatus 200 to provide a user (or a viewer) with at least one of a sound and the haptic feedback.

The apparatus according to an embodiment of the present disclosure can output a sound, generated by a vibration of the vibration member 100 or the display panel based on a vibration of the vibration apparatus 200, in a forward direction of the vibration member 100 or the display panel (e.g., to output sound waves directly towards a viewer). Also, in the apparatus according to an embodiment of the present disclosure, a most region of the vibration member 100 or the display panel can be vibrated by the vibration apparatus 200 of a film type, thereby more enhancing a sense of localization and a sound pressure level characteristic of a sound based on a vibration of the vibration member 100 or the display panel. For example, to provide better directional sound or 3D sound (e.g., for a center channel).

The apparatus according to an embodiment of the present disclosure can further include a connection member 160 (or a first connection member) between the vibration member 100 or the display panel and the vibration apparatus 200. For example, the connection member 160 can be disposed between a rear surface of the vibration member 100 or the display panel and the vibration apparatus 200, and thus, can connect or couple the vibration apparatus 200 to the rear surface of the vibration member 100 or the display panel. For example, the vibration apparatus 200 can be connected with or coupled to the rear surface of the vibration member 100 or the display panel by using the connection member 160, and thus, can be supported by or disposed at the rear surface of the vibration member 100 or the display panel. For example, the vibration apparatus 200 can be disposed at the rear surface of the vibration member 100 or the display panel by using the connection member 160.

The connection member 160 according to an embodiment of the present disclosure can include a material including an adhesive layer which is good in tacky force or adhesive force, with respect to each of the vibration apparatus 200 and the rear surface of the vibration member 100 or the display panel. For example, the connection member 160 can include a foam pad, a double-sided tape, or an adhesive, but embodiments of the present disclosure are not limited thereto. For example, the adhesive layer of the connection member 160 can include epoxy, acryl, silicone, or urethane, but embodiments of the present disclosure are not limited thereto. For example, the adhesive layer of the connection member 160 can include an acrylic material (or substance), having a characteristic where an adhesive force is relatively good and hardness is high, of acryl and urethane. Accordingly, a vibration of the vibration apparatus 200 can be effectively transferred to the vibration member 100 or the display panel.

The adhesive layer of the connection member 160 can further include an additive such as a tackifier, a wax component, or an antioxidant, but embodiments of the present disclosure are not limited thereto. The additive can prevent the connection member 160 from being detached (or striped or peeled) from the vibration member 100 or the display panel by a vibration of the vibration apparatus 20. For example, the tackifier can be rosin derivatives, and the wax component can be a paraffin wax. For example, the antioxidant can be a phenolic antioxidant such as thiolester, but embodiments of the present disclosure are not limited thereto.

The connection member 160 according to another embodiment can further include a hollow portion provided between the vibration plate 100 or the display panel and the vibration apparatus 200. The hollow portion of the connection member 160 can provide an air gap between the vibration plate 100 or the display panel and the vibration apparatus 200. The air gap can allow a sound wave (or a sound pressure level) based on a vibration of the vibration apparatus 200 to concentrate on the vibration plate 100 or the display panel without being dispersed by the connection member 160, and thus, the loss of a vibration by the connection member 160 can be minimized, thereby increasing a sound characteristic and/or a sound pressure level characteristic of a sound generated based on a vibration of the vibration plate 100 or the display panel.

The apparatus according to an embodiment of the present disclosure can include a supporting member 300 which is disposed at a rear surface (or a backside surface) of the vibration member 100.

The supporting member 300 can be disposed at the rear surface of the vibration plate 100 or the rear surface of the display panel. For example, the supporting member 300 can cover the rear surface of the vibration plate 100 or the rear surface of the display panel. For example, the supporting member 300 can cover the whole rear surface of the vibration plate 100 or the whole rear surface of the display panel with a gap space GS therebetween. The supporting member 300 can be spaced apart from a rearmost surface of the vibration plate 100 or the display panel with a gap space GS therebetween, or can be spaced apart from the vibration apparatus 200. For example, the gap space GS can be referred to as an internal space, an air gap, a vibration space, a resonance chamber, or a sound sounding box, but the terms are not limited thereto.

The supporting member 300 according to an embodiment of the present disclosure can include a first supporting member 310 and a second supporting member 330.

The first supporting member 310 can be disposed between the rear surface of the vibration member 100 or the display panel and the second supporting member 330. For example, the first supporting member 310 can be an inner plate, a first rear structure material, a first supporting structure material, a first supporting cover, a first back cover, a first rear member, an internal plate, or an internal cover, but the terms are not limited thereto. According to another embodiment of the present disclosure, the first supporting member 310 can be omitted.

The first supporting member 310 can be spaced apart from a rearmost surface of the vibration member 100 with a gap space GS (or an internal space) therebetween, or can be spaced apart from the vibration apparatus 200. For example, the gap space GS can be referred to as an internal space, an air gap, an acoustic waveguide, a resonance chamber, a vibration space, or a sound sounding box, but the terms are not limited thereto.

The second supporting member 330 can be disposed at a rear surface of the first supporting member 310. For example, the second supporting member 330 can be an outer plate, a rear plate, a back plate, a back cover, a rear cover, a second rear structure material, a second supporting structure material, a second supporting cover, a second back cover, a second rear member, an external plate, or an external cover, but the terms are not limited thereto.

According to an embodiment of the present disclosure, the first supporting member 310 and the second supporting member 330 can include different materials. For example, the first supporting member 310 can include a metal material such as an Al material which is good in heat conductivity, and the second supporting member 330 can include a glass material, but embodiments of the present disclosure are not limited thereto.

According to an embodiment of the present disclosure, the first supporting member 310 and the second supporting member 330 can have the same thickness or different thicknesses. For example, the first supporting member 310 can have a thickness which is relatively thinner than the second supporting member 330, but embodiments of the present disclosure are not limited thereto.

The supporting member 300 according to an embodiment of the present disclosure can further include a connection member 350. For example, the connection member 350 can be disposed between the first supporting member 310 and the second supporting member 330. For example, the first supporting member 310 and the second supporting member 330 can be coupled to or connected with each other by the connection member 350.

The apparatus according to an embodiment of the present disclosure can further include a middle frame 400. The middle frame 400 can provide a gap space GS between the vibration member 100 or the display panel and the supporting member 300. The middle frame 400 can be referred to as a middle cabinet, a middle cover, a middle chassis, a connection member, a frame, a frame member, a middle member, or a side cover member, but the terms are not limited thereto.

The middle frame 400 according to an embodiment of the present disclosure can include a first supporting portion 410 and a second supporting portion 430. For example, the first supporting portion 410 can be a supporting portion, but the terms are not limited thereto. For example, the second supporting portion 430 can be a sidewall portion, but the terms are not limited thereto.

The apparatus according to an embodiment of the present disclosure can further include a panel connection member (or a connection member) instead of the middle frame 400. The panel connection member can be disposed between a rear edge portion of the vibration member 100 and a front edge portion of the supporting member 300, and thus, can provide a gap space GS between the vibration member 100 and the supporting member 300.

According to another embodiment of the present disclosure, the middle frame 400 can be omitted in the apparatus according to an embodiment of the present disclosure. The panel connection member or an adhesive can be provided instead of the middle frame 400. According to another embodiment of the present disclosure, a partition can be provided instead of the middle frame 400.

FIGS. 13 to 16 illustrate a vibration apparatus according to another embodiment of the present disclosure. FIGS. 13 to 16 illustrate an embodiment where a porous member is added to the apparatus described above with reference to FIG. 12. In the following description, therefore, repeated descriptions of the same elements except a porous member and relevant elements are omitted or will be briefly given below.

Figure 13:
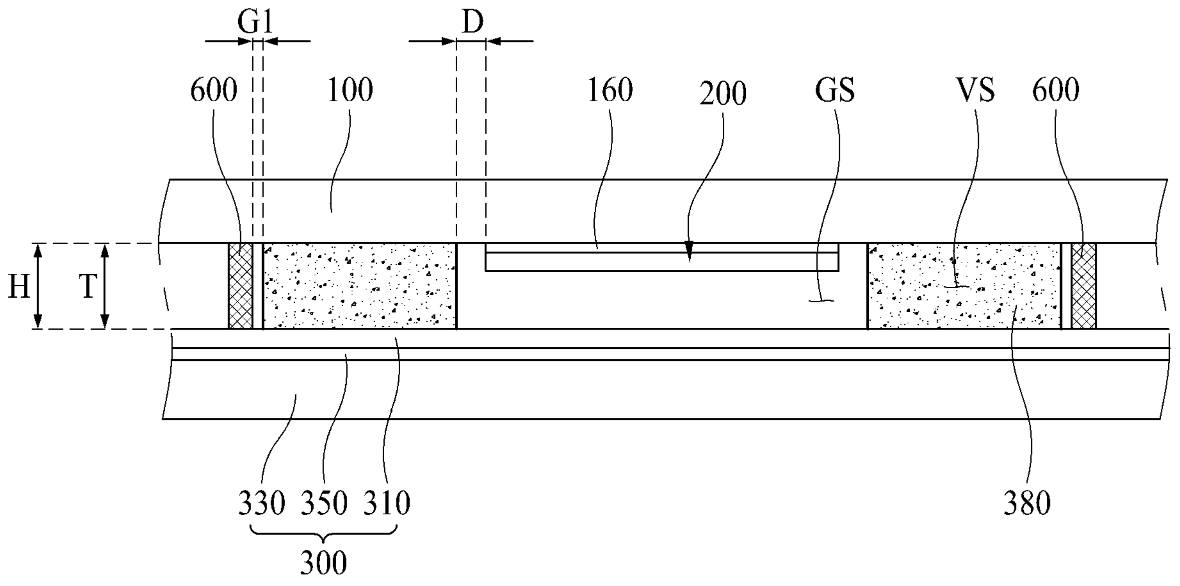
FIGS. 13 to 16 illustrate a vibration apparatus according to embodiments of the present disclosure.

Referring to FIG. 13, a vibration apparatus 200 according to another embodiment of the present disclosure can be implemented as a film type where the vibration apparatus 200 is connected with or attached on a rear surface of a vibration member 100 by using a connection member 160. The vibration apparatus 200 can further include a porous member 380 between the vibration member 100 and a supporting member 300.

The vibration apparatus 200 can be referred to as a sound generating module, a sound generating apparatus, a vibration generating apparatus, a displacement apparatus, a vibrator, a sound apparatus, a film actuator, a film type piezoelectric composite actuator, a film speaker, a film type piezoelectric speaker, or a film type piezoelectric composite speaker, which uses a piezoelectric device having a piezoelectric characteristic, but the terms are not limited thereto.

The vibration apparatus 200 can be connected with or supported by the rear surface of the vibration member 100 by the connection member 160. The vibration apparatus 200 can be disposed in a gap space GS (or an internal space) between the vibration member 100 and the supporting member 300 and can be surrounded by the supporting member 300, and thus, the vibration apparatus 200 can be protected from an external impact.

The connection member 160 can be disposed between the vibration apparatus 200 and the vibration member 100 and can connect or couple the vibration apparatus 200 to the vibration member 100. For example, the vibration apparatus 200 can be connected with or coupled to the rear surface of the vibration member 100 by using the connection member 160, and thus, can be supported by or disposed at the rear surface of the vibration member 100.

A gap space GS can be provided between the vibration member 100 and the supporting member 300. A partition member 600 providing or limiting the gap space GS can be further provided between the vibration member 100 and the supporting member 300.

The partition member 600 can provide or define a gap space GS which generates a sound when the vibration member 100 is vibrated by the vibration apparatus 200. The partition member 600 can separate the sound generated by the vibration member 100, or can separate a channel (e.g., left channel, center channel, right channel, etc.), and thus, can prevent or decrease interference of the sound. The partition member 600 can be referred to as an enclosure or a baffle, but the terms are not limited thereto. In addition, the vibration member 100 can have multiple vibration apparatuses 200 attached to the rear surface of the vibration member 100, which can be separated from each other by the partition member 600 (e.g., to provide directional sound or different audio channels, or louder sound, etc.).

The partition member 600 can divide or provide a gap space GS (or an internal space) corresponding to one vibration apparatus 200. For example, the partition member 600 can be provided to surround a periphery of one vibration apparatus 200. The partition member 600 can include four sides surrounding the vibration apparatus 200. For example, the partition member 600 can be implemented in a structure where the four sides are provided as one body, and thus, can be configured in a structure which seals the gap space GS between the vibration member 100 and the supporting member 300 at a periphery of the vibration apparatus 200. As another example, the partition member 600 can include a plurality of open portions which are provided at one or more of the four sides, and thus, can be configured in a structure which does not seal the gap space GS between the vibration member 100 and the supporting member 300 at the periphery of the vibration apparatus 200.

The porous member 380 can be disposed in a gap space GS (or an internal space) between the vibration member 100 and the supporting member 300. The porous member 380 can be disposed between a rear surface of the vibration member 100 and an upper surface of the supporting member 300. The porous member 380 can contact at least one of the rear surface of the vibration member 100 and the upper surface of the supporting member 300. For example, the porous member 380 can contact at least one of the rear surface of the vibration member 100 and the upper surface of the supporting member 300, in the gap space GS between the vibration member 100 and the supporting member 300. For example, the porous member 380 can be attached on or coupled to the rear surface of the vibration member 100. The porous member 380 can be attached on or coupled to the rear surface of the vibration member 100 by using an adhesive member. Alternatively, the porous member 380 can be attached on or coupled to the upper surface of the supporting member 300. The porous member 380 can be attached on or coupled to the upper surface of the supporting member 300 by using an adhesive member. For example, the adhesive member can be a double-sided tape, a single-sided tape, an adhesive, or a bond, but embodiments of the present disclosure are not limited thereto. For example, an upper surface of the porous member 380 can be attached on or coupled to the rear surface of the vibration member 100, and a lower surface of the porous member 380 can be attached on or coupled to the upper surface of the supporting member 300. The upper surface of the porous member 380 can be attached on or coupled to the rear surface of the vibration member 100 by using a first adhesive member, and the lower surface of the porous member 380 can be attached on or coupled to the upper surface of the supporting member 300 by using a second adhesive member. For example, each of the first and second adhesive members can be a double-sided tape, a single-sided tape, an adhesive, or a bond, but embodiments of the present disclosure are not limited thereto.

The porous member 380 can be disposed between the vibration apparatus 200 and the partition member 600, in the gap space GS (or the internal space) between the vibration member 100 and the supporting member 300. The porous member 380 can be provided to surround the vibration apparatus 200. For example, the porous member 380 can be configured to surround the periphery of the vibration apparatus 200. The porous member 380 can be space apart from the vibration apparatus 200 and can be provided to surround the periphery of the vibration apparatus 200. The porous member 380 can be surrounded by the partition member 600. For example, a periphery of the porous member 380 can be surrounded by the partition member 600. The porous member 380 can be spaced apart from the partition member 600, and the periphery of the porous member 380 can be surrounded by the partition member 600.

The porous member 380 can be configured to have a uniform thickness T in the gap space GS (or the internal space) between the vibration member 100 and the supporting member 300. For example, the porous member 380 can be configured to have the thickness T which is less than or equal to a height H of the gap space GS between the vibration member 100 and the supporting member 300. The upper surface of the porous member 380 can contact the rear surface of the vibration member 100, and a lower surface of the porous member 380 can be provided to contact the upper surface of the supporting member 300. For example, the porous member 380 can be configured to have the thickness T which is equal to the height H between the rear surface of the vibration member 100 and the upper surface of the supporting member 300.

The porous member 380 can be disposed at a portion, which does not overlap with the vibration apparatus 200 and the partition member 600, in the gap space GS (or the internal space) between the vibration member 100 and the supporting member 300. For example, the porous member 380 can be spaced apart from the partition member 600 by a certain interval G1, in the gap space GS between the vibration member 100 and the supporting member 300. The porous member 380 can be spaced apart from the vibration apparatus 200 by a certain interval D, in the gap space GS between the vibration member 100 and the supporting member 300.

The porous member 380 can include a porous material including a plurality of pores provided therein. The porous member 380 can include a porous material having a range where a porosity rate is about 90%. For example, the porous member 380 can include one or more materials of a PCP, a foam, a sponge, an MOF, zeolite, and activated carbon, but embodiments of the present disclosure are not limited thereto.

The porous member 380 can provide a porous space VS including a plurality of pores in the gap space GS (or the internal space) between the vibration member 100 and the supporting member 300. For example, the porous space VS can have a volume surrounding the periphery of the vibration apparatus 200 in the gap space GS between the vibration member 100 and the supporting member 300. The porous space VS can fill the gap space GS between the vibration member 100 and the supporting member 300 and can have a volume surrounding a periphery apart from the vibration apparatus 200 by the certain interval D. In the porous space VS, an area contacting air per unit volume can increase based on a plurality of pores formed therein and a flow path of air flowing between the plurality of pores can increase, and thus, a volume of the gap space GS between the vibration member 100 and the supporting member 300 can be greater than a real volume. Accordingly, the porous member 380 can contribute to an increase in a volume of internal air of the gap space GS between the vibration member 100 and the supporting member 300, and an air impedance of the gap space GS between the vibration member 100 and the supporting member 300 can be reduced, thereby improving a sound pressure level characteristic and/or a sound characteristic of a low pitched sound band.

Figure 14:
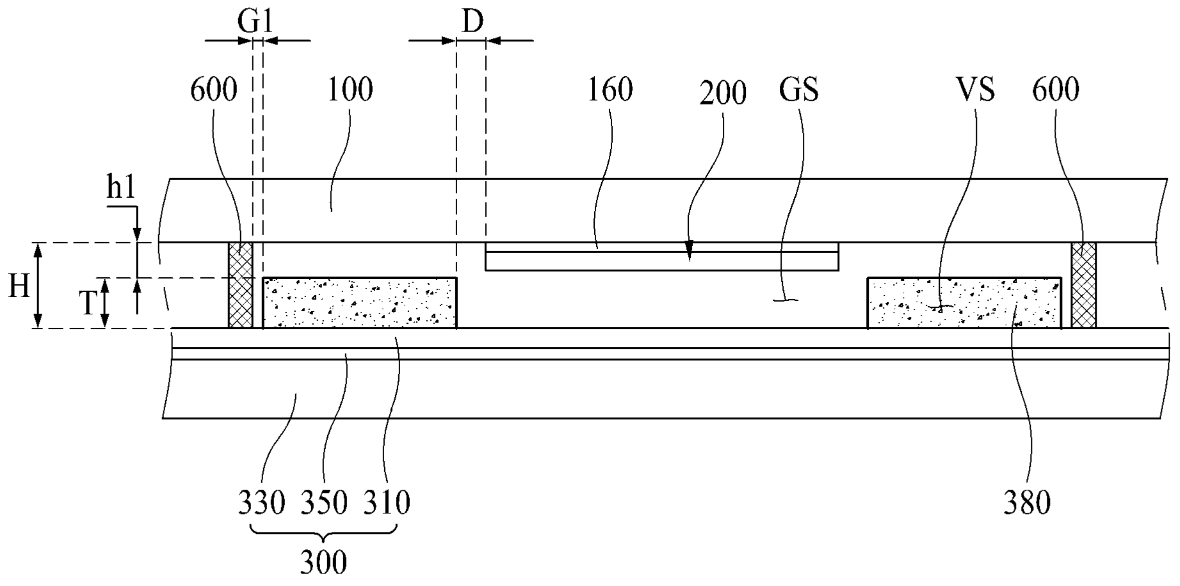

Referring to FIG. 14, a porous member 380 of a vibration apparatus 200 according to another embodiment of the present disclosure can be configured to have a uniform thickness T and be spaced apart from a vibration member 100 by a certain interval h1, in a gap space GS (or an internal space) between the vibration member 100 and a supporting member 300. For example, the porous member 380 can be configured to have the thickness T which is less than a height H of the gap space GS between the vibration member 100 and the supporting member 300. The porous member 380 can be provided to contact an upper surface of the supporting member 300. The porous member 380 can be attached on or coupled to the upper surface of the supporting member 300 by using an adhesive member. For example, the adhesive member can be a double-sided tape, a single-sided tape, an adhesive, or a bond, but embodiments of the present disclosure are not limited thereto.

The porous member 380 can be disposed at a portion, which does not overlap with the vibration apparatus 200 and a partition member 600, in the gap space GS (or the internal space) between the vibration member 100 and the supporting member 300. For example, the porous member 380 can be spaced apart from the partition member 600 by a certain interval G1, in the gap space GS between the vibration member 100 and the supporting member 300. The porous member 380 can be spaced apart from the vibration apparatus 200 by a certain interval D, in the gap space GS between the vibration member 100 and the supporting member 300.

The porous member 380 can include a porous material including a plurality of pores provided therein. The porous member 380 can include a porous material having a range where a porosity rate is about 90%. For example, the porous member 380 can include one or more materials of a PCP, a foam, a sponge, an MOF, zeolite, and activated carbon, but embodiments of the present disclosure are not limited thereto.

The porous member 380 can provide a porous space VS including a plurality of pores in the gap space GS (or the internal space) between the vibration member 100 and the supporting member 300. For example, the porous space VS can have a constant thickness T from the supporting member 300 in the gap space GS between the vibration member 100 and the supporting member 300 and can have a volume surrounding a periphery of the vibration apparatus 200. The porous space VS can have the constant thickness T from the upper surface of the supporting member 300 in the gap space GS between the vibration member 100 and the supporting member 300 and can have a volume surrounding a periphery apart from the vibration apparatus 200 by a certain interval D. In the porous space VS, an area contacting air per unit volume can increase based on a plurality of pores formed therein and a flow path of air flowing between the plurality of pores can increase, and thus, a volume of the gap space GS between the vibration member 100 and the supporting member 300 can be greater than a real volume. Accordingly, the porous member 380 can contribute to an increase in a volume of internal air of the gap space GS between the vibration member 100 and the supporting member 300, and an air impedance of the gap space GS between the vibration member 100 and the supporting member 300 can be reduced, thereby improving a sound pressure level characteristic and/or a sound characteristic of a low pitched sound band.

Figure 15:
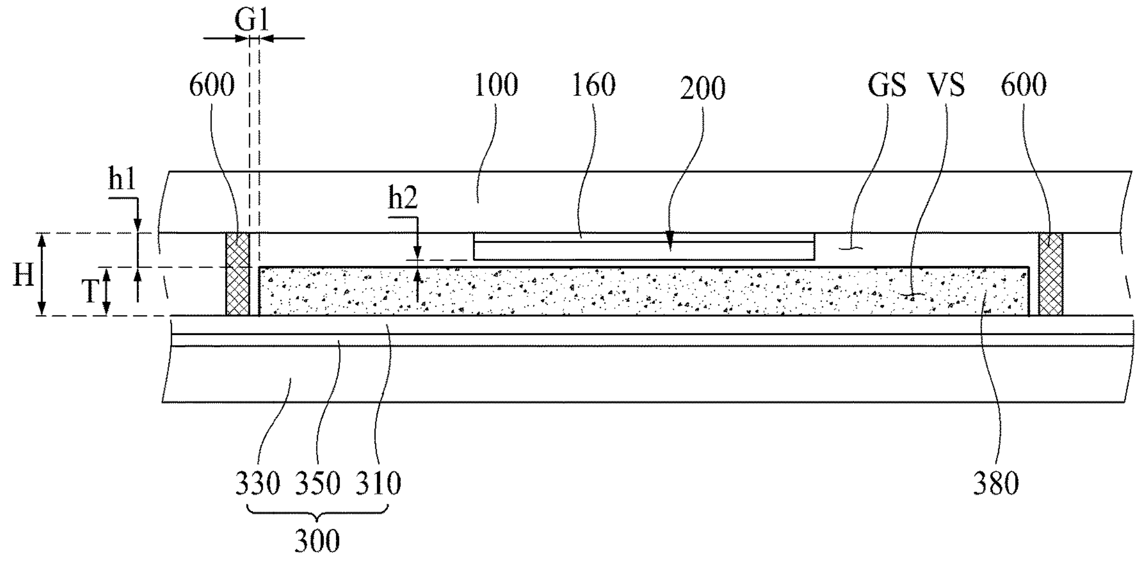

Referring to FIG. 15, a porous member 380 of a vibration apparatus 200 according to another embodiment of the present disclosure can be configured to have a uniform thickness T and be spaced apart from a vibration member 100 by a certain interval h1 and spaced apart from a heat dissipation member 150 by a certain interval h2, in a gap space GS (or an internal space) between the vibration member 100 and a supporting member 300. For example, the porous member 380 can be configured to have the thickness T which is less than a height H of the gap space GS between the vibration member 100 and the supporting member 300. The porous member 380 can be provided to contact an upper surface of the supporting member 300. The porous member 380 can be attached on or coupled to the upper surface of the supporting member 300 by using an adhesive member. For example, the adhesive member can be a double-sided tape, a single-sided tape, an adhesive, or a bond, but embodiments of the present disclosure are not limited thereto.

The porous member 380 can be disposed at a portion, which does overlap with the vibration apparatus 200, but does not overlap with a partition member 600, in the gap space GS (or the internal space) between the vibration member 100 and the supporting member 300. For example, the porous member 380 can be disposed in the gap space GS between the vibration member 100 and the supporting member 300 surrounded by the partition member 600. The porous member 380 can be spaced apart from the partition member 600 by a certain interval G1, in the gap space GS between the vibration member 100 and the supporting member 300. The porous member 380 can be spaced apart from a rear surface of the vibration apparatus 200 to overlap with each other, in the gap space GS between the vibration member 100 and the supporting member 300. For example, the porous member 380 can overlap with the vibration apparatus 200. The porous member 380 can have a uniform thickness T and be spaced apart from a rear surface of the heat dissipation member 150 by a certain interval h2.

The porous member 380 can include a porous material including a plurality of pores provided therein. The porous member 380 can include a porous material having a range where a porosity rate is about 90%. For example, the porous member 380 can include one or more materials of a PCP, an MOF, a foam, a sponge, zeolite, and activated carbon, but embodiments of the present disclosure are not limited thereto.

The porous member 380 can provide a porous space VS including a plurality of pores in the gap space GS (or the internal space) between the vibration member 100 and the supporting member 300. For example, the porous space VS can have a volume having a constant thickness T from an upper surface of the supporting member 300, in the gap space GS between the vibration member 100 and the supporting member 300 surrounded by the partition member 600. The porous space VS can have a volume having a constant thickness T and be spaced apart from the vibration apparatus 200 by a certain interval h2, in the gap space GS between the vibration member 100 and the supporting member 300 surrounded by the partition member 600. In the porous space VS, an area contacting air per unit volume can increase based on a plurality of pores formed therein and a flow path of air flowing between the plurality of pores can increase, and thus, a volume of the gap space GS between the vibration member 100 and the supporting member 300 can be greater than a real volume. Accordingly, the porous member 380 can contribute to an increase in a volume of internal air of the gap space GS between the vibration member 100 and the supporting member 300, and an air impedance of the gap space GS between the vibration member 100 and the supporting member 300 can be reduced, thereby improving a sound pressure level characteristic and/or a sound characteristic of a low pitched sound band.

Figure 16:
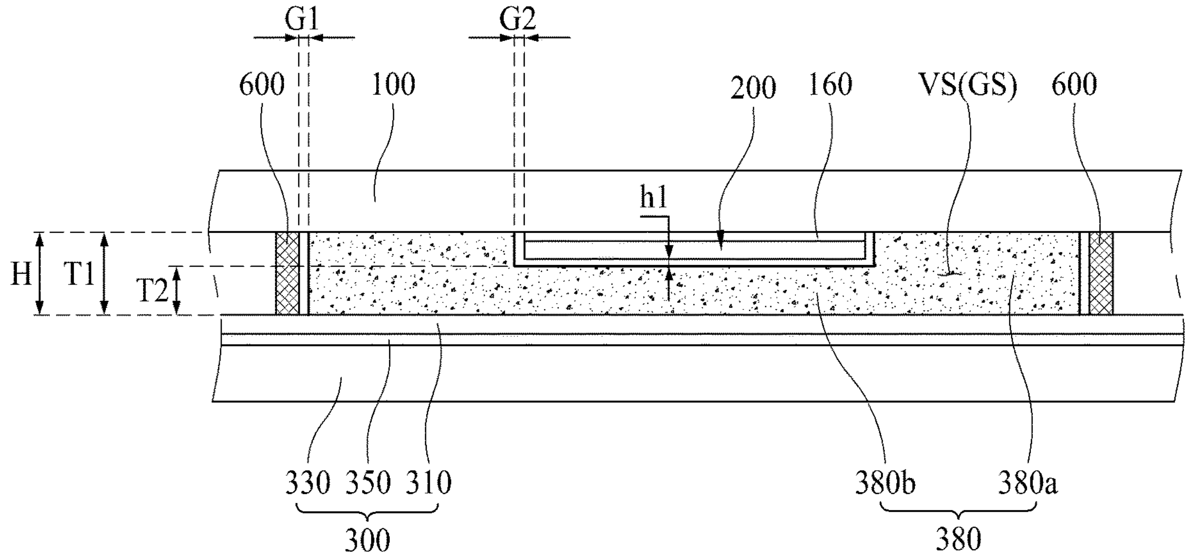

Referring to FIG. 16, a porous member 380 of a vibration apparatus 200 according to another embodiment of the present disclosure can be configured to have different thicknesses T1 and T2 in a gap space GS (or an internal space) between a vibration member 100 and a supporting member 300. For example, the porous member 380 can surround the vibration apparatus 200. For example, the porous member 380 can be configured to have a first thickness T1 which is less than or equal to a height H of the gap space GS between the vibration member 100 and the supporting member 300 and a second thickness T2 which is less than the height H of the gap space GS between the vibration member 100 and the supporting member 300 and is spaced apart from the vibration apparatus 200 by a certain interval h1. For example, the porous member 380 can include a first porous member 380*a* having the first thickness T1 and a second porous member 380*b* having the second thickness T2. For example, the first porous member 380*a* and the second porous member 380*b* can be provided as one body.

The first porous member 380*a* can be provided to contact a rear surface of the vibration member 100 and an upper surface of the supporting member 300. The first porous member 380*a* can be configured to have the first thickness T1 which is equal to the height H of the gap space GS between the vibration member 100 and the supporting member 300. For example, a rear surface of the first porous member 380*a* can be attached on or coupled to the upper surface of the supporting member 300 by using an adhesive member, and an upper surface of the first porous member 380*a* can be attached on or coupled to a rear surface of the vibration member 100 by using the adhesive member. As another example, the rear surface of the first porous member 380*a* can be attached on or coupled to the upper surface of the supporting member 300 by using the adhesive member, and the upper surface of the first porous member 380*a* can be apart from the vibration member 100, or can be attached on the rear surface of the vibration member 100 without a separate adhesive member. For example, the adhesive member can be a double-sided tape, a single-sided tape, an adhesive, or a bond, but embodiments of the present disclosure are not limited thereto.

The first porous member 380*a* can be spaced apart from the partition member 600 by a certain interval G1, in the gap space GS between the vibration member 100 and the supporting member 300. The first porous member 380*a* can be disposed at a portion which does not overlap with the vibration apparatus 200 connected with the rear surface of the vibration member 200. For example, the first porous member 380*a* can be disposed at a portion spaced apart from the vibration apparatus 200 by a certain interval G2. The first porous member 380*a* can be disposed at a portion which is spaced apart from the partition member 600 by the certain interval G1 and is spaced apart from the vibration apparatus 200 by the certain interval G2.

The second porous member 380*b* can be disposed at a portion that does overlap with the vibration apparatus 200, in the gap space GS between the vibration member 100 and the supporting member 300. For example, the second porous member 380*b* can be configured to have a second thickness T2 and be spaced apart from the rear surface of the vibration apparatus by a certain interval h1, in the gap space GS between the vibration member 100 and the supporting member 300. The second porous member 380*b* can be provided to contact an upper surface of the supporting member 300. For example, a rear surface of the second porous member 380*b* can be attached on or coupled to the upper surface of the supporting member 300 by using an adhesive member, and an upper surface of the second porous member 380*b* can be apart from the vibration apparatus 200 by the certain interval h1. For example, the adhesive member can be a double-sided tape, a single-sided tape, an adhesive, or a bond, but embodiments of the present disclosure are not limited thereto.

The porous member 380 can include a porous material including a plurality of pores provided therein. The porous member 380 can include a porous material having a range where a porosity rate is about 90%. For example, the porous member 380 can include one or more materials of a PCP, a foam, a sponge, an MOF, zeolite, and activated carbon, but embodiments of the present disclosure are not limited thereto.

The porous member 380 can provide a porous space VS including a plurality of pores in the gap space GS (or the internal space) between the vibration member 100 and the supporting member 300. For example, the porous space VS can have a volume having a first thickness T1 which is equal to a height H of the gap space GS and a second thickness T2 from an upper surface of the supporting member 300, in the gap space GS between the vibration member 100 and the supporting member 300. The porous space VS can have a volume and be spaced apart from the vibration apparatus 200 by certain intervals G2 and h1, in the gap space GS between the vibration member 100 and the supporting member 300 surrounded by the partition member 600. The porous space VS can be provided to surround the vibration apparatus 200 coupled to a rear surface of the vibration member 100 while still being spaced apart from the vibration apparatus 200 by the certain intervals G2 and h1. In the porous space VS, an area contacting air per unit volume can increase based on a plurality of pores formed therein and a flow path of air flowing between the plurality of pores can increase, and thus, a volume of the gap space GS between the vibration member 100 and the supporting member 300 can be greater than a real volume. Accordingly, the porous member 380 can contribute to an increase in a volume of internal air of the gap space GS between the vibration member 100 and the supporting member 300, and an air impedance of the gap space GS between the vibration member 100 and the supporting member 300 can be reduced, thereby improving a sound pressure level characteristic and/or a sound characteristic of a low pitched sound band.

FIGS. 17 to 20 illustrate an arrangement structure of a porous member according to other embodiments of the present disclosure.

Figure 17:
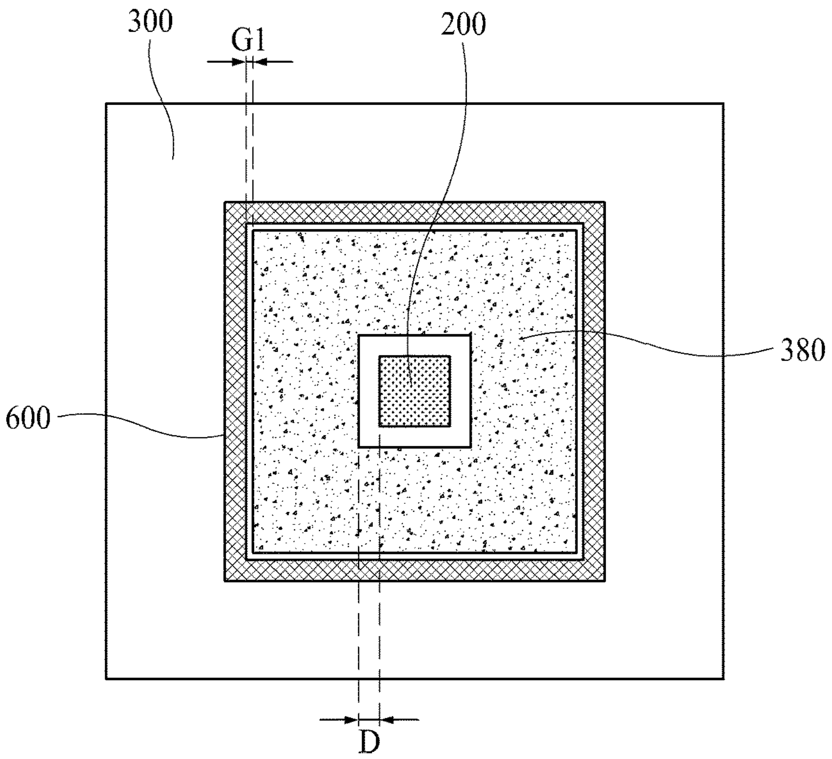
FIGS. 17 to 20 illustrate an arrangement structure of a porous member according to another embodiment of the present disclosure.

FIG. 17 illustrates an arrangement structure of a vibration apparatus 200, a partition member 600, and a porous member 380, with respect to a plan view of the supporting member 300 illustrated in FIG. 13 or 14. Referring to FIG. 13 or 14 and 17, the porous member 380 according to embodiments of the present disclosure can be disposed between the vibration apparatus 200 and the partition member 600.

The partition member 600 can include four sides surrounding the vibration apparatus 200. For example, the partition member 600 can include a first side (or a left side), a second side (or a right side) parallel to the first side, a third side (or an upper side) between one side of the first side and one side of the second side, and a fourth side (or a lower side) between the other side of the first side and the other side of the second side. The partition member 600 can be formed in a structure where the first to fourth sides are provided as one body, and thus, can be implemented in a structure which seals a gap space GS between the vibration member 100 and a supporting member 300 at a periphery of the vibration apparatus 200.

The porous member 380 can be spaced apart from the partition member 600 by a certain interval G1. The porous member 380 can be surrounded by the partition member 600. For example, the porous member 380 can be disposed at a portion, which does not overlap with the partition member 600, of an upper surface of the supporting member 300. The porous member 380 can be spaced apart from the vibration apparatus 200 by a certain interval D. For example, the porous member 380 can be disposed at a portion, which does not overlap with the vibration apparatus 200, of the upper surface of the supporting member 300.

Figure 18:
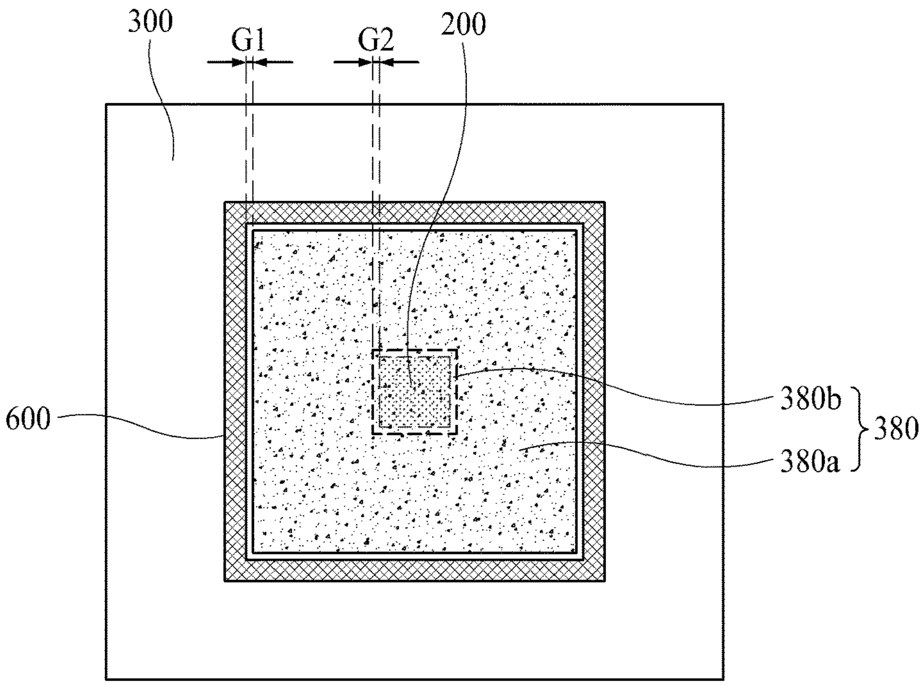

FIG. 18 illustrates an arrangement structure of a vibration apparatus 200, a partition member 600, and a porous member 380, with respect to a plan view of the supporting member 300 illustrated in FIG. 15 or 16. Referring to FIG. 15 or 16 and 18, the porous member 380 according to embodiments of the present disclosure can be disposed between the vibration apparatus 200 and the partition member 600.

The partition member 600 can include four sides surrounding the vibration apparatus 200. The partition member 600 can be formed in a structure where first to fourth sides are provided as one body, and thus, can be implemented in a structure which seals a gap space GS between the vibration member 100 and a supporting member 300 at a periphery of the vibration apparatus 200. For example, the partition member 600 can have a ring shape or a closed loop shape.

The porous member 380 can be spaced apart from the partition member 600 by a certain interval G1. The porous member 380 can be surrounded by the partition member 600. For example, the porous member 380 can be disposed at a portion, which does not overlap with the partition member 600, of an upper surface of the supporting member 300.

The porous member 380 can be disposed to overlap with the vibration apparatus 200. The porous member 380 can be disposed to overlap with the vibration apparatus 200, in the gap space GS between the vibration member 100 and the supporting member 300. For example, the porous member 380 can be disposed at a portion, overlapping with the vibration apparatus 200, of the upper surface of the supporting member 300. The porous member 380 can be disposed to overlap with the vibration apparatus 200 with being apart therefrom, in the gap space GS between the vibration member 100 and the supporting member 300. The porous member 380, as illustrated in FIG. 15, can be configured to have a uniform thickness T capable of being spaced apart from the vibration apparatus 200 by a certain interval h2, in the gap space GS between the vibration member 100 and the supporting member 300. The porous member 380, as illustrated in FIG. 15, can include a first porous member 380*a* which surrounds a periphery of the vibration apparatus 200 at a portion which does not overlap with the vibration apparatus 200 and has a first thickness T1 corresponding to a height H of the gap space GS and a second porous member 380*b* having a second thickness T2 capable of being spaced apart from the rear surface of the vibration apparatus 200 by a certain interval h1 at a portion overlapping the vibration apparatus 200.

Figure 19:
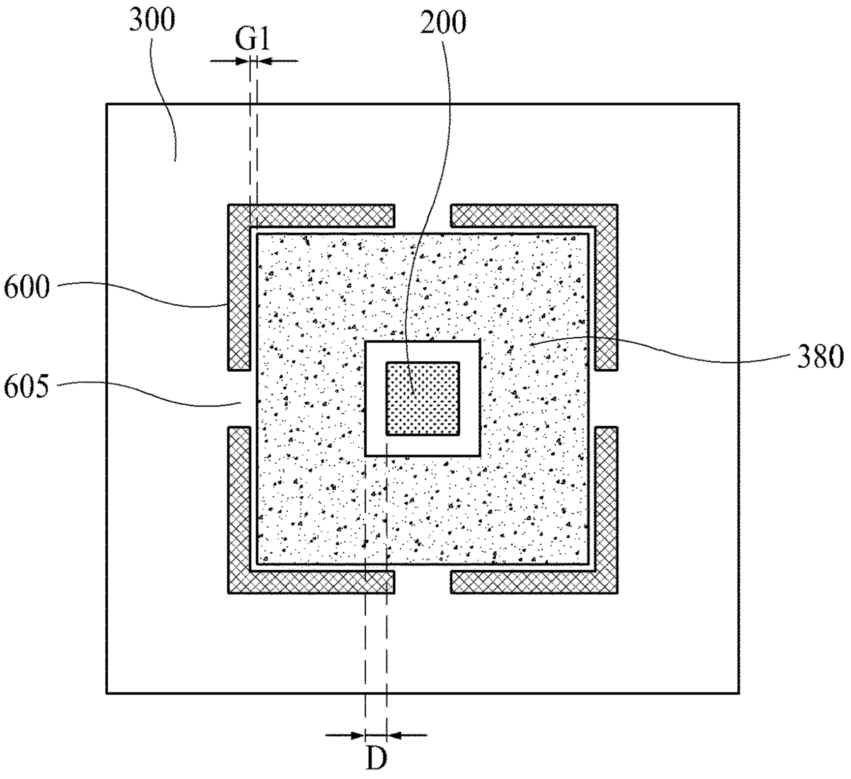

FIG. 19 illustrates an embodiment implemented by modifying a structure of a partition member 600 in an arrangement structure of the vibration apparatus 200, the partition member 600, and the porous member 380 illustrated in FIG. 17. Referring to FIG. 13 or 14 and 19, a porous member 380 according to another embodiment of the present disclosure can be disposed between a vibration apparatus 200 and a partition member 600 including at least one open portion 605.

The partition member 600 can include four sides surrounding the vibration apparatus 200. For example, the partition member 600 can include a first side (or a left side), a second side (or a right side) parallel to the first side, a third side (or an upper side) between one side of the first side and one side of the second side, and a fourth side (or a lower side) between the other side of the first side and the other side of the second side. The partition member 600 can include the open portion 605 which passes through an inner portion and an outer portion of the partition member 600, in one or more of the first to fourth sides. The partition member 600 can include the open portion 605 provided in one or more of the first to fourth sides, and thus, can be implemented in a structure which does not seal a gap space GS between the vibration member 100 and a supporting member 300 at a periphery of the vibration apparatus 200.

The porous member 380 can be spaced apart from the partition member 600 by a certain interval G1. The porous member 380 can be surrounded by the partition member 600. In the porous member 380, the other portion, except for the open portion 605, of the partition member 600 can be surrounded. For example, the porous member 380 can be disposed at a portion, which does not overlap with the partition member 600, of an upper surface of the supporting member 300. The porous member 380 can be spaced apart from the vibration apparatus 200 by a certain interval D. For example, the porous member 380 can be disposed at a portion, which does not overlap with the vibration apparatus 200, of the upper surface of the supporting member 300.

Figure 20:
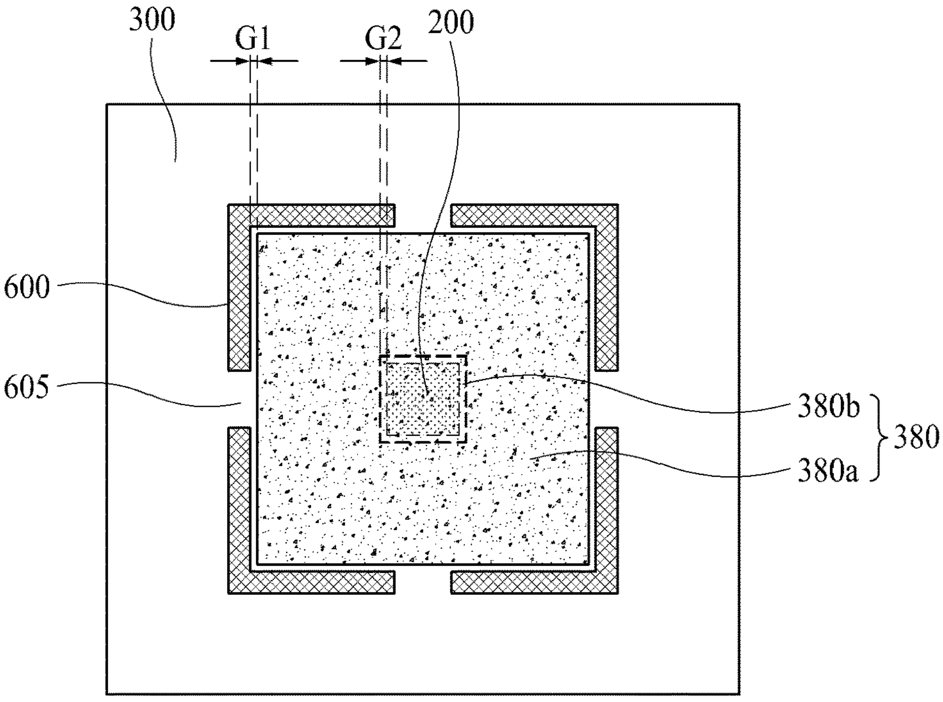

FIG. 20 illustrates an embodiment implemented by modifying a structure of a partition member 600 in an arrangement structure of the vibration apparatus 200, the partition member 600, and the porous member 380 illustrated in FIG. 18. Referring to FIG. 15 or 16 and 20, a porous member 380 according to another embodiment of the present disclosure can be disposed between a vibration apparatus 200 and a partition member 600 including at least one open portion 605.

The partition member 600 can include four sides surrounding the vibration apparatus 200 and can include the open portion 605 in one or more of first to fourth sides. In the partition member 600, the open portion 605 can be formed in one or more of the first to fourth sides, and thus, the partition member 600 can be implemented in a structure which does not seal a gap space GS between the vibration member 100 and a supporting member 300 at a periphery of the vibration apparatus 200.

The porous member 380 can be spaced apart from the partition member 600 by a certain interval G1. In the porous member 380, the other portion, except for the open portion 605, of the partition member 600 can be surrounded. For example, the porous member 380 can be disposed at a portion, which does not overlap with the partition member 600, of an upper surface of the supporting member 300. The porous member 380 can be disposed to overlap with the vibration apparatus 200 while being spaced apart from the vibration apparatus 200. For example, the porous member 380 can be disposed at a portion, overlapping with the vibration member 200, of the upper surface of the supporting member 300. The porous member 380 can be disposed to overlap with the vibration apparatus 200 while being apart spaced from the vibration apparatus 200, in the gap space GS between the vibration member 100 and the supporting member 300.

Figure 21:
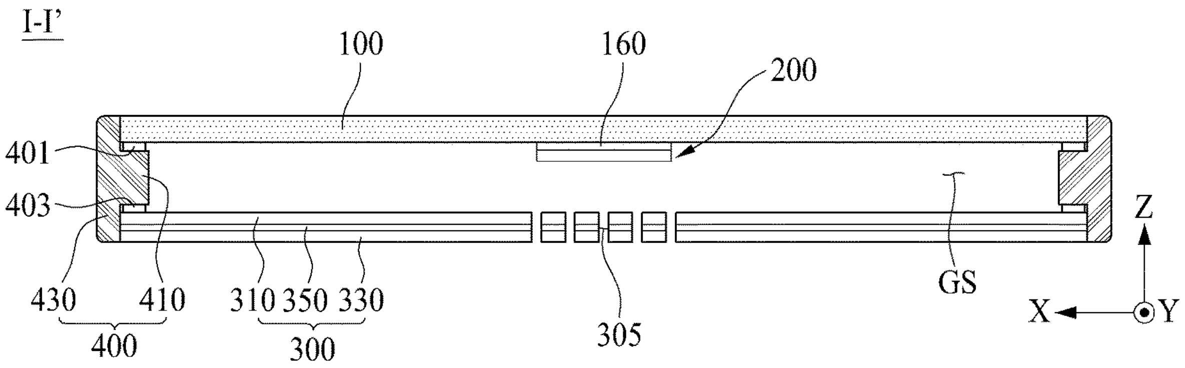
FIG. 21 is another cross-sectional view taken along line I-I' illustrated in FIG. 1.

FIG. 21 is another cross-sectional view taken along line I-I' illustrated in FIG. 1. FIG. 21 illustrates an embodiment implemented by modifying a configuration of the supporting member in the apparatus described above with reference to FIG. 12.

Referring to FIGS. 1 and 21, an apparatus according to another embodiment of the present disclosure can include a vibration member 100, a supporting member 300, and a vibration apparatus 200 between the vibration member 100 and the supporting member 300. The vibration apparatus 200 can be disposed at a rear surface (or a backside surface) of the vibration member 100. For example, the vibration member 100 can be a passive vibration member, a vibration object, a display panel, a vibration plate, or a front member, but embodiments of the present disclosure are not limited thereto.

The supporting member 300 according to an embodiment of the present disclosure can include at least one through hole 305 (or a first hole). For example, the supporting member 300 can include a plurality of through holes 305 (e.g., vents or ports).

The at least one through hole 305 can be provided to decrease an air pressure of a gap space GS between the vibration member 100 and the supporting member 300. For example, the at least one through hole 305 can be disposed at a position for reducing the air pressure of the gap space GS when a sound wave is generated by a vibration of the vibration apparatus 200. For example, the number, shapes, and sizes of through holes 305 can be variously set. As illustrated in FIG. 21, the at least one through hole 305 can be provided in plurality, and the plurality of through holes 305 can be arranged at a certain interval in a region, corresponding to the vibration apparatus 200, of a region of the supporting member 300. For example, the at least one through hole 305 can be disposed in a region, corresponding to a portion of the vibration apparatus 200, of the supporting member 300. The at least one through hole 305 can be disposed in a region, corresponding to an edge of the vibration apparatus 200, of the supporting member 300.

The at least one through hole 305 can provide a path which enables the gap space GS between the vibration member 100 and the supporting member 300 to be connected or communicate with the outside. The at least one through hole 305 can be formed to pass through or vertically pass through the supporting member 300 in a thickness direction Z of the supporting member 300. Accordingly, the gap space GS between the vibration member 100 and the supporting member 300 can be connected or communicate with the outside by the at least one through hole 305, and thus, the air pressure of the gap space GS between the vibration member 100 and the supporting member 300 can be reduced.

The supporting member 300 according to another embodiment of the present disclosure can include a first supporting member 310 and a second supporting member 330.

The first supporting member 310 can be disposed between a rear surface of the vibration member 100 or a display panel and the second supporting member 330. For example, the first supporting member 310 can be an inner plate, a first rear structure material, a first supporting structure material, a first supporting cover, a first back cover, a first rear member, an internal plate, or an internal cover, but the terms are not limited thereto. For example, the first supporting member 310 can be omitted.

The first supporting member 310 can be spaced apart from a rearmost surface of the vibration member 100 with a gap space GS (or a first space) therebetween, or can be spaced apart from the vibration apparatus 200. For example, the gap space GS can be referred to as an internal space, an air gap, a vibration space, or a sound sounding box, but the terms are not limited thereto.

The second supporting member 330 can be disposed at a rear surface of the first supporting member 310. For example, the second supporting member 330 can be an outer plate, a rear plate, a back plate, a back cover, a rear cover, a second rear structure material, a second supporting structure material, a second supporting cover, a second back cover, a second rear member, an external plate, or an external cover, but the terms are not limited thereto.

According to another embodiment of the present disclosure, the first supporting member 310 and the second supporting member 330 can each include at least one through hole 305 (e.g., one or more vents or ports). For example, the at least one through hole 305 can be formed to pass through or vertically pass through the first supporting member 310 and the second supporting member 330 in a thickness direction Z of the first supporting member 310 and the second supporting member 330.

According to another embodiment of the present disclosure, the first supporting member 310 and the second supporting member 330 can include different materials. For example, the first supporting member 310 can include a metal material such as an Al material which is good in heat conductivity, and the second supporting member 330 can include a glass material, but embodiments of the present disclosure are not limited thereto.

According to another embodiment of the present disclosure, the first supporting member 310 and the second supporting member 330 can have the same thickness or different thicknesses. For example, the first supporting member 310 can have a thickness which is relatively thinner than the second supporting member 330, but embodiments of the present disclosure are not limited thereto.

The supporting member 300 according to an embodiment of the present disclosure can further include a connection member 350. For example, the connection member 350 can be disposed between the first supporting member 310 and the second supporting member 330. For example, the first supporting member 310 and the second supporting member 330 can be coupled to or connected with each other by the connection member 350.

Figure 22:
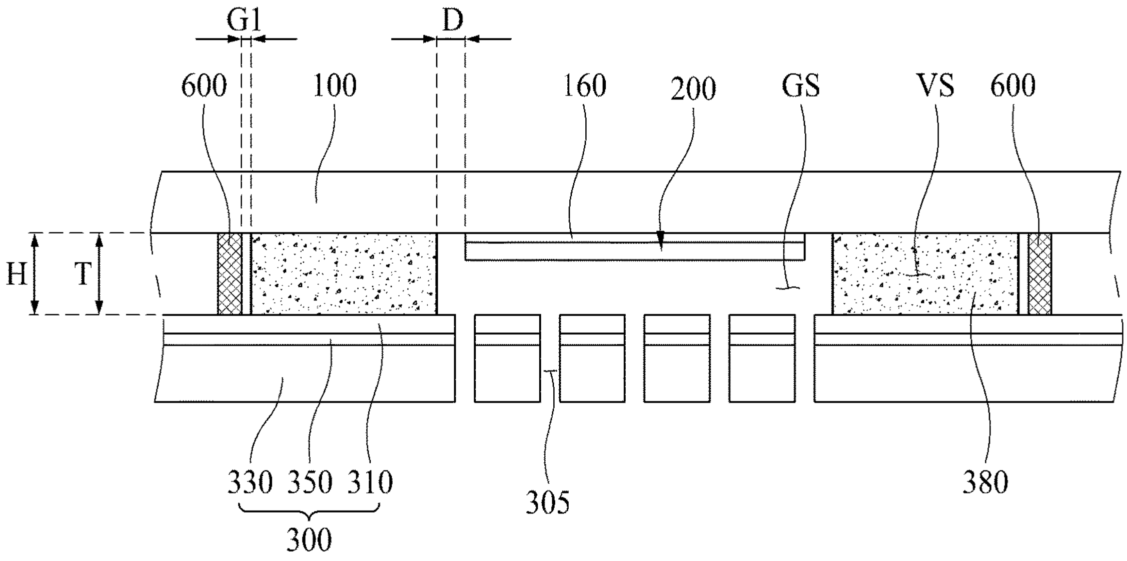
FIGS. 22 to 25 illustrate a vibration apparatus according to embodiments of the present disclosure.
Figure 23:
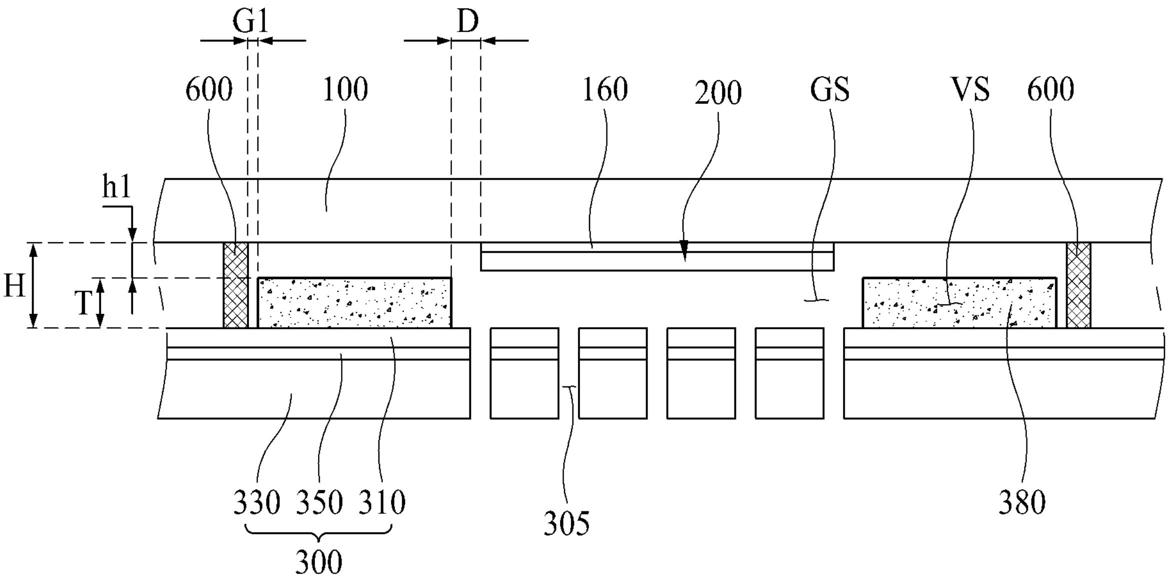
Figure 24:
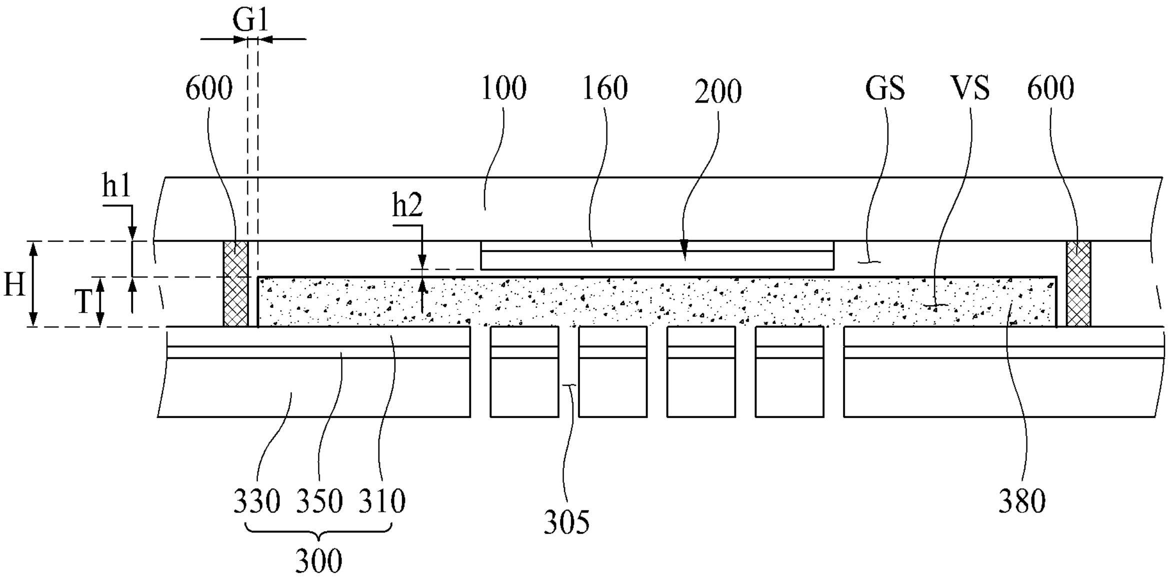
Figure 25:
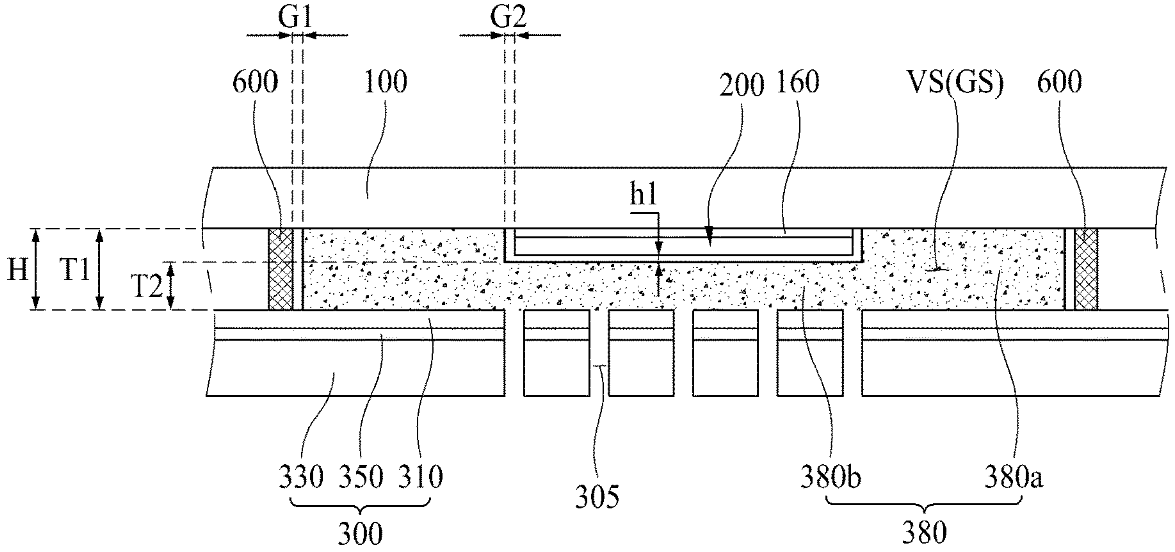

FIGS. 22 to 25 illustrate a vibration apparatus according to other embodiments of the present disclosure. FIGS. 23 to 25 illustrate embodiments where a porous member is added to the apparatus described above with reference to FIG. 21. In the following description, therefore, repeated descriptions of the same elements except a porous member and relevant elements are omitted or will be briefly given below.

Referring to FIG. 22, a vibration apparatus 200 according to another embodiment of the present disclosure can be implemented as a film type where the vibration apparatus 200 is connected with or attached on a rear surface of a vibration member 100 by using a connection member 160. The vibration apparatus 200 can further include a porous member 380 between the vibration member 100 and a supporting member 300.

The vibration apparatus 200 can be referred to as a sound generating module, a sound generating apparatus, a vibration generating apparatus, a displacement apparatus, a sound apparatus, a film actuator, a vibrator, a film type piezoelectric composite actuator, a film speaker, a film type piezoelectric speaker, or a film type piezoelectric composite speaker, which uses a piezoelectric device having a piezoelectric characteristic, but the terms are not limited thereto.

The vibration apparatus 200 can be connected with or supported by the rear surface of the vibration member 100 by the connection member 160. The vibration apparatus 200 can be disposed in a gap space GS (or an internal space) between the vibration member 100 and the supporting member 300 and can be surrounded by the supporting member 300, and thus, the vibration apparatus 200 can be protected from an external impact.

A gap space GS can be provided between the vibration member 100 and the supporting member 300. A partition member 600 providing or limiting the gap space GS can be further provided between the vibration member 100 and the supporting member 300.

The partition member 600 can provide or define a gap space GS which generates a sound when the vibration member 100 is vibrated by the vibration apparatus 200. The partition member 600 can separate the sound generated by the vibration member 100, or can separate a channel, and thus, can prevent or decrease interference of the sound. The partition member 600 can be referred to as an enclosure or a baffle, but the terms are not limited thereto.

The partition member 600 can divide or provide a gap space GS (or an internal space) corresponding to one vibration apparatus 200. For example, the partition member 600 can be provided to surround a periphery of one vibration apparatus 200. The partition member 600 can include four sides surrounding the vibration apparatus 200. For example, the partition member 600 can be implemented in a structure where the four sides are provided as one body, and thus, can be configured in a structure which seals the gap space GS between the vibration member 100 and the supporting member 300 at a periphery of the vibration apparatus 200. As another example, the partition member 600 can include a plurality of open portions which are provided at one or more of the four sides, and thus, can be configured in a structure which does not seal the gap space GS between the vibration member 100 and the supporting member 300 at the periphery of the vibration apparatus 200.

The gap space GS provided or divided by the partition member 600 can be connected or communicate with the outside through the at least one through hole 305 of the supporting member 300. For example, because the gap space GS provided or divided by the partition member 600 is connected or communicates with the outside through the at least one through hole 305 of the supporting member 300, an air pressure of the gap space GS can decrease. Accordingly, an air pressure of the gap space GS can be reduced by the partition member 600, and thus, an air impedance of the gap space GS can decrease, thereby improving a sound pressure level characteristic and/or a sound characteristic of a low pitched sound band. For example, low frequency sounds or base sounds can be improved.

The porous member 380 can be disposed between the vibration apparatus 200 and the partition member 600, in the gap space GS (or the internal space) between the vibration member 100 and the supporting member 300. The porous member 380 can be provided to surround the vibration apparatus 200. For example, the porous member 380 can be configured to surround the periphery of the vibration apparatus 200. The porous member 380 can be apart from the vibration apparatus 200 and can be provided to surround the periphery of the vibration apparatus 200. The porous member 380 can be surrounded by the partition member 600. For example, a periphery of the porous member 380 can be surrounded by the partition member 600. The porous member 380 can be spaced apart from the partition member 600, and the periphery of the porous member 380 can be surrounded by the partition member 600. The porous member 380 can be disposed at a portion, which does not overlap with the through hole 305, of the supporting member 300. For example, the porous member 380 can be spaced apart from the through hole 305 of the supporting member 300.

The porous member 380 can be configured to have a uniform thickness T in the gap space GS (or the internal space) between the vibration member 100 and the supporting member 300. For example, the porous member 380 can be configured to have the thickness T which is less than or equal to a height H of the gap space GS between the vibration member 100 and the supporting member 300. The upper surface of the porous member 380 can contact the rear surface of the vibration member 100, and a lower surface of the porous member 380 can be provided to contact the upper surface of the supporting member 300. The porous member 380 can be configured to have the thickness T which is equal to the height H between the rear surface of the vibration member 100 and the upper surface of the supporting member 300.

The porous member 380 can be disposed at a portion, which does not overlap with the vibration apparatus 200 and the partition member 600, in the gap space GS (or the internal space) between the vibration member 100 and the supporting member 300. For example, the porous member 380 can be spaced apart from the partition member 600 by a certain interval G1, in the gap space GS between the vibration member 100 and the supporting member 300. The porous member 380 can be spaced apart from the vibration apparatus 200 by a certain interval D, in the gap space GS between the vibration member 100 and the supporting member 300. The porous member 380 can be disposed at a portion which does not overlap with the through hole 305 of the supporting member 300, in the gap space GS between the vibration member 100 and the supporting member 300.

The porous member 380 can include a porous material including a plurality of pores provided therein. The porous member 380 can include a porous material having a range where a porosity rate is about 90%. For example, the porous member 380 can include one or more materials of a PCP, an MOF, a foam, a sponge, zeolite, and activated carbon, but embodiments of the present disclosure are not limited thereto.

The porous member 380 can provide a porous space VS including a plurality of pores in the gap space GS (or the internal space) between the vibration member 100 and the supporting member 300. For example, the porous space VS can have a volume surrounding the periphery of the vibration apparatus 200 in the gap space GS between the vibration member 100 and the supporting member 300. The porous space VS can fill the gap space GS between the vibration member 100 and the supporting member 300 and can have a volume surrounding a periphery apart from the vibration apparatus 200 by the certain interval D. Also, the porous space VS can have a volume surrounding a periphery apart from the through hole 305 of the supporting member 300. In the porous space VS, an area contacting air per unit volume can increase based on a plurality of pores formed therein and a flow path of air flowing between the plurality of pores can increase, and thus, a volume of the gap space GS between the vibration member 100 and the supporting member 300 can be greater than a real volume. Accordingly, the porous member 380 can contribute to an increase in a volume of internal air of the gap space GS between the vibration member 100 and the supporting member 300, and an air impedance of the gap space GS between the vibration member 100 and the supporting member 300 can be reduced, thereby improving a sound pressure level characteristic and/or a sound characteristic of a low pitched sound band.

Referring to FIG. 23, a porous member 380 of a vibration apparatus 200 according to another embodiment of the present disclosure can be configured to have a uniform thickness T and be spaced apart from a vibration member 100 by a certain interval h1, in a gap space GS (or an internal space) between the vibration member 100 and a supporting member 300. For example, the porous member 380 can be configured to have the thickness T which is less than a height H of the gap space GS between the vibration member 100 and the supporting member 300. The porous member 380 can be provided to contact an upper surface of the supporting member 300. The porous member 380 can be attached on or coupled to the upper surface of the supporting member 300 by using an adhesive member.

The porous member 380 can be disposed at a portion, which does not overlap with the vibration apparatus 200 and a partition member 600, in the gap space GS (or the internal space) between the vibration member 100 and the supporting member 300. For example, the porous member 380 can be spaced apart from the partition member 600 by a certain interval G1, in the gap space GS between the vibration member 100 and the supporting member 300. The porous member 380 can be spaced apart from the vibration apparatus 200 by a certain interval D, in the gap space GS between the vibration member 100 and the supporting member 300. The porous member 380 can be disposed at a portion which does not overlap with the through hole 305 of the supporting member 300. For example, the porous member 380 can be spaced apart from the through hole 305 of the supporting member 300.

The porous member 380 can include a porous material including a plurality of pores provided therein. The porous member 380 can include a porous material having a range where a porosity rate is about 90%. For example, the porous member 380 can include one or more materials of a PCP, an MOF, a foam, a sponge, zeolite, and activated carbon, but embodiments of the present disclosure are not limited thereto.

The porous member 380 can provide a porous space VS including a plurality of pores in the gap space GS (or the internal space) between the vibration member 100 and the supporting member 300. For example, the porous space VS can have a uniform thickness V from an upper surface of the supporting member 300 in the gap space GS between the vibration member 100 and the supporting member 300 and can have a volume surrounding a periphery of the vibration apparatus 200. The porous space VS can have the uniform thickness V from the upper surface of the supporting member 300 in the gap space GS between the vibration member 100 and the supporting member 300 and can have a volume surrounding the periphery of the vibration apparatus 200 and be spaced apart from the vibration apparatus 200 by a certain interval D. Also, the porous space VS can have a volume surrounding a periphery apart from the through hole 305 of the supporting member 300. In the porous space VS, an area contacting air per unit volume can increase based on a plurality of pores formed therein and a flow path of air flowing between the plurality of pores can increase, and thus, a volume of the gap space GS between the vibration member 100 and the supporting member 300 can be greater than a real volume. Accordingly, the porous member 380 can contribute to an increase in a volume of internal air of the gap space GS between the vibration member 100 and the supporting member 300, and an air impedance of the gap space GS between the vibration member 100 and the supporting member 300 can be reduced, thereby improving a sound pressure level characteristic and/or a sound characteristic of a low pitched sound band.

Referring to FIG. 24, a porous member 380 of a vibration apparatus 200 according to another embodiment of the present disclosure can be configured to have a uniform thickness T and be spaced apart from a vibration member 100 by a certain interval h1 and apart from a heat dissipation member 150 by a certain interval h2, in a gap space GS (or an internal space) between the vibration member 100 and a supporting member 300. For example, the porous member 380 can be configured to have the thickness T which is less than a height H of the gap space GS between the vibration member 100 and the supporting member 300. The porous member 380 can be provided to contact an upper surface of the supporting member 300. The porous member 380 can be attached on or coupled to the upper surface of the supporting member 300 by using an adhesive member. The porous member 380 can be disposed at a portion which does overlap with a through hole 305 of the supporting member 300 in the gap space GS between the vibration member 100 and the supporting member 300. For example, the porous member 380 can be provided to cover the through hole 305 of the supporting member 300.

The porous member 380 can be disposed at a portion, which does not overlap with a partition member 600, in the gap space GS (or the internal space) between the vibration member 100 and the supporting member 300. For example, the porous member 380 can be disposed in the gap space GS between the vibration member 100 and the supporting member 300 surrounded by the partition member 600. The porous member 380 can be spaced apart from the partition member 600 by a certain interval G1, in the gap space GS between the vibration member 100 and the supporting member 300. The porous member 380 can be spaced apart from a rear surface of the vibration apparatus 200 to overlap with each other, in the gap space GS between the vibration member 100 and the supporting member 300. The porous member 380 can have a uniform thickness T apart from a rear surface of the heat dissipation member 150 by a certain interval h2.

The porous member 380 can include a porous material including a plurality of pores provided therein. The porous member 380 can include a porous material having a range where a porosity rate is about 90%. For example, the porous member 380 can include one or more materials of a PCP, an MOF, a foam, a sponge, zeolite, and activated carbon, but embodiments of the present disclosure are not limited thereto.

The porous member 380 can provide a porous space VS including a plurality of pores in the gap space GS (or the internal space) between the vibration member 100 and the supporting member 300. For example, the porous space VS can have a volume having a constant thickness T from an upper surface of the supporting member 300, in the gap space GS between the vibration member 100 and the supporting member 300 surrounded by the partition member 600. The porous space VS can have a volume having a constant thickness T and be spaced apart from the vibration apparatus 200 by a certain interval h2, in the gap space GS between the vibration member 100 and the supporting member 300 surrounded by the partition member 600. Also, the porous space VS can be provided to cover the through hole 305 of the supporting member 300 (e.g., 380 overlaps with 305). In the porous space VS, an area contacting air per unit volume can increase based on a plurality of pores formed therein and a flow path of air flowing between the plurality of pores can increase, and thus, a volume of the gap space GS between the vibration member 100 and the supporting member 300 can be greater than a real volume. Accordingly, the porous member 380 can contribute to an increase in a volume of internal air of the gap space GS between the vibration member 100 and the supporting member 300, and an air impedance of the gap space GS between the vibration member 100 and the supporting member 300 can be reduced, thereby improving a sound pressure level characteristic and/or a sound characteristic of a low pitched sound band.

Referring to FIG. 25, a porous member 380 of a vibration apparatus 200 according to another embodiment of the present disclosure can be configured to have different thicknesses T1 and T2 in a gap space GS (or an internal space) between a vibration member 100 and a supporting member 300. For example, the porous member 380 can be configured to have a first thickness T1 which is less than or equal to a height H of the gap space GS between the vibration member 100 and the supporting member 300 and a second thickness T2 which is less than the height H of the gap space GS between the vibration member 100 and the supporting member 300 and is spaced apart from the vibration apparatus 200 by a certain interval h1. For example, the porous member 380 can include a first porous member 380*a* having the first thickness T1 and a second porous member 380*b* having the second thickness T2. For example, the first porous member 380*a* and the second porous member 380*b* can be provided as one body.

The first porous member 380*a* can be provided to contact a rear surface of the vibration member 100 and an upper surface of the supporting member 300. The first porous member 380*a* can be configured to have the first thickness T1 which is equal to the height H of the gap space GS between the vibration member 100 and the supporting member 300. For example, a rear surface of the first porous member 380*a* can be attached on or coupled to the upper surface of the supporting member 300 by using an adhesive member, and an upper surface of the first porous member 380*a* can be attached on or coupled to a rear surface of the vibration member 100 by using the adhesive member. As another example, the rear surface of the first porous member 380*a* can be attached on or coupled to the upper surface of the supporting member 300 by using the adhesive member, and the upper surface of the first porous member 380*a* can be spaced apart from the vibration member 100, or can be attached on the rear surface of the vibration member 100 without a separate adhesive member. For example, the adhesive member can be a double-sided tape, a single-sided tape, an adhesive, or a bond, but embodiments of the present disclosure are not limited thereto.

The first porous member 380*a* can be spaced apart from the partition member 600 by a certain interval G1, in the gap space GS between the vibration member 100 and the supporting member 300. The first porous member 380*a* can be disposed at a portion, which does not overlap with the vibration apparatus 200 connected with the rear surface of the vibration member 200. For example, the first porous member 380*a* can be disposed at a portion spaced apart from the vibration apparatus 200 by a certain interval G2. The first porous member 380*a* can be disposed at a portion which is spaced apart from the partition member 600 by the certain interval G1 and is spaced apart from the vibration apparatus 200 by the certain interval G2.

The second porous member 380*b* can be disposed at a portion that does overlap with the vibration apparatus 200, in the gap space GS between the vibration member 100 and the supporting member 300. The second porous member 380*b* can be disposed at a portion overlapping with the through hole 305 of the supporting member 300. For example, the second porous member 380*b* can be configured to have a second thickness T2 and be spaced apart from the rear surface of the vibration apparatus by a certain interval h1, in the gap space GS between the vibration member 100 and the supporting member 300. The second porous member 380*b* can be provided to contact an upper surface of the supporting member 300 and cover the through hole 305 of the supporting member 300. For example, a rear surface of the second porous member 380*b* can be attached on or coupled to the upper surface of the supporting member 300 by using an adhesive member, and an upper surface of the second porous member 380*b* can be spaced apart from the vibration apparatus 200 by the certain interval h1. For example, the adhesive member can be a double-sided tape, a single-sided tape, an adhesive, or a bond, but embodiments of the present disclosure are not limited thereto.

The porous member 380 can include a porous material including a plurality of pores provided therein. The porous member 380 can include a porous material having a range where a porosity rate is about 90%. For example, the porous member 380 can include one or more materials of a PCP, an MOF, a foam, a sponge, zeolite, and activated carbon, but embodiments of the present disclosure are not limited thereto.

The porous member 380 can provide a porous space VS including a plurality of pores in the gap space GS (or the internal space) between the vibration member 100 and the supporting member 300. For example, the porous space VS can have a volume having a first thickness T1 which is equal to a height H of the gap space GS and a second thickness T2 from an upper surface of the supporting member 300, in the gap space GS between the vibration member 100 and the supporting member 300. The porous space VS can have a volume spaced apart from the vibration apparatus 200 by certain intervals G2 and h1, in the gap space GS between the vibration member 100 and the supporting member 300 surrounded by the partition member 600. The porous space VS can be provided to surround the vibration apparatus 200 coupled to a rear surface of the vibration member 100 with being apart from the vibration apparatus 200 by the certain intervals G2 and h1. Also, the porous space VS can be provided to cover the through hole 305 of the supporting member 300. In the porous space VS, an area contacting air per unit volume can increase based on a plurality of pores formed therein and a flow path of air flowing between the plurality of pores can increase, and thus, a volume of the gap space GS between the vibration member 100 and the supporting member 300 can be greater than a real volume. Accordingly, the porous member 380 can contribute to an increase in a volume of internal air of the gap space GS between the vibration member 100 and the supporting member 300, and an air impedance of the gap space GS between the vibration member 100 and the supporting member 300 can be reduced, thereby improving a sound pressure level characteristic and/or a sound characteristic of a low pitched sound band.

FIGS. 26 to 29 illustrate an arrangement structure of a porous member according to other embodiments of the present disclosure.

Figure 26:
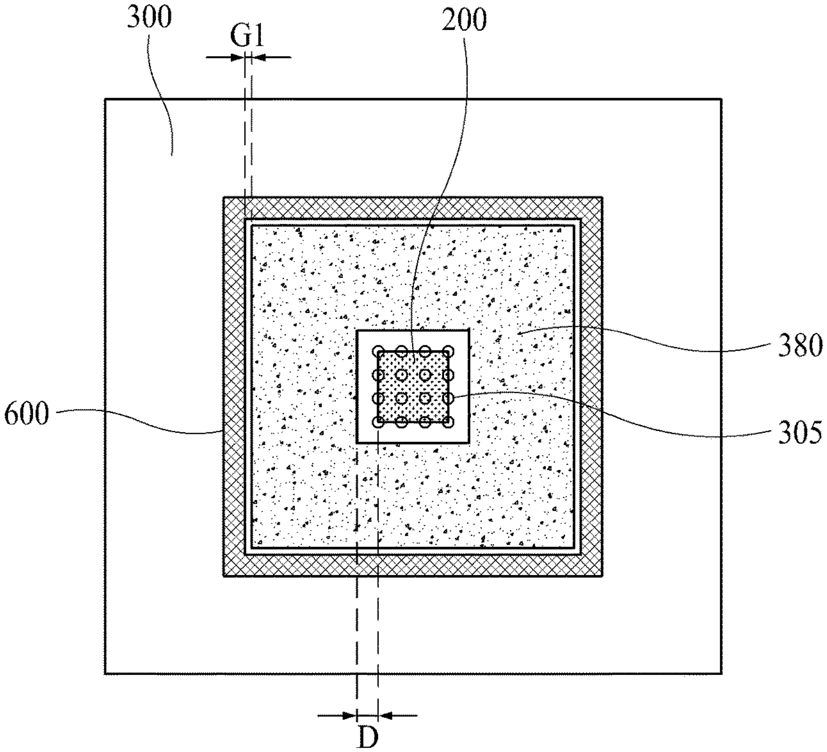
FIGS. 26 to 29 illustrate an arrangement structure of a porous member according to embodiments of the present disclosure.

FIG. 26 illustrates an arrangement structure of a vibration apparatus 200, a partition member 600, and a porous member 380, with respect to a plan view of the supporting member 300 illustrated in FIG. 22 or 23. Referring to FIG. 22 or 23 and 26, the porous member 380 according to another embodiment of the present disclosure can be disposed between the vibration apparatus 200 and the partition member 600.

The partition member 600 can include four sides surrounding the vibration apparatus 200. For example, the partition member 600 can include a first side (or a left side), a second side (or a right side) parallel to the first side, a third side (or an upper side) between one side of the first side and one side of the second side, and a fourth side (or a lower side) between the other side of the first side and the other side of the second side. The partition member 600 can be formed in a structure where the first to fourth sides are provided as one body, and thus, can be implemented in a structure which seals a gap space GS between the vibration member 100 and a supporting member 300 at a periphery of the vibration apparatus 200.

The porous member 380 can be spaced apart from the partition member 600 by a certain interval G1. The porous member 380 can be surrounded by the partition member 600. For example, the porous member 380 can be disposed at a portion, which does not overlap with the partition member 600, of an upper surface of the supporting member 300. The porous member 380 can be spaced apart from the vibration apparatus 200 by a certain interval D. For example, the porous member 380 can be disposed at a portion, which does not overlap with the vibration apparatus 200, of the upper surface of the supporting member 300. The porous member 380 can be disposed at a portion which does not overlap with a through hole 305 of the supporting member 300.

Figure 27:
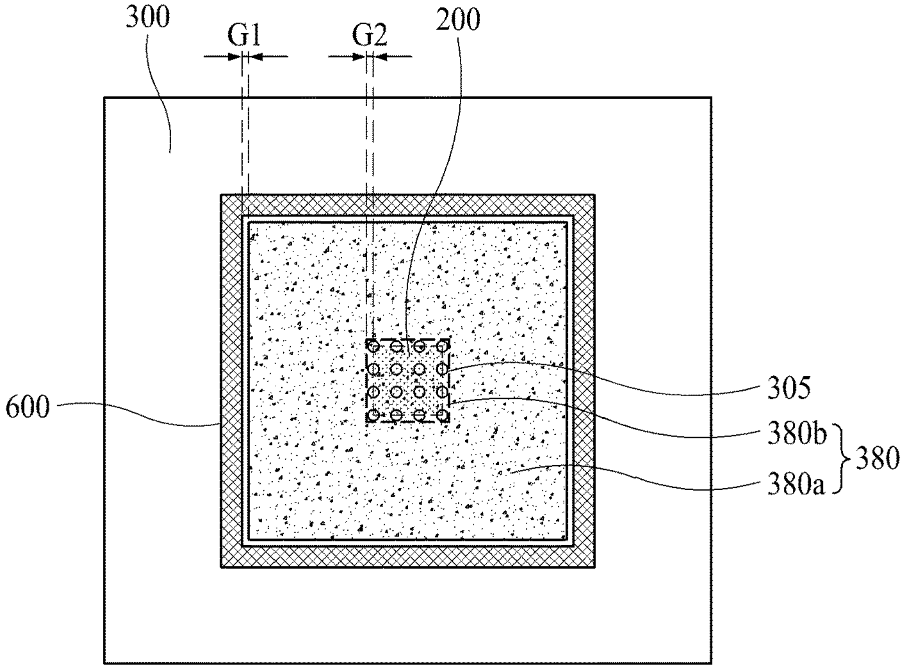

FIG. 27 illustrates an arrangement structure of a vibration apparatus 200, a partition member 600, and a porous member 380, with respect to a plan view of the supporting member 300 illustrated in FIG. 24 or 25. Referring to FIG. 24 or 25 and 27, the porous member 380 according to another embodiment of the present disclosure can be disposed between the vibration apparatus 200 and the partition member 600.

The partition member 600 can include four sides surrounding the vibration apparatus 200. The partition member 600 can be formed in a structure where first to fourth sides are provided as one body, and thus, can be implemented in a structure which seals a gap space GS between the vibration member 100 and a supporting member 300 at a periphery of the vibration apparatus 200.

The porous member 380 can be spaced apart from the partition member 600 by a certain interval G1. The porous member 380 can be surrounded by the partition member 600. For example, the porous member 380 can be disposed at a portion, which does not overlap with the partition member 600, of an upper surface of the supporting member 300.

The porous member 380 can be disposed to overlap with the vibration apparatus 200. The porous member 380 can be disposed to overlap with the vibration apparatus 200, in the gap space GS between the vibration member 100 and the supporting member 300. For example, the porous member 380 can be disposed at a portion, overlapping with the vibration apparatus 200, of the upper surface of the supporting member 300. The porous member 380 can be disposed to overlap with the vibration apparatus 200 while still being spaced apart from the vibration apparatus 200, in the gap space GS between the vibration member 100 and the supporting member 300. The porous member 380 can be disposed to overlap with a through hole 305 of the supporting member 300. For example, the porous member 380 can be provided to cover the through hole 305 of the supporting member 300. The porous member 380, as illustrated in FIG. 24, can be configured to have a uniform thickness T capable of being spaced apart from the vibration apparatus 200 by a certain interval h2, in the gap space GS between the vibration member 100 and the supporting member 300. The porous member 380, as illustrated in FIG. 25, can include a first porous member 380*a* which surrounds a periphery of the vibration apparatus 200 at a portion which does not overlap with the vibration apparatus 200 and has a first thickness T1 corresponding to a height H of the gap space GS and a second porous member 380*b* having a second thickness T2 capable of being spaced apart from the rear surface of the vibration apparatus 200 by a certain interval h1 at a portion overlapping with the vibration apparatus 200.

Figure 28:
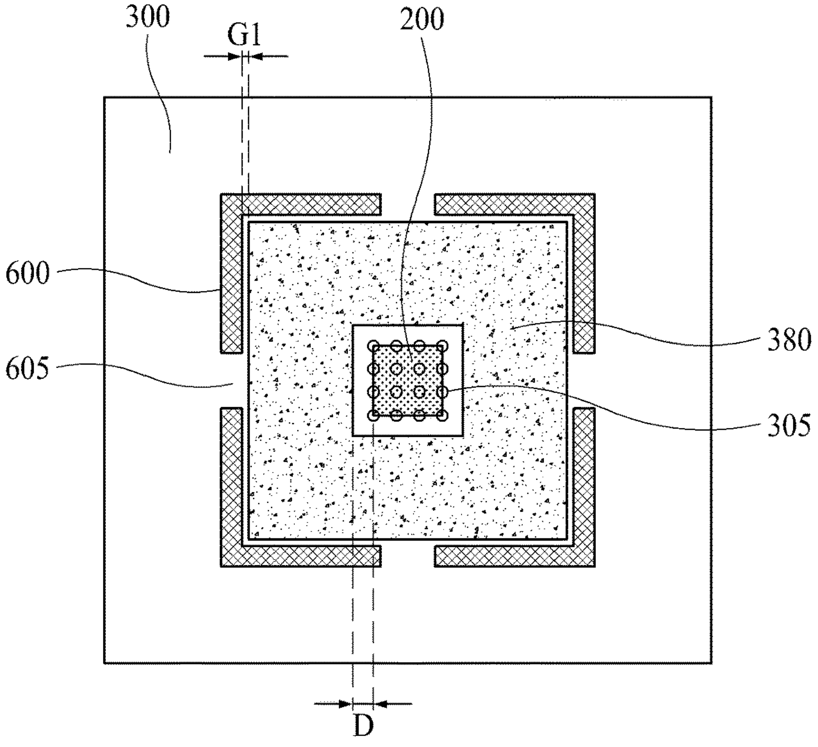

FIG. 28 illustrates an embodiment implemented by modifying a structure of a partition member 600 in an arrangement structure of the vibration apparatus 200, the partition member 600, and the porous member 380 illustrated in FIG. 26. Referring to FIG. 22 or 23 and 28, a porous member 380 according to another embodiment of the present disclosure can be disposed between a vibration apparatus 200 and a partition member 600 including at least one open portion 605.

The partition member 600 can include four sides surrounding the vibration apparatus 200, and the open portion 605 can be included in one or more of the first to fourth sides. The partition member 600 can include the open portion 605 provided in one or more of the first to fourth sides, and thus, can be implemented in a structure which does not seal a gap space GS between the vibration member 100 and a supporting member 300 at a periphery of the vibration apparatus 200.

The porous member 380 can be spaced apart from the partition member 600 by a certain interval G1. The porous member 380 can be surrounded by the partition member 600. In the porous member 380, the other portion, except for the open portion 605, of the partition member 600 can be surrounded. For example, the porous member 380 can be disposed at a portion, which does not overlap with the partition member 600, of an upper surface of the supporting member 300. The porous member 380 can be spaced apart from the vibration apparatus 200 by a certain interval D. For example, the porous member 380 can be disposed at a portion, which does not overlap with the vibration apparatus 200, of the upper surface of the supporting member 300. The porous member 380 can be disposed at a portion which does not overlap with a through hole 305 of the supporting member 300.

Figure 29:
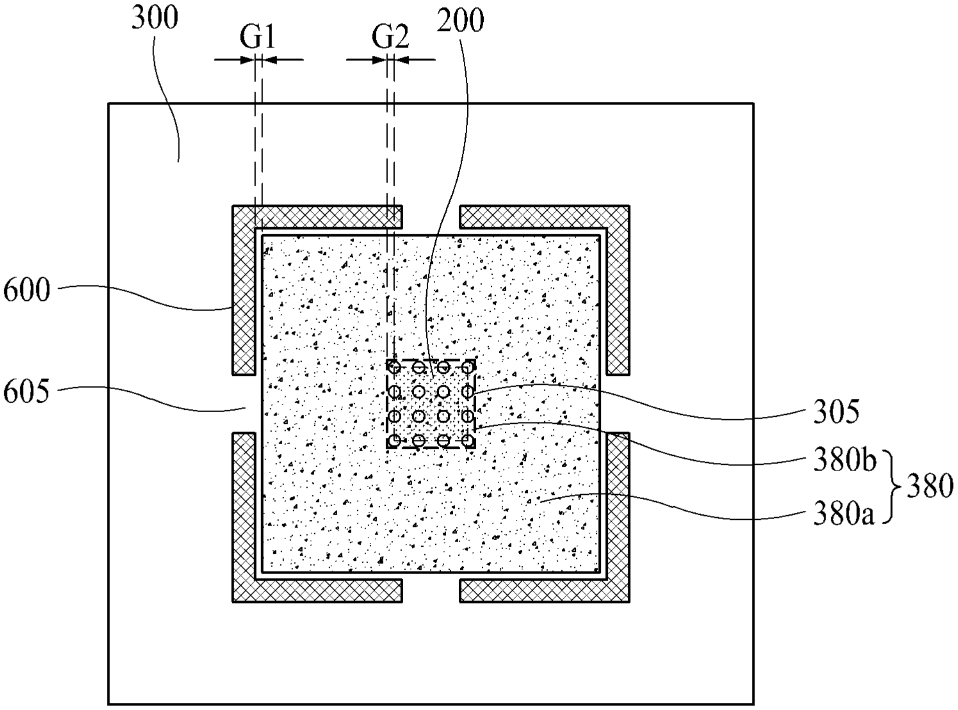

FIG. 29 illustrates an embodiment implemented by modifying a structure of a partition member 600 in an arrangement structure of the vibration apparatus 200, the partition member 600, and the porous member 380 illustrated in FIG. 27. Referring to FIG. 24 or 25 and 29, a porous member 380 according to another embodiment of the present disclosure can be disposed between a vibration apparatus 200 and a partition member 600 including at least one open portion 605.

The partition member 600 can include four sides surrounding the vibration apparatus 200 and can include the open portion 605 in one or more of first to fourth sides. In the partition member 600, the open portion 605 can be formed in one or more of the first to fourth sides, and thus, the partition member 600 can be implemented in a structure which does not seal a gap space GS between the vibration member 100 and a supporting member 300 at a periphery of the vibration apparatus 200.

The porous member 380 can be spaced apart from the partition member 600 by a certain interval G1. In the porous member 380, the other portion, except for the open portion 605, of the partition member 600 can be surrounded. For example, the porous member 380 can be disposed at a portion, which does not overlap with the partition member 600, of an upper surface of the supporting member 300.

The porous member 380 can be disposed to overlap with the vibration apparatus 200. The porous member 380 can be disposed to overlap with the vibration apparatus 200, in the gap space GS between the vibration member 100 and the supporting member 300. For example, the porous member 380 can be disposed at a portion, overlapping with the vibration apparatus 200, of the upper surface of the supporting member 300. The porous member 380 can be disposed to overlap with the vibration apparatus 200 with being spaced apart therefrom, in the gap space GS between the vibration member 100 and the supporting member 300. The porous member 380 can be disposed to overlap with a through hole 305 of the supporting member 300. For example, the porous member 380 can be provided to cover the through hole 305 of the supporting member 300. The porous member 380, as illustrated in FIG. 24, can be configured to have a uniform thickness T capable of being spaced apart from the vibration apparatus 200 by a certain interval h2, in the gap space GS between the vibration member 100 and the supporting member 300. The porous member 380, as illustrated in FIG. 25, can include a first porous member 380*a* which surrounds a periphery of the vibration apparatus 200 at a portion which does not overlap with the vibration apparatus 200 and has a first thickness T1 corresponding to a height H of the gap space GS and a second porous member 380*b* having a second thickness T2 capable of being spaced apart from the rear surface of the vibration apparatus 200 by a certain interval h1 at a portion overlapping the vibration apparatus 200.

Figure 30:
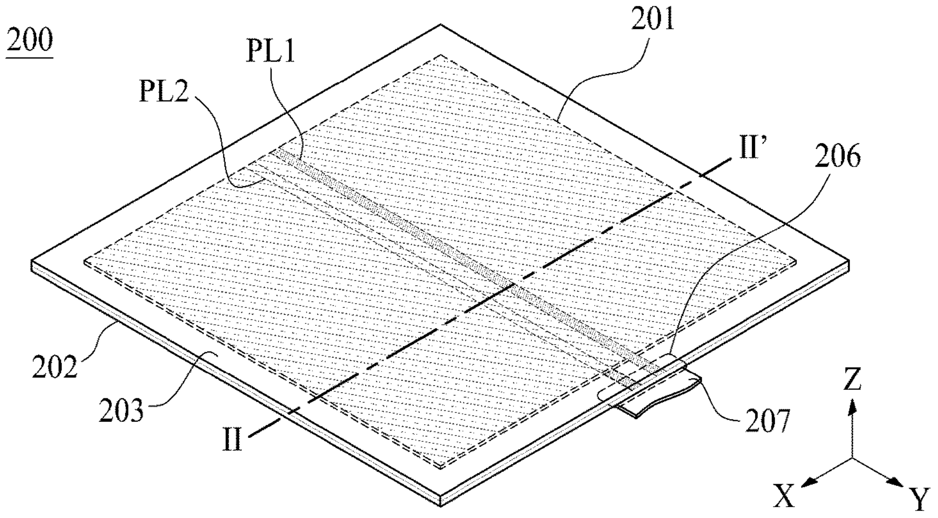
FIG. 30 illustrates a vibration apparatus according to another embodiment of the present disclosure.
Figure 31:
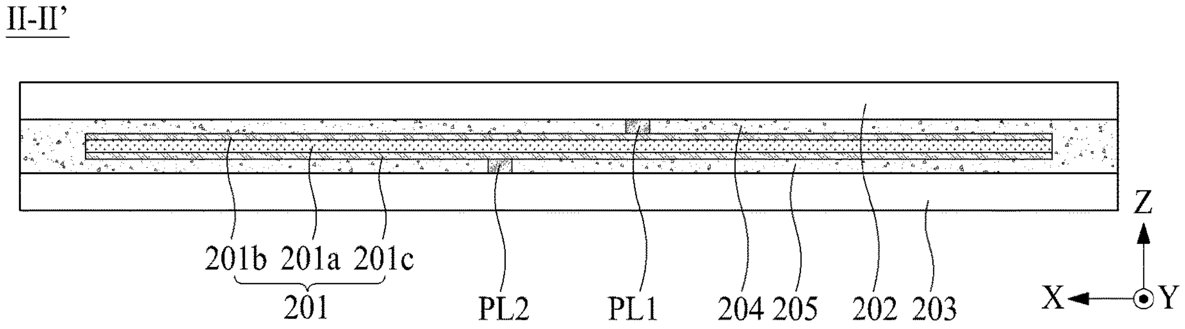
FIG. 31 is a cross-sectional view taken along line II-IP illustrated in FIG. 30 according to an embodiment of the present disclosure.
Figure 32:
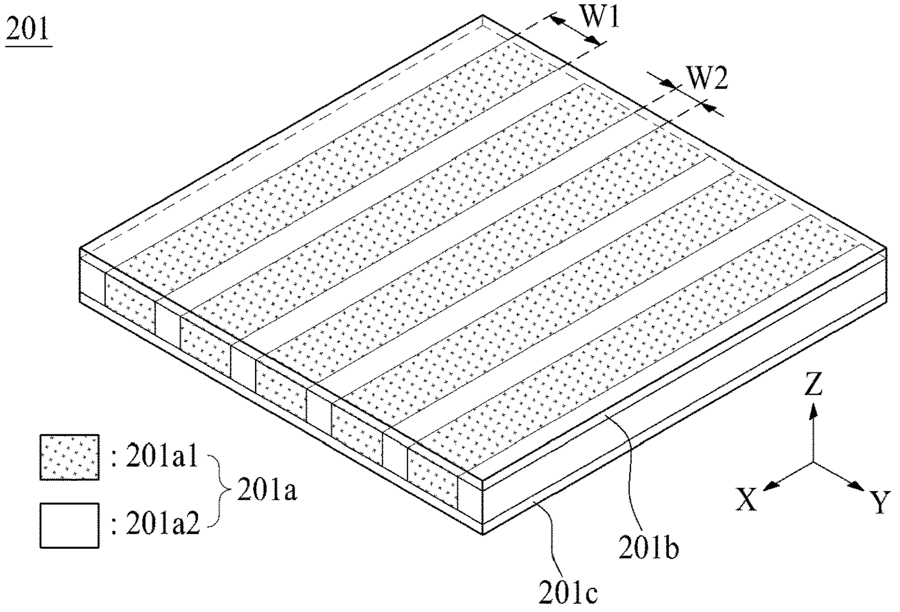
FIG. 32 illustrates a vibration portion illustrated in FIG. 31 according to an embodiment of the present disclosure.
Figure 33:
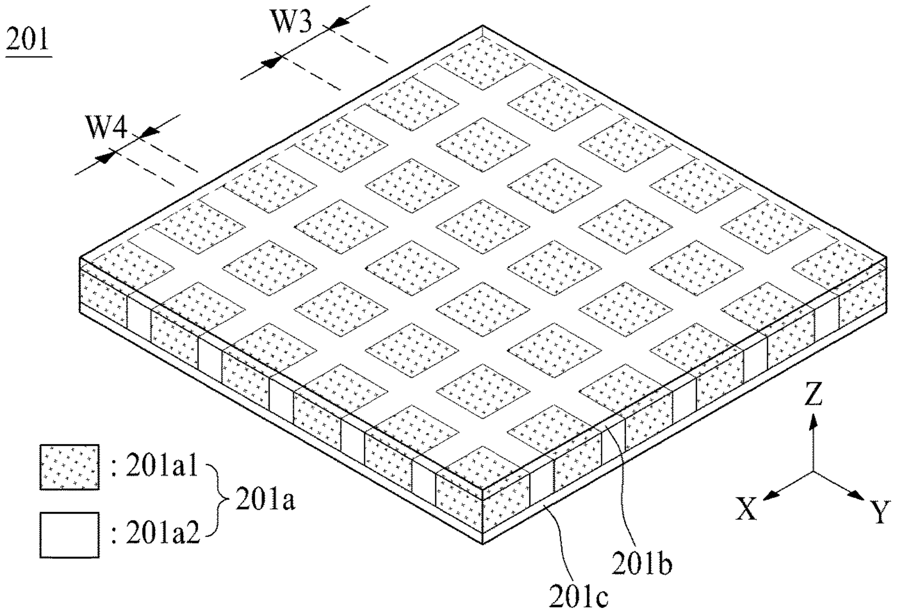
FIGS. 33 to 35 illustrate embodiments of the vibration portion illustrated in FIG. 32.
Figure 34:
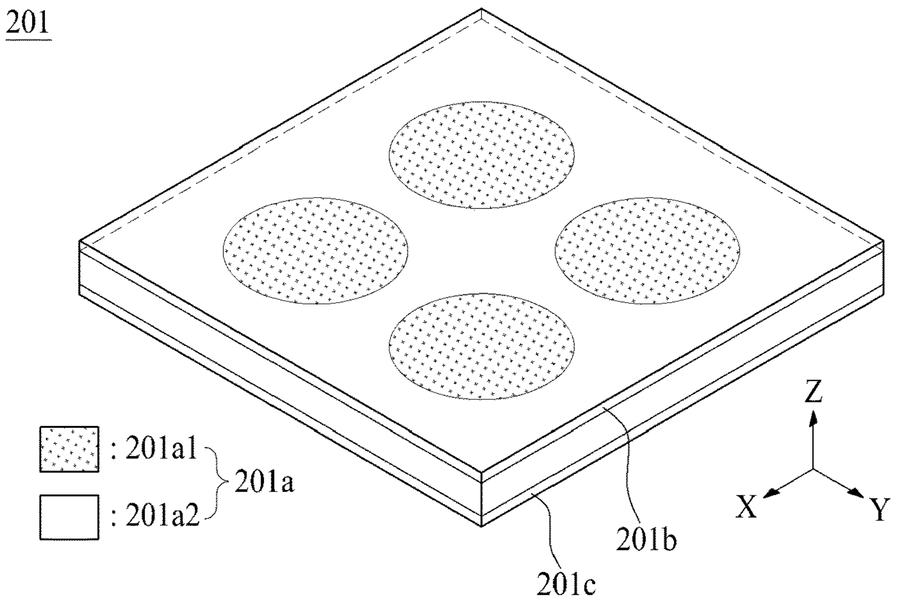
Figure 35:
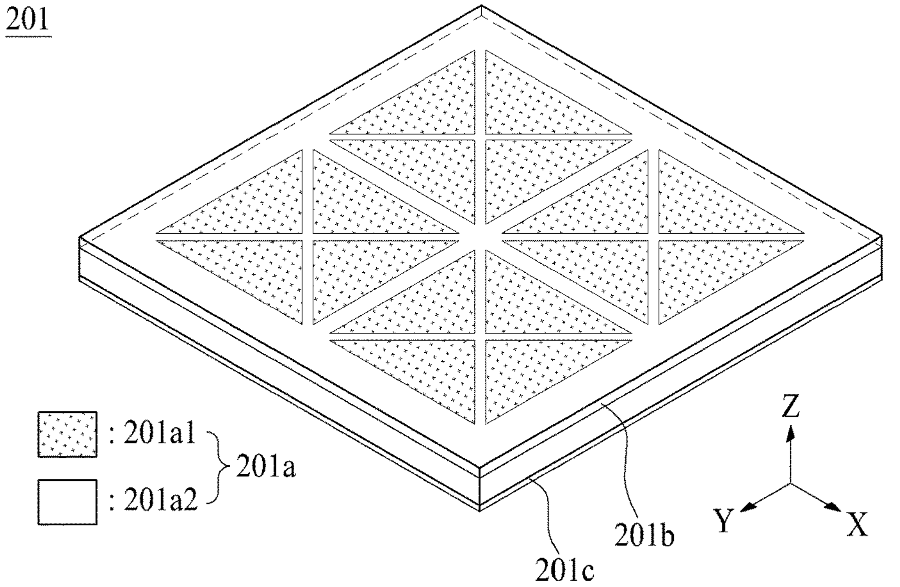

FIG. 30 illustrates a vibration apparatus according to another embodiment of the present disclosure. FIG. 31 is a cross-sectional view taken along line II-IP illustrated in FIG. 30. FIG. 32 illustrates a vibration portion illustrated in FIG. 31. FIGS. 33 to 35 illustrate other embodiments of the vibration portion illustrated in FIG. 32.

Referring to FIGS. 30 to 32, a vibration apparatus 200 according to another embodiment of the present disclosure can be referred to as an active vibration member, a vibration apparatus, a flexible vibration apparatus, a flexible vibration structure material, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film type piezoelectric composite actuator, a vibration, a haptic feedback generator, a film speaker, a film type piezoelectric speaker, or a film type piezoelectric composite speaker, but embodiments of the present disclosure are not limited thereto.

The vibration apparatus 200 according to another embodiment of the present disclosure can include a vibration portion 201. For example, the vibration portion 201 can be a piezoelectric vibration portion or a piezoelectric type vibration portion. The vibration portion 201 can include a vibration layer 201*a*, a first electrode layer 201*b*, and a second electrode layer 201*c*.

The vibration layer 201*a* can include a piezoelectric material (or an electroactive material) having a piezoelectric effect. For example, the piezoelectric material can have a characteristic where pressure or twisting is applied to a crystalline structure by an external force, a potential difference occurs due to dielectric polarization (or poling) caused by a relative position change of a positive (+) ion and a negative (−) ion, and a vibration is generated by an electric field based on a voltage applied thereto. The vibration layer 201*a* can be referred to as the terms such as a piezoelectric layer, a piezoelectric material layer, an electroactive layer, a vibration portion, a piezoelectric material portion, an electroactive portion, a piezoelectric structure, a piezoelectric composite layer, a piezoelectric composite, or a piezoelectric ceramic composite, but the terms are not limited thereto. The vibration layer 201*a* can include a transparent conductive material, a semitransparent conductive material, or an opaque conductive material and can be transparent, semi-transparent, or opaque.

The vibration portion 201 according to an embodiment of the present disclosure can include a plurality of inorganic material portions and an organic material portion between the plurality of inorganic material portions. For example, the plurality of inorganic material portions can have a piezoelectric characteristic. For example, with reference to FIGS. 32-35, the plurality of inorganic material portions can be a first portion 201*al*, and the organic material portion can be a second portion 201*a*2. For example, the vibration layer 201*a* can include a plurality of first portions 201*a*1 and a plurality of second portions 201*a*2. For example, the plurality of first portions 201*a*1 and the plurality of second portions 201*a*2 can be alternately arranged in a first direction X (or a second direction Y). For example, the first direction X can be a horizontal direction of the vibration layer 201*a* and the second direction Y can be a vertical direction of the vibration layer 201*a* intersecting with the first direction X, but embodiments of the present disclosure are not limited thereto and the first direction X can be a vertical direction of the vibration layer 201*a* and the second direction Y can be a horizontal direction of the vibration layer 201*a*.

Each of the plurality of first portions 201*a*1 can include an inorganic material portion. The inorganic material portion can include a piezoelectric material, a composite piezoelectric material, or an electroactive material, which has a piezoelectric effect, but embodiments of the present disclosure are not limited thereto.

Each of the plurality of first portions 201*a*1 can include a ceramic-based material for generating a relatively high vibration, or can include a piezoelectric ceramic having a perovskite-based crystalline structure. The perovskite crystalline structure can have a piezoelectric effect and/or an inverse piezoelectric effect, and can be a plate-shaped structure having orientation. The perovskite crystalline structure can be represented by a chemical formula "$ABO_3$". In the chemical formula, "A" can include a divalent metal element, and "B" can include a tetravalent metal element. For example, in the chemical formula "$ABO_3$", "A" and "B" can be cations, and "O" can be anions. For example, the first portions 201*a*1 can include one or more of lead(II) titanate ($PbTiO_3$), lead zirconate ($PbZrO_3$), lead zirconate titanate ($PbZrTiO_3$), barium titanate ($BaTiO_3$), and strontium titanate ($SrTiO_3$), but embodiments of the present disclosure are not limited thereto.

In a perovskite crystalline structure, a position of a center ion can be changed by an external stress or a magnetic field to vary polarization (or poling), and a piezoelectric effect can be generated based on the variation of the polarization (or poling). In a perovskite crystalline structure including $PbTiO_3$, a position of a Ti ion corresponding to a center ion can be changed to vary polarization (or poling), and thus, a piezoelectric effect can be generated. For example, in the perovskite crystalline structure, a cubic shape having a symmetric structure can be changed to a tetragonal shape, an orthorhombic shape, and a rhombohedral shape each having an unsymmetric structure by using an external stress or a magnetic field, and thus, a piezoelectric effect can be generated. Polarization (or poling) can be high at a morphotropic phase boundary (MPB) of a tetragonal structure and a rhombohedral structure, and polarization (or poling) can be easily realigned, thereby obtaining a high piezoelectric characteristic.

The vibration layer 201*a* or the first portion 201*a*1 according to another embodiment of the present disclosure can include one or more of lead (Pb), zirconium (Zr), titanium (Ti), zinc (Zn), nickel (Ni), and niobium (Nb), but embodiments of the present disclosure are not limited thereto.

According to another embodiment of the present disclosure, the vibration layer 201*a* or the first portion 201*a*1 can include a lead zirconate titanate (PZT)-based material, including lead (Pb), zirconium (Zr), and titanium (Ti); or can include a lead zirconate nickel niobate (PZNN)-based material, including lead (Pb), zirconium (Zr), nickel (Ni), and niobium (Nb), but embodiments of the present disclosure are not limited thereto. According to another embodiment of the present disclosure, the vibration layer 201*a* can include one or more of calcium titanate ($CaTiO_3$), $BaTiO_3$, and $SrTiO_3$, each including no Pb, but embodiments of the present disclosure are not limited thereto.

Each of the plurality of first portions 201_a_1 according to an embodiment of the present disclosure can be disposed between two adjacent second portions 201_a_2 of the plurality of second portions 201_a_2, and moreover, can have a first width W1 parallel to the first direction X (or the second direction Y) and can have a length parallel to the second direction Y (or the first direction X). Each of the plurality of second portions 201_a_2 can have a second width W2 parallel to the first direction X (or the second direction Y) and can have a length parallel to the second direction Y (or the first direction X). The first width W1 can be the same as or different from the second width W2. For example, the first width W1 can be greater than the second width W2. For example, the first portion 201_a_1 and the second portion 201_a_2 can include a line shape or a stripe shape having the same size or different sizes. Accordingly, the vibration portion 201_a_ can have a 2-2 composite structure having a piezoelectric characteristic of a 2-2 vibration mode, and thus, can have a resonance frequency of 20 kHz or less, but embodiments of the present disclosure are not limited thereto. For example, the resonance frequency of the vibration portion 201_a_ can vary based on one or more of a shape, a length, and a thickness.

In the vibration layer 201_a_, the plurality of first portions 201_a_1 and the plurality of second portions 201_a_2 can be disposed (or arranged) in parallel on the same plane (or the same layer). Each of the plurality of second portions 201_a_2 can be configured to fill a gap between two adjacent first portions 201_a_1, and thus, each of the plurality of second portions 201_a_2 can be connected to or attached on an adjacent first portion 201_a_1. Accordingly, the vibration layer 201_a_ can extend by a desired size or length based on lateral coupling (or connection) of the first portion 201_a_1 and the second portion 201_a_2.

In the vibration layer 201_a_, the width W2 of each of the plurality of second portions 201_a_2 can decrease progressively in a direction from a center portion of the vibration layer 201_a_ or the vibration apparatus 200 to both edge portions (or both ends) thereof.

According to an embodiment of the present disclosure, when the vibration layer 201_a_ or the vibration apparatus 200 vibrates in an upward and downward direction Z (or a thickness direction), a second portion 201_a_2 having a largest width W2 among the plurality of second portions 201_a_2 can be disposed at a portion on which a largest stress concentrates. When the vibration layer 201_a_ or the vibration apparatus 200 vibrates in the upward and downward direction Z, a second portion 201_a_2 having a smallest width W2 among the plurality of second portions 201_a_2 can be disposed at a portion where a relatively smallest stress occurs. For example, the second portion 201_a_2 having the largest width W2 among the plurality of second portions 201_a_2 can be disposed at a center portion of the vibration layer 201_a_, and the second portion 201_a_2 having the smallest width W2 among the plurality of second portions 201_a_2 can be disposed at both edge portions of the vibration layer 201_a_. Accordingly, when the vibration layer 201_a_ or the vibration apparatus 200 vibrates in the upward and downward direction Z, an overlap of a resonance frequency or interference of a sound wave generated in a portion on which a largest stress concentrates can be minimized, and thus, the dipping of a sound pressure level generated in a low pitched sound band can decrease and the flatness of a sound characteristic of the low pitched sound band can be improved. For example, the flatness of a sound characteristic can be a magnitude of a deviation between a highest sound pressure level and a lowest sound pressure level.

In the vibration layer 201_a_, the plurality of first portions 201_a_1 can have different sizes (or widths). For example, a size (or a width) of each of the plurality of first portions 201_a_1 can decrease or increase progressively in a direction from the center portion of the vibration layer 201_a_ or the vibration apparatus 200 to both edge portions (or both ends) thereof. Therefore, a sound pressure level characteristic of a sound of the vibration layer 201_a_ can be enhanced by various unique vibration frequencies based on vibrations of the plurality of first portions 201_a_1 having different sizes, and a reproduction band of a sound can extend.

Each of the plurality of second portions 201_a_2 can be disposed between the plurality of first portions 201_a_1. Therefore, in the vibration layer 201_a_ or the vibration apparatus 200, vibration energy based on a link in a unit lattice of the first portion 201_a_1 can be increased by the second portion 201_a_2, and thus, a vibration characteristic can increase and a piezoelectric characteristic and flexibility can be secured. For example, the second portion 201_a_2 can include one of an epoxy-based polymer, an acrylic-based polymer, and a silicone-based polymer, but embodiments of the present disclosure are not limited thereto.

Each of the plurality of second portions 201_a_2 according to an embodiment of the present disclosure can include an organic material portion. For example, each of the organic material portions can be disposed between two adjacent inorganic material portions of the plurality of inorganic material portions, and thus, can absorb an impact applied to a corresponding inorganic material portion (or a first portion), a stress concentrating on the inorganic material portion can be released to enhance the durability of the vibration layer 201_a_ or the vibration apparatus 200, and flexibility can be provided to the vibration layer 201_a_ or the vibration apparatus 200. Accordingly, the vibration apparatus 200 can be configured to have flexibility.

The second portion 201_a_2 according to an embodiment can have modulus (or young's modulus) and viscoelasticity which are lower than those of the first portion 201_al_, and thus, can enhance the reliability of the first portion 201_a_1 which is vulnerable to an impact due to a fragile characteristic thereof. For example, the second portion 201_a_2 can include a material which has a loss coefficient of 0.01 to 1 (e.g., 0.5) and a modulus of 0.1 Gpa to 10 Gpa (Gigapascal) (e.g., 5 Gpa).

The organic material portion included in the second portion 201_a_2 can include an organic material, an organic polymer, an organic piezoelectric material, or an organic non-piezoelectric material having a flexible characteristic compared to the inorganic material portion which is the first portion 201_a_1. For example, the second portion 201_a_2 can be referred to as an adhesive portion, a flexible portion, a bending portion, a damping portion, or a ductile portion, or the like, but embodiments of the present disclosure are not limited thereto.

The plurality of first portions 201_a_1 and the plurality of second portions 201_a_2 can be disposed on (or connected to) the same plane, and thus, the vibration layer 201_a_ according to an embodiment of the present embodiment can have a single thin film form. For example, the vibration layer 201_a_ can have a structure where the plurality of first portions 201_a_1 are connected to one side thereof. For example, the vibration layer 201_a_ can have a structure where the plurality of first portions 201_a_1 are connected in all of the vibration layer 201_a_. For example, the vibration layer 201_a_ can be vibrated in a vertical direction by the first portion 201*a*1 having a vibration characteristic and can be bent in a curved shape by the second portion 201*a*2 having flexibility. Also, in the vibration layer 201*a* according to an embodiment of the present disclosure, a size of the first portion 201*a*1 and a size of the second portion 201*a*2 can be adjusted based on a piezoelectric characteristic and flexibility needed for the vibration layer 201*aa* or the vibration apparatus 200. For example, in the vibration layer 201*a* requiring a piezoelectric characteristic rather than flexibility, a size of the first portion 201*a*1 can be adjusted to be greater than that of the second portion 201*a*2. In another embodiment of the present disclosure, in the vibration layer 201*a* requiring flexibility rather than a piezoelectric characteristic, a size of the second portion 201*a*2 can be adjusted to be greater than that of the first portion 201*a*1. Accordingly, a size of the vibration layer 201*a* can be adjusted based on a desired characteristic, and thus, the vibration layer 201*a* can be easily designed.

The first electrode layer 201*b* can be disposed on a first surface (or an upper surface) of the vibration layer 201*a*. The first electrode layer 201*b* can be disposed at or coupled (or connected) to a first surface of each of the plurality of first portions 201*a*1 and a first surface of each of the plurality of second portions 201*a*2 in common and can be electrically connected with the first surface of each of the plurality of first portions 201*a*1. For example, the first electrode layer 201*b* can have a single electrode (or one electrode) shape disposed at the whole first surface of the vibration layer 201*a*. For example, the first electrode layer 201*b* can have substantially the same shape as that of the vibration layer 201*a*, but embodiments of the present disclosure are not limited thereto.

The second electrode layer 201*c* can be disposed on a second surface (or a rear surface), which is different from (or opposite to) the first surface, of the vibration layer 201*a*. The second electrode layer 201*c* can be disposed at or coupled (or connected) to a second surface of each of the plurality of first portions 201*a*1 and a second surface of each of the plurality of second portions 201*a*2 in common and can be electrically connected with the second surface of each of the plurality of first portions 201*a*1. For example, the second electrode layer 201*c* can have a single electrode (or one electrode) shape disposed at the whole second surface of the vibration layer 201*a*. For example, the second electrode layer 201*c* can have substantially the same shape as that of the vibration layer 201*a*, but embodiments of the present disclosure are not limited thereto.

One or more of the first electrode layer 201*b* and the second electrode layer 201*c* according to an embodiment of the present disclosure can include a transparent conductive material, a semitransparent conductive material, or an opaque conductive material. For example, the transparent conductive material or the semitransparent conductive material can include indium tin oxide (ITO) or indium zinc oxide (IZO), but embodiments of the present disclosure are not limited thereto. Examples of the opaque conductive material can include aluminum (Al), copper (Cu), gold (Au), silver (Ag), molybdenum (Mo), and Mg or an alloy thereof, but embodiments of the present disclosure are not limited thereto.

The vibration layer 201*a* can be polarized by a certain voltage applied to the first electrode layer 201*b* and the second electrode layer 201*c* in a certain temperature atmosphere or a temperature atmosphere which is changed from a high temperature to a room temperature, but embodiments of the present disclosure are not limited thereto. For example, the vibration layer 201*a* can alternately repeat contraction and/or expansion according to an inverse piezoelectric effect based on a sound signal (or a voice signal or a driving signal) applied from the outside to the first electrode layer 201*b* and the second electrode layer 201*c*, and thus, can vibrate. For example, the vibration layer 201*a* can vibrate based on a vertical-direction vibration and a horizontal-direction vibration, based on the sound signal applied to the first electrode layer 201*b* and the second electrode layer 201*c*. The vibration layer 201*a* can increase a displacement of a vibration member, based on contraction and/or expansion in a horizontal direction, thereby more enhancing a vibration of the vibration member.

The vibration apparatus 200 according to an embodiment of the present disclosure can further include a first cover member 202 and a second cover member 203.

The first cover member 202 can be disposed on a first surface of the vibration portion 201. For example, the first cover member 202 can be configured to cover the first electrode layer 201*b*. Accordingly, the first cover member 202 can protect the first electrode layer 201*b*.

The second cover member 203 can be disposed on a second surface of the vibration portion 201. For example, the second cover member 203 can be configured to cover the second electrode layer 201*c*. Accordingly, the second cover member 203 can protect the second electrode layer 201*c*.

Each of the first cover member 202 and the second cover member 203 according to an embodiment of the present disclosure can include one or more materials of plastic, fiber, and wood, but embodiments of the present disclosure are not limited thereto. For example, the first cover member 202 and the second cover member 203 can include the same material or different materials. For example, the first cover member 202 and the second cover member 203 can be a polyimide film or a polyethylene terephthalate film, but embodiments of the present disclosure are not limited thereto.

The first cover member 202 according to an embodiment of the present disclosure can be connected or coupled to the first electrode layer 201*b* by using a first adhesive layer 204. For example, the first cover member 202 can be connected or coupled to the first electrode layer 201*b* through a film laminating process using the first adhesive layer 204.

A second cover member 203 according to an embodiment of the present disclosure can be connected with or coupled to the second electrode layer 201*c* by using a second adhesive layer 205. For example, the second cover member 203 can be connected with or coupled to the second electrode layer 201*c* by a film laminating process using the second adhesive layer 205. For example, the vibration apparatus 200 can be implemented as one film by using the first cover member 202 and the second cover member 203.

The first adhesive layer 204 can be disposed between the first electrode layer 201*b* and the first cover member 202. The second adhesive layer 205 can be disposed between the second electrode layer 201*c* and the second cover member 203. For example, the first adhesive layer 204 and the second adhesive layer 205 can be provided between the first cover member 202 and the second cover member 203 to surround the vibration layer 201*a*, the first electrode layer 201*b*, and the second electrode layer 201*c*. For example, the first adhesive layer 204 and the second adhesive layer 205 can be provided between the first cover member 202 and the second cover member 203 to fully surround the vibration layer 201*a*, the first electrode layer 201*b*, and the second electrode layer 201*c*. For example, the vibration layer 201*a*, the first electrode layer 201*b*, and the second electrode layer 201*c* can be buried or embedded between the first adhesive layer 204 and the second adhesive layer 205.

Each of the first adhesive layer 204 and the second adhesive layer 205 according to an embodiment of the present disclosure can include an electrical insulation material which has adhesive properties and is capable of compression and decompression. For example, each of the first adhesive layer 204 and the second adhesive layer 205 can include epoxy resin, acrylic resin, silicone resin, and urethane resin, but embodiments of the present disclosure are not limited thereto.

The vibration apparatus 200 according to an embodiment of the present disclosure can further include a first power supply line PL1 which is disposed in the first cover member 202, a second power supply line PL2 which is disposed in the second cover member 203, and a pad portion 206 which is electrically connected to the first power supply line PL1 and the second power supply line PL2. For example, the first power supply line PL1 and the second power supply line PL2 can be disposed on opposite sides of the vibration portion 201 and can be offset so they do not overlap with each other, but embodiments are not limited thereto.

The first power supply line PL1 can be disposed between the first electrode layer 201*b* and the first cover member 202 and can be electrically connected to the first electrode layer 201*b*. The first power supply line PL1 can extend long in a second direction Y and can be electrically connected to a center portion of the first electrode layer 201*b*. In an embodiment, the first power supply line PL1 can be electrically connected to the first electrode layer 201*b* by using an anisotropic conductive film. In another embodiment, the first power supply line PL1 can be electrically connected to the first electrode layer 201*b* through a conductive material (or particles) included in the first adhesive layer 204.

The second power supply line PL2 can be disposed between the second electrode layer 201*c* and the second cover member 203 and can be electrically connected to the second electrode layer 201*c*. The second power supply line PL2 can extend long in the second direction Y and can be electrically connected to a center portion of the second electrode layer 201*c*. In an embodiment, the second power supply line PL2 can be electrically connected to the second electrode layer 201*c* by using an anisotropic conductive film. In another embodiment, the second power supply line PL2 can be electrically connected to the second electrode portion 205 through a conductive material (or particles) included in the second adhesive layer 205.

According to an embodiment of the present disclosure, a first power supply line PL1 and a second power supply line PL2 can be disposed not to overlap with each other. When the first power supply line PL1 is disposed not to overlap with the second power supply line PL2, a problem of a short circuit defect between the first power supply line PL1 and the second power supply line PL2 can be solved or the risk of a short circuit can be reduced.

The pad portion 206 can be provided at one edge portion of one of the first cover member 202 and the second cover member 203 to be electrically connected to one side (or one end) of each of the first power supply line PL1 and the second power supply line PL2.

The pad portion 206 according to an embodiment of the present disclosure can include a first pad electrode which is electrically connected to one end of the first power supply line PL1 and a second pad electrode which is electrically connected to one end of the second power supply line PL2.

The first pad electrode can be disposed at one edge portion of one of the first cover member 202 and the second cover member 203 and can be connected to one end of the first power supply line PL1. For example, the first pad electrode can pass through one of the first cover member 202 and the second cover member 203 and can be electrically connected to one end of the first power supply line PL1.

The second pad electrode can be disposed in parallel with the first pad electrode and can be connected to one end of the second power supply line PL2. For example, the second pad electrode can pass through one of the first cover member 202 and the second cover member 203 and can be electrically connected to one end of the second power supply line PL2.

According to an embodiment of the present disclosure, each of the first power supply line PL1, the second power supply line PL2, and the pad portion 206 can be configured to be transparent, semitransparent, or opaque.

A pad portion 206 according to an embodiment of the present disclosure can be electrically connected with a signal cable 207.

The signal cable 207 can be electrically connected with the pad portion 206 disposed in the vibration apparatus 200 and can supply the vibration apparatus 200 with a vibration driving signal (or a sound signal or a voice signal) provided from a sound processing circuit. The signal cable 207 according to an embodiment of the present disclosure can include a first terminal electrically connected with a first pad electrode of the pad portion 206 and a second terminal electrically connected with a second pad electrode of the pad portion 206. For example, the signal cable 207 can be configured as a flexible printed circuit cable, a flexible flat cable, a single-sided flexible printed circuit, a single-sided flexible printed circuit board (PCB), a flexible multi-layer printed circuit, or a flexible multi-layer PCB, but embodiments of the present disclosure are not limited thereto.

The sound processing circuit can generate an alternating current (AC) vibration driving signal including a first vibration driving signal and a second vibration driving signal on based on sound data provided from an external sound data generating circuit. The first vibration driving signal can be one of a positive (+) vibration driving signal and a negative (−) vibration driving signal, and the second vibration driving signal can be one of the positive (+) vibration driving signal and the negative (−) vibration driving signal. For example, the first vibration driving signal can be supplied to the first electrode layer 201*b* through the first terminal of the signal cable 207, the first pad electrode of the pad portion 206, and the first power supply line PL1. The second vibration driving signal can be supplied to the second electrode layer 201*c* through the second terminal of the signal cable 207, the second pad electrode of the pad portion 206, and the second power supply line PL2.

According to an embodiment, the signal cable 207 can be configured to be transparent, semitransparent, or opaque.

The vibration apparatus 200 according to an embodiment of the present disclosure can be implemented as a thin film as the first portion 201*a*1 having a piezoelectric characteristic and the second portion 201*a*2 having flexibility are alternately and repeatedly connected with each other. Therefore, a vibration width (or a displacement width) of the vibration apparatus 200 can increase based on the second portion 201*a*2 having flexibility. Accordingly, a sound characteristic and/or a sound pressure level characteristic of a low pitched sound band generated based on a vibration of the vibration member can be enhanced.

FIGS. 33 to 35 illustrate various embodiments of the vibration portion illustrated in FIG. 32.

With reference to FIG. 33, a vibration layer 201*a* of a vibration portion 201 according to another embodiment of the present disclosure can include a plurality of first portions 201*a*1, which are spaced apart from one another in a first direction X and a second direction Y, and a second portion 201_a_2 disposed between the plurality of first portions 201_a_1.

The plurality of first portions 201_a_1 can be arranged spaced apart from one another in each of the first direction X and the second direction Y. For example, the plurality of first portions 201_a_1 can be arranged in a lattice form or grid to have a hexahedral shape having the same size. Each of the plurality of first portions 201_a_1 can include substantially the same piezoelectric material as that of the first portion 201_a_1 described above with reference to FIGS. 30 to 32, and thus, like reference numerals refer to like elements and repeated descriptions thereof are omitted.

The second portion 201_a_2 can be arranged between the plurality of first portions 201_a_1 in each of the first direction X and the second direction Y. The second portion 201_a_2 can be configured to fill a gap between two adjacent first portions 201_a_1 or surround each of the plurality of first portions 201_al_, and thus, can be connected or adhered to an adjacent first portion 201_a_1. According to an embodiment of the present disclosure, a width of the second portion 201_a_2 disposed between two first portions 201_a_1 adjacent to each other in the first direction X can be the same as or different from that of the first portion 201_a_1, and a width of the second portion 201_a_2 disposed between two first portions 201_a_1 adjacent to each other in the second direction Y can be the same as or different from that of the first portion 201_a_1. The second portion 201_a_2 can include substantially the same piezoelectric material as that of the second portion 201_a_2 described above with reference to FIGS. 30 to 32, and thus, like reference numerals refer to like elements and repeated descriptions thereof are omitted.

The vibration layer 201_a_ according to another embodiment of the present disclosure can have a 1-3 composite structure having a piezoelectric characteristic of a 1-3 vibration mode, and thus, can have a resonance frequency of 30 MHz or less, but embodiments of the present disclosure are not limited thereto. For example, the resonance frequency of the vibration layer 201_a_ can vary based on one or more of a shape, a length, and a thickness.

With reference to FIG. 34, a vibration layer 201_a_ of a vibration portion 201 according to another embodiment of the present disclosure can include a plurality of first portions 201_a_1, which are spaced apart from one another in a first direction X and a second direction Y, and a second portion 201_a_2 disposed between the plurality of first portions 201_a_1.

Each of the plurality of first portions 201_a_1 can have a circular-shaped planar structure. For example, each of the plurality of first portions 201_a_1 can have a circular plate shape, but embodiments of the present disclosure are not limited thereto. For example, each of the plurality of first portions 201_a_1 can have a dot shape such as an oval shape, a polygonal shape, or a donut shape. Each of the plurality of first portions 201_a_1 can include substantially the same piezoelectric material as that of the first portion 201_a_1 described above with reference to FIGS. 30 to 32, and thus, like reference numerals refer to like elements and repeated descriptions thereof are omitted.

The second portion 201_a_2 can be arranged between the plurality of first portions 201_a_1 in each of the first direction X and the second direction Y. The second portion 201_a_2 can be configured to surround each of the plurality of first portions 201_a_1, and thus, can be connected or adhered to a lateral surface of each of the plurality of first portions 201_a_1. Each of the plurality of first portions 201_a_1 and the second portion 201_a_2 can be disposed (or arranged) in parallel on the same plane (or the same layer). The second portion 201_a_2 can include substantially the same organic material as that of the second portion 201_a_2 described above with reference to FIGS. 30 to 32, and thus, like reference numerals refer to like elements and repeated descriptions thereof are omitted.

With reference to FIG. 35, a vibration layer 201_a_ of a vibration portion 201 according to another embodiment of the present disclosure can include a plurality of first portions 201_a_1, which are apart from one another in a first direction X and a second direction Y, and a second portion 201_a_2 disposed between the plurality of first portions 201_a_1.

Each of the plurality of first portions 201_a_1 can have a triangular-shaped planar structure. For example, each of the plurality of first portions 201_a_1 can have a triangular plate shape. Each of the plurality of first portions 201_a_1 can include substantially the same piezoelectric material as that of the first portion 201_a_1 described above with reference to FIGS. 30 to 32, and thus, like reference numerals refer to like elements and repeated descriptions thereof are omitted.

According to an embodiment of the present disclosure, four adjacent first portions 201_a_1 of the plurality of first portions 201_a_1 can be arranged adjacent to one another to form a tetragonal shape (or a square shape). A vertex of each of the four adjacent first portions 201_a_1 forming a tetragonal shape can be disposed adjacent to a center portion (or a middle portion) of a tetragonal shape.

The second portion 201_a_2 can be arranged between the plurality of first portions 201_a_1 in each of the first direction X and the second direction Y. For example, the second portion 201_a_2 can form an "X" shape between the four adjacent first portions 201_a_1. The second portion 201_a_2 can be configured to surround each of the plurality of first portions 201_al_, and thus, can be connected or adhered to a lateral surface of each of the plurality of first portions 201_a_1. Each of the plurality of first portions 201_a_1 and the second portion 201_a_2 can be disposed (or arranged) in parallel on the same plane (or the same layer). The second portion 201_a_2 can include substantially the same organic material as that of the second portion 201_a_2 described above with reference to FIGS. 30 to 32, and thus, like reference numerals refer to like elements and repeated descriptions thereof are omitted.

According to another embodiment of the present disclosure, 2N (where N is a natural number of 2 or more) of adjacent first portions 201_a_1 among a plurality of first portions 201_a_1 having a triangular shape can be arranged adjacent to one another to form a 2N-angular shape. For example, six adjacent first portions 201_a_1 among the plurality of first portions 201_a_1 can be arranged adjacent to one another to form a hexagonal shape (or a regular hexagon). A vertex of each of six adjacent first portions 201_a_1 having a hexagonal shape can be disposed adjacent to a center portion (or a regular center portion) of a hexagonal shape. The second portion 201_a_2 can be provided to surround each of the plurality of first portions 201_a_1, and thus, can be connected with or attached on a lateral surface of each of the plurality of first portions 201_a_1. The plurality of first portions 201_a_1 and the second portion 201_a_2 can be disposed (or arranged) in parallel on the same plane (or the same layer).

The apparatus according to an embodiment of the present disclosure can be applied to a vibration generating apparatus and/or a sound generating apparatus. The apparatus according to an embodiment of the present disclosure can be applied to mobile devices, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, e-books, portable multimedia players (PMPs), personal digital assistants (PDAs), MP3 players, mobile medical apparatuses, desktop personal computers (PCs), laptop PCs, netbook computers, workstations, navigation devices, automotive navigation devices, automotive display apparatuses, automotive apparatuses, cinema display apparatuses, televisions (TVs), wall paper display apparatuses, signage apparatuses, game machines, notebook computers, monitors, cameras, camcorders, home appliances, etc.

An apparatus according to various embodiments of the present disclosure will be described below.

An apparatus according to various embodiments of the present disclosure can include a vibration member, a vibration apparatus configured to vibrate the vibration member, a supporting member at a rear surface of the vibration member, and a porous member between the vibration member and the supporting member.

According to various embodiments of the present disclosure, the porous member can contact at least one of the rear surface of the vibration member and an upper surface of the supporting member.

According to various embodiments of the present disclosure, the porous member can have a thickness which is less than or equal to a distance between the vibration member and the supporting member.

According to various embodiments of the present disclosure, the porous member can have a uniform thickness.

According to various embodiments of the present disclosure, the porous member can have different thicknesses.

According to various embodiments of the present disclosure, the porous member does not overlap with the vibration apparatus.

According to various embodiments of the present disclosure, the porous member can overlap the vibration apparatus.

According to various embodiments of the present disclosure, the supporting member can include at least one first hole overlapping with the vibration apparatus.

According to various embodiments of the present disclosure, the vibration apparatus can be accommodated into the at least one first hole of the supporting member and can be fixed to the supporting member.

According to various embodiments of the present disclosure, can further include a frame connected with the supporting member, a magnet on the frame, a bobbin around the magnet, and a coil around the bobbin.

According to various embodiments of the present disclosure, the porous member does not overlap with the magnet, the bobbin, and the coil.

According to various embodiments of the present disclosure, can further include a heat dissipation member between the vibration member and the vibration apparatus, the porous member can be spaced apart from the heat dissipation member.

According to various embodiments of the present disclosure, the porous member does not overlap with the heat dissipation member.

According to various embodiments of the present disclosure, the porous member can be configured to have a uniform thickness, contacting the rear surface of the vibration member and the upper surface of the supporting member.

According to various embodiments of the present disclosure, the porous member can be configured to have a uniform thickness, contacting the upper surface of the supporting member and is spaced apart from the vibration member.

According to various embodiments of the present disclosure, the porous member can overlap with the heat dissipation member with being apart therefrom.

According to various embodiments of the present disclosure, the porous member can be configured to have a uniform thickness, contacting the upper surface of the supporting member and is apart from the heat dissipation member.

According to various embodiments of the present disclosure, a thickness of a portion of the porous member, contacting the upper surface of the supporting member and overlapping the heat dissipation member, can differ from a thickness of a portion of the porous member which does not overlap with the heat dissipation member.

According to various embodiments of the present disclosure, the vibration apparatus can further include at least one second hole overlapping with the at least one first hole, and the at least one second hole can overlap with the bobbin and the coil.

According to various embodiments of the present disclosure, the vibration apparatus can be connected with the rear surface of the vibration member to vibrate the vibration member.

According to various embodiments of the present disclosure, the vibration apparatus can be between the vibration member and the supporting member.

According to various embodiments of the present disclosure, the vibration apparatus can include a vibration layer, a first electrode layer at a first surface of the vibration layer, and a second electrode layer at a second surface, differing from the first surface, of the vibration layer.

According to various embodiments of the present disclosure, the vibration layer can include a plurality of inorganic material portions having a piezoelectric characteristic, and an organic material portion between the plurality of inorganic material portions.

According to various embodiments of the present disclosure, the porous member can be configured to have a uniform thickness, contacting the upper surface of the supporting member and the rear surface of the vibration member, which does not overlap with the vibration apparatus.

According to various embodiments of the present disclosure, the porous member can be configured to have a uniform thickness, contacting the upper surface of the supporting member which does not overlap the vibration apparatus and can be spaced apart from the vibration member.

According to various embodiments of the present disclosure, the porous member can overlap with the vibration apparatus with being apart therefrom.

According to various embodiments of the present disclosure, the porous member can be configured to have a uniform thickness, contacting the upper surface of the supporting member and is spaced apart from the vibration apparatus.

According to various embodiments of the present disclosure, a thickness of a portion of the porous member, contacting the upper surface of the supporting member and overlapping the vibration apparatus, can differ from a thickness of a portion of the porous member which does not overlap with the vibration apparatus.

According to various embodiments of the present disclosure, the supporting member can include at least one first hole overlapping with the vibration apparatus, and an internal space between the vibration member and the supporting member can be connected to the outside through the at least one first hole.

According to various embodiments of the present disclosure, the porous member can be configured to have a uniform thickness, contacting the upper surface of the supporting member and the rear surface of the vibration member, which does not overlap with the at least one first hole.

According to various embodiments of the present disclosure, the porous member can be configured to have a uniform thickness, contacting he upper surface of the supporting member which does not overlap with the at least one first hole and can be apart from the vibration member.

According to various embodiments of the present disclosure, the porous member can be configured to have a uniform thickness, contacting the upper surface of the supporting member to cover the at least one first hole and can be spaced apart from the vibration apparatus.

According to various embodiments of the present disclosure, a thickness of a portion of the porous member, contacting the upper surface of the supporting member to cover the at least one first hole and overlapping with the vibration apparatus, can differ from a thickness of a portion of the porous member which does not overlap with the vibration apparatus.

According to various embodiments of the present disclosure, can further include a partition member between the vibration member and the supporting member to surround the vibration apparatus, the porous member can be surrounded by the partition member.

According to various embodiments of the present disclosure, the porous member can be apart from the partition member.

According to various embodiments of the present disclosure, the partition member can include an open portion provided in one or more first sides of four sides to pass through an inner portion and outer portion of the partition member.

According to various embodiments of the present disclosure, the porous member can include one or more materials of a porous coordination polymer (PCP), a metal organic framework (MOF), zeolite, and activated carbon.

According to various embodiments of the present disclosure, the vibration member can include one or more materials of metal, plastic, fiber, leather, wood, cloth, rubber, carbon, glass, and paper.

The above-described feature, structure, and effect of the present disclosure are included in at least one embodiment of the present disclosure, but are not limited to only one embodiment. Furthermore, the feature, structure, and effect described in at least one embodiment of the present disclosure can be implemented through combination or modification of other embodiments by those skilled in the art. Therefore, content associated with the combination and modification should be construed as being within the scope of the present disclosure. It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. An apparatus comprising:
- a vibration member;
- a vibration apparatus configured to vibrate the vibration member;
- a supporting member disposed at a rear surface of the vibration member; and
- a porous member disposed between the vibration member and the supporting member,
- wherein the vibration apparatus is connected to the rear surface of the vibration member, and
- wherein the vibration apparatus includes:
  - a first electrode layer;
  - a second electrode layer; and
  - a vibration layer disposed between the first electrode layer and the second electrode layer.

2. The apparatus of claim 1, wherein the porous member contacts at least one of the rear surface of the vibration member and an upper surface of the supporting member.

3. The apparatus of claim 1, wherein a thickness of the porous member is less than or equal to a distance between the vibration member and the supporting member.

4. The apparatus of claim 1, wherein the porous member has a uniform thickness.

5. The apparatus of claim 1, wherein the porous member has different thicknesses.

6. The apparatus of claim 1, wherein the porous member does not overlap with the vibration apparatus.

7. The apparatus of claim 1, wherein the porous member overlaps with the vibration apparatus.

8. The apparatus of claim 1, wherein the supporting member includes at least one first hole overlapping with the vibration apparatus.

9. The apparatus of claim 8, wherein at least a portion of the vibration apparatus is disposed in the at least one first hole of the supporting member and the vibration apparatus is coupled to the supporting member.

10. The apparatus of claim 1, wherein the vibration apparatus is disposed between the vibration member and the supporting member.

11. The apparatus of claim 1, wherein the vibration layer includes:
- a plurality of inorganic material portions having a piezoelectric characteristic; and
- an organic material portion disposed between the plurality of inorganic material portions.

12. The apparatus of claim 1, wherein the porous member has a uniform thickness, and
- wherein the porous member contacts the upper surface of the supporting member and the rear surface of the vibration member, and the porous member does not overlap with the vibration apparatus.

13. The apparatus of claim 1, wherein the porous member has a uniform thickness, and
- wherein the porous member contacts the upper surface of the supporting member, the porous member does not overlap with the vibration apparatus, and the porous member is spaced apart from the vibration member.

14. The apparatus of claim 1, wherein the porous member overlaps with the vibration apparatus and the porous member is spaced apart from the vibration member.

15. The apparatus of claim 14, wherein the porous member has a uniform thickness, and
- wherein the porous member contacts the upper surface of the supporting member and the porous member is spaced apart from the vibration apparatus.

16. The apparatus of claim 14, wherein a thickness of a first portion of the porous member contacting the upper surface of the supporting member and overlapping with the vibration apparatus is different than a thickness of a second portion of the porous member that does not overlap with the vibration apparatus.

17. The apparatus of claim 1, wherein the supporting member includes at least one first hole overlapping with the vibration apparatus, and wherein an internal space between the vibration member and the supporting member is in communication with an outside through the at least one first hole.

18. The apparatus of claim 17, wherein the porous member has a uniform thickness, and wherein the porous member contacts both of the upper surface of the supporting member and the rear surface of the vibration member, and the porous member does not overlap with the at least one first hole.

19. The apparatus of claim 17, wherein the porous member has a uniform thickness, and wherein the porous member contacts the upper surface of the supporting member, and the porous member does not overlap with the at least one first hole and is spaced apart from the vibration member.

20. The apparatus of claim 17, wherein the porous member has a uniform thickness, and wherein the porous member contacts the upper surface of the supporting member, covers the at least one first hole and is spaced apart from the vibration apparatus.

21. The apparatus of claim 17, wherein a thickness of a first portion of the porous member contacting the upper surface of the supporting member, covering the at least one first hole and overlapping with the vibration apparatus is different than a thickness of a second portion of the porous member that does not overlap with the vibration apparatus.

22. The apparatus of claim 1, further comprising a partition member disposed between the vibration member and the supporting member to surround the vibration apparatus, wherein the porous member is surrounded by the partition member.

23. The apparatus of claim 22, wherein the porous member is spaced apart from the partition member.

24. The apparatus of claim 22, wherein one or more sides of the partition member include an open portion extending through an inner portion of the partition member to an outer portion of the partition member.

25. The apparatus of claim 1, wherein the porous member includes one or more of a porous coordination polymer (PCP), a metal organic framework (MOF), zeolite, and activated carbon.

26. The apparatus of claim 1, wherein the vibration member includes one or more of metal, plastic, fiber, leather, wood, cloth, rubber, carbon, glass, and paper.

27. The apparatus of claim 1, wherein the vibration member is a display panel, or the apparatus is included in a display device.

28. An apparatus comprising:

a vibration member;

a supporting member;

a vibration apparatus disposed between the vibration member and the supporting member, the vibration apparatus being configured to vibrate the vibration member; and a porous member including a plurality of cavities, the porous member at least partially surrounding the vibration apparatus and being spaced apart from the vibration apparatus, wherein the vibration apparatus is connected to a rear surface of the vibration member, and wherein the vibration apparatus includes:

a first electrode layer;

a second electrode layer; and a vibration layer disposed between the first electrode layer and the second electrode layer.

29. The apparatus of claim 28, further comprising:

a partition member at least partially surrounding the porous member, wherein the porous member is spaced apart from the partition member.

30. The apparatus of claim 28, wherein the supporting member includes at least one hole overlapping with the vibration apparatus, the at least one hole being configured to pass air in and out of the apparatus.

31. The apparatus of claim 28, further comprising:

a heat dissipation member disposed between the vibration member and the vibration apparatus, wherein the porous member is spaced apart from the heat dissipation member.

* * * * *